US012693303B2

(12) United States Patent
Kubota et al.

(10) Patent No.: US 12,693,303 B2
(45) Date of Patent: Jul. 28, 2026

(54) SUBSTANCE DISPENSE SYSTEM FOR BIOLOGICAL SAMPLE ANALYSIS INSTRUMENT

(71) Applicant: Beckman Coulter, Inc., Brea, CA (US)

(72) Inventors: Kiyotaka Kubota, Tokyo (JP); Atsushi Matsushita, Tokyo (JP); Takayuki Mizutani, Edina, MN (US); Hitoshi Narita, Tokyo (JP); Kazuki Umebara, Shizuoka (JP)

(73) Assignee: Beckman Coulter, Inc., Brea, CA (US)

( * ) Notice: Subject to any disclaimer, the term of this patent is extended or adjusted under 35 U.S.C. 154(b) by 661 days.

(21) Appl. No.: 16/641,748

(22) PCT Filed: Aug. 24, 2018

(86) PCT No.: PCT/US2018/047983
§ 371 (c)(1),
(2) Date: Feb. 25, 2020

(87) PCT Pub. No.: WO2019/040894
PCT Pub. Date: Feb. 28, 2019

(65) Prior Publication Data
US 2020/0264207 A1      Aug. 20, 2020

Related U.S. Application Data

(60) Provisional application No. 62/550,440, filed on Aug. 25, 2017.

(51) Int. Cl.
*G01N 35/10*          (2006.01)

(52) U.S. Cl.
CPC . *G01N 35/1016* (2013.01); *G01N 2035/1025* (2013.01); *G01N 2035/1032* (2013.01)

(58) Field of Classification Search
None
See application file for complete search history.

(56) References Cited

U.S. PATENT DOCUMENTS

| | | | |
|---|---|---|---|
| 5,773,305 A | 6/1998 | Zabetakis et al. | |
| 6,066,297 A | 5/2000 | Torti et al. | |
| 6,074,611 A | 6/2000 | Flesher | |

(Continued)

FOREIGN PATENT DOCUMENTS

| | | |
|---|---|---|
| EP | 0411620 A2 | 2/1991 |
| EP | 1306675 A1 | 5/2003 |

(Continued)

OTHER PUBLICATIONS

"European Application Serial No. 18766447.9, Response to Communication Pursuant to Rules 161 and 162 filed Oct. 21, 2020", 33 pgs.

(Continued)

*Primary Examiner* — Brian R Gordon
(74) *Attorney, Agent, or Firm* — Kinney & Lange, P.A.

(57) ABSTRACT
A substance dispense system is provided for a biological sample analysis instrument. The substance dispense system can operate to prepare a fluidic substance, such as a sample, using a dispense tip in different operational modes based on the volume of the fluid substance to be prepared. The substance dispense system thereby improves accuracy and/ or precision in pipetting with the dispense tip.

22 Claims, 41 Drawing Sheets

(56) References Cited

U.S. PATENT DOCUMENTS

| | | | |
|---|---|---|---|
| 6,119,533 | A | 9/2000 | Gherson et al. |
| 6,121,049 | A | 9/2000 | Dorenkott et al. |
| 6,158,269 | A | 12/2000 | Dorenkott et al. |
| 6,244,119 | B1 | 6/2001 | Theran |
| 6,322,752 | B1 | 11/2001 | Siddiqui et al. |
| 6,370,942 | B1 | 4/2002 | Dunfee et al. |
| 6,579,497 | B2 | 6/2003 | Woodward |
| 6,780,381 | B2 | 8/2004 | Yiu |
| 6,793,891 | B2 | 9/2004 | Yiu |
| 6,869,571 | B2 | 3/2005 | Ingenhoven et al. |
| 6,923,938 | B2 | 8/2005 | Cote et al. |
| 7,205,158 | B2 | 4/2007 | Pankratz et al. |
| 7,267,801 | B2 | 9/2007 | Hitch et al. |
| 7,270,789 | B1 | 9/2007 | Astle |
| 7,429,360 | B2 | 9/2008 | Kuresh et al. |
| 7,439,076 | B1 * | 10/2008 | Tokiwa ............... G01N 35/1016 |
| | | | 422/562 |
| 7,477,997 | B2 | 1/2009 | Kaplit |
| 7,485,464 | B2 | 2/2009 | Platano et al. |
| 7,537,735 | B2 | 5/2009 | Hiemer et al. |
| 7,540,205 | B2 | 6/2009 | Nelson et al. |
| 7,603,899 | B2 * | 10/2009 | Li .......................... G01F 23/266 |
| | | | 73/304 C |
| 7,634,378 | B2 | 12/2009 | Kaplit |
| 7,661,326 | B2 | 2/2010 | Li et al. |
| 7,867,769 | B2 | 1/2011 | Dunfee et al. |
| 7,926,325 | B2 | 4/2011 | Kaplit |
| 7,981,384 | B2 | 7/2011 | Nagai et al. |
| 8,012,766 | B2 | 9/2011 | Graham |
| 8,033,188 | B2 | 10/2011 | Kalmakis et al. |
| 8,061,220 | B2 | 11/2011 | Laing et al. |
| 8,117,925 | B2 | 2/2012 | Yiu |
| 8,252,235 | B2 | 8/2012 | Shibata et al. |
| 8,354,078 | B2 | 1/2013 | Shohmi et al. |
| 8,460,617 | B2 | 6/2013 | Schacher et al. |
| 8,920,752 | B2 * | 12/2014 | Tisone ................... C12M 41/00 |
| | | | 506/37 |
| 9,079,178 | B2 | 7/2015 | Sheldon |
| 9,103,809 | B2 | 8/2015 | West et al. |
| 10,435,737 | B2 * | 10/2019 | Du ...................... G01N 35/1016 |
| 2006/0228807 | A1 | 10/2006 | Nagai et al. |
| 2013/0143257 | A1 * | 6/2013 | Small ........................ G01N 1/38 |
| | | | 435/29 |
| 2014/0106467 | A1 * | 4/2014 | Hutter ................ G01N 35/1016 |
| | | | 436/180 |

FOREIGN PATENT DOCUMENTS

| | | |
|---|---|---|
| JP | 2010071766 A | 4/2010 |
| WO | WO-2019040894 A1 | 2/2019 |
| WO | WO-2019040894 A9 | 5/2019 |

OTHER PUBLICATIONS

"International Application Serial No. PCT/US2018/047983, International Preliminary Report on Patentability mailed Mar. 5, 2020", 11 pgs.

"International Application Serial No. PCT/US2018/047983, International Search Report mailed Jan. 21, 2019", 6 pgs.

"International Application Serial No. PCT/US2018/047983, Invitation to Pay Additional Fees mailed Nov. 30, 2018", 11 pgs.

"International Application Serial No. PCT/US2018/047983, Written Opinion mailed Jan. 21, 2019", 9 pgs.

Seiya Takahashi et al., "A Study of Liquid Dispensing Head Using Fluidic Inertia," 2002, Jpn. J. Appl. Phys., No. 41.

Y. Liu et al., "Automated Dispensing System for Biologic Viscous Micro-drop," 2009, Journal of Mechanical Engineering, No. 2, pp. 100-105.

Chinese Search Report for Chinese Patent Application No. 201880062077.8, dated Aug. 24, 2025, four pages.

Communication pursuant to Article 94(3) EPC for European Patent Application No. 24218672.4, dated Jun. 12, 2026, five pages.

* cited by examiner

| ASPIRATION AMOUNT FROM SV | ASPIRATION HEIGHT (H1) (mm) | DOWNWARD PULSE (X) |
|---|---|---|
| 2 µL | 5.33 | 186 |
| 5 µL | 5.22 | 187 |
| 25 µL | 4.51 | 193 |
| 100 µL | 1.86 | 215 |

314  316  318

310

SV filling Volume for aspirate : 165 µL (Liquid height from bottom: 6.4mm)

*FIG. 9*

| TARGET SAMPLE VOLUME (µL) | ASPIRATION (DRAW) VOLUME (V1) (µL) | PUSH-BACK VOLUME (V2) (µL) |
|---|---|---|
| 10 | 15.0 | 5.0 |
| 5 | 10.0 | 5.0 |
| 5 | 7.0 | 2.0 |
| 2 | 10.0 | 9.3 |
| 1 | 3.0 | 3.5 |

| AMOUNT DISPENSE TO RV | DISPENSE HEIGHT (H2) (mm) | DOWNWARD PULSE (X) |
|---|---|---|
| 2 µL | 0.93 | 223 |
| 5 µL | 1.04 | 222 |
| 25 µL | 1.74 | 216 |
| 100 µL | 4.40 | 194 |

RV filling Volume for dispense: 65 µL
(Liquid height from bottom: 2.8mm)

*FIG. 14*

402 — DESCEND DISPENSE TIP AT ASPIRATION HEIGHT WITHIN SAMPLE VESSEL BASED ON TIP ASPIRATION HEIGHT TABLE

404 — ASPIRATE FIRST VOLUME (GREATER THAN TARGET SAMPLE VOLUME) FROM SAMPLE VESSEL

406 — ASCEND DISPENSE TIP

400

430

432 — DESCEND DISPENSE TIP AT FIRST HEIGHT WITHIN REACTION VESSEL

434 — DISPENSE SAMPLE TO REACTION VESSEL

436 — DESCEND DISPENSE TIP AT SECOND HEIGHT BASED ON TIP DISPENSATION HEIGHT TABLE

438 — ASCEND DISPENSE TIP

440 — ASPIRATE AIR

| TOTAL VOLUME IN DV (µL) | MIXING DISPENSE (PUSH-OUT) VOLUME (µL) | MIXING ASPIRATE (DRAW) VOLUME At 2nd Time (µL) | MIXING ASPIRATE (DRAW) VOLUME At Other Times (µL) |
|---|---|---|---|
| 50 | 20 | 27 | 20 |
| 60 | 30 | 37 | 30 |
| 70 | 40 | 47 | 40 |
| 80 | 50 | 57 | 50 |
| > 80 | 50 | 57 | 50 |

DILUTION - Sample Vessel → Dilution Vessel → Reaction Vessel

Impact of Number of Syringe strokes

SUBSTANCE DISPENSE SYSTEM FOR BIOLOGICAL SAMPLE ANALYSIS INSTRUMENT

This application is a U.S. National Stage Filing under 35 U.S.C. 371 from International Application No. PCT/US2018/047983, filed on Aug. 24, 2018, and published as WO 2019/040894 A1 on Feb. 28, 2019, and later corrected as WO 2019/040894 A9 on May 31, 2019, which application claims the benefit of priority to U.S. Provisional patent application Ser. No. 62/550,440, filed Aug. 25, 2017, the entire disclosure of which are incorporated by reference in their entirety.

BACKGROUND

Some biological sample analysis instruments utilize a substance preparation system for preparing fluidic substances, such as blood samples and reagents, for analysis. Ill-prepared fluidic substances can cause false results, which are not easily detected. In some cases, such a substance preparation system operates to aliquot, aspirate, and dispense fluidic substances with various containers, such as pipetting tips, sample vessels, dilution vessels, and reaction vessels. Fluctuation in an aliquoted, aspirated, and dispensed amount of fluidic substances within such containers relative to a desired amount can affect the analysis results and degrade reliability of the analysis. Therefore, there is need for accurately preparing a desired amount of substance to ensure reliable results.

SUMMARY

In general terms, this disclosure is directed to a substance dispense system for a biological sample analysis instrument. In one possible configuration and by non-limiting example, the substance dispense system includes a pipetting system and a precision dispense control device for operating the pipetting system. Various aspects are described in this disclosure, which include, but are not limited to, the following aspects.

One aspect is a method for preparing a fluidic substance for evaluation. The method may include aspirating a first volume of the fluidic substance from a first vessel to a dispense tip; and dispensing a second volume of the fluidic substance from the dispense tip to a second vessel by: dispensing the second volume of the fluidic substance from the dispense tip to the second vessel; and rinsing the dispense tip using at least a portion of the fluidic substance from the second vessel.

In certain examples, the step of rinsing the dispense tip may include aspirating a third volume of the fluidic substance from the second vessel to the dispense tip; and dispensing a fourth volume of the fluidic substance from the dispense tip to the second vessel.

In certain examples, the method may further include dispensing the third volume of the fluidic substance; and again aspirating the third volume of the fluidic substance.

In certain examples, the method may further include repeating the steps of dispensing and aspirating the third volume.

In certain examples, the third volume and the fourth volume are equal.

In certain examples, the dispense tip may include a disposable dispense tip.

In certain examples, the second vessel includes a dilution vessel. In certain examples, the second vessel includes a reaction vessel. In certain examples, the first vessel includes a sample vessel.

In certain examples, the step of aspirating a first volume of the fluidic substance may include aspirating a fifth volume of the fluidic substance from the first vessel to the dispense tip; and dispensing a sixth volume of the fluidic substance from the dispense tip to the first vessel to contain the first volume of the fluidic substance in the dispense tip.

In certain examples, the first volume is less than 25 μL. In certain examples, the first volume is less than 20 μL. In certain examples, the first volume is less than 30 μL.

In certain examples, the sixth volume is greater than the fifth volume.

In certain examples, the first volume is equal to the second volume.

In certain examples, the first vessel includes a sample vessel containing an aliquoted volume of fluidic substance, and the second vessel includes a reaction vessel.

In certain examples, the first vessel includes a sample tube. In certain examples, the second vessel includes a sample vessel.

In certain examples, the method may further include prior to aspirating a first volume of the fluidic substance, determining a surface level of the fluidic substance contained in the first vessel.

In certain examples, the step of determining a surface level of the fluidic substance may include lowering the dispense tip into the first vessel; detecting a pressure increase at a distal end of the dispense tip; and calculating the surface level of the fluidic substance based on the pressure increase.

In certain examples, the step of calculating a surface level of the fluidic substance includes: determining a travel distance of the dispense tip until the pressure increase is detected; and calculating the surface level of the fluidic substance based on the travel distance.

In certain examples, the step of determining a surface level of the fluidic substance further includes: prior to detecting a pressure increase, ejecting air from the dispense tip; and after detecting the pressure increase and prior to aspirating a first volume, equalizing a pressure inside the dispense tip with the atmosphere.

In certain examples, the step of equalizing a pressure inside the dispense tip with the atmosphere includes opening a valve arranged between the dispense tip and a syringe assembly.

In certain examples, the step of determining a surface level of the fluidic substance further includes determining that the pressure increase is greater than a threshold value.

Another aspect is an apparatus for dispensing a fluidic substance. The apparatus may include a pipetting system and a dispense control system. The pipetting system may include a sample pipetting module configured to engage a dispense tip. The dispense control system operates to control the pipetting system to aspirate a first volume of the fluidic substance from a first vessel to the dispense tip; and dispense a second volume of the fluidic substance from the dispense tip to a second vessel by: dispensing the second volume of the fluidic substance from the dispense tip to the second vessel; and rinsing the dispense tip using at least a portion of the fluidic substance from the second vessel.

In certain examples, the dispense control system may further control the pipetting system to aspirate a third volume of the fluidic substance from the second vessel to the dispense tip; and dispense a fourth volume of the fluidic substance from the dispense tip to the second vessel.

In certain examples, the dispense control system may further control the pipetting system to dispense the third volume of the fluidic substance; and again aspirate the third volume of the fluidic substance.

In certain examples, the dispense control system may further control the pipetting system to repeat the steps of dispensing and aspirating the third volume.

In certain examples, the third volume and the fourth volume are equal. In certain examples, the dispense tip includes a disposable dispense tip. In certain examples, the second vessel includes a dilution vessel. In certain examples, the second vessel includes a reaction vessel. In certain examples, the first vessel includes a sample vessel.

In certain examples, the dispense control system may further control the pipetting system to aspirate a first volume of the fluidic substance by aspirating a fifth volume of the fluidic substance from the first vessel to the dispense tip; and dispensing a sixth volume of the fluidic substance from the dispense tip to the first vessel to contain the first volume of the fluidic substance in the dispense tip.

In certain examples, the first volume is less than 25 µL. In certain examples, the first volume is less than 20 µL. In certain examples, the first volume is less than 30 µL.

In certain examples, the sixth volume is greater than the fifth volume. In certain examples, the first volume is equal to the second volume.

In certain examples, the first vessel includes a sample vessel containing an aliquoted volume of fluidic substance, and the second vessel includes a reaction vessel. In certain examples, the first vessel includes a sample tube. In certain examples, the second vessel includes a sample vessel.

In certain examples, the dispense control system may further control the pipetting system to, prior to aspirating a first volume of the fluidic substance, determine a surface level of the fluidic substance contained in the first vessel.

In certain examples, the dispense control system may further control the pipetting system to lower the dispense tip into the first vessel; detect a pressure increase at a distal end of the dispense tip; and calculate the surface level of the fluidic substance based on the pressure increase.

In certain examples, the dispense control system may further control the pipetting system to: determine a travel distance of the dispense tip until the pressure increase is detected; and calculate the surface level of the fluidic substance based on the travel distance.

In certain examples, the dispense control system may further control the pipetting system to, prior to detecting a pressure increase, eject air from the dispense tip; and, after detecting the pressure increase and prior to aspirating a first volume, equalize a pressure inside the dispense tip with the atmosphere.

In certain examples, the dispense control system may further control the pipetting system to equalize a pressure inside the dispense tip with the atmosphere by opening a valve arranged between the dispense tip and a syringe assembly.

In certain examples, the dispense control system may further control the pipetting system to determine that the pressure increase is greater than a threshold value.

Yet another aspect is a method for preparing a sample for evaluation. The method may include aspirating a volume of a sample from a first vessel to a dispense tip; and diluting the sample by dispensing the volume of the sample from the dispense tip to a dilution vessel, the dilution vessel containing a diluent; and rinsing the dispense tip using at least a portion of a fluidic substance from the dilution vessel, the fluidic substance containing the sample and the diluent.

In certain examples, the step of rinsing the dispense tip may include aspirating a first volume of the fluidic substance from the dilution vessel to the dispense tip; and dispensing the first volume of the fluidic substance from the dispense tip to the dilution vessel.

In certain examples, the method may further include repeating the steps of aspirating the first volume of the fluidic substance and dispensing the first volume of fluidic substance.

In certain examples, the method may further include after diluting the sample, aspirating only a portion of the fluidic substance from the dilution vessel to the dispense tip; moving the dispense tip to a second vessel; and dispensing at least a portion of the aspirated fluidic substance from the dispense tip to the second vessel.

Yet another aspect is an apparatus for preparing a substance for evaluation. The apparatus may include a pipetting system including a sample pipetting module, the sample pipetting module configured to engage a dispense tip; and a dispense control system controlling the pipetting system to aspirate a volume of a sample from a first vessel to the dispense tip; and dilute the sample by dispensing the volume of the sample from the dispense tip to a dilution vessel, the dilution vessel containing a diluent; and rinsing the dispense tip using at least a portion of a fluidic substance from the dilution vessel, the fluidic substance containing the sample and the diluent.

In certain examples, the dispense control system may further control the pipetting system to aspirate a first volume of the fluidic substance from the dilution vessel to the dispense tip; and dispense the first volume of the fluidic substance from the dispense tip to the dilution vessel.

In certain examples, the dispense control system may further control the pipetting system to repeat the steps of aspirating the first volume of the fluidic substance and dispensing the first volume of fluidic substance.

In certain examples, the dispense control system may further control the pipetting system to, after diluting the sample, aspirate only a portion of the fluidic substance from the dilution vessel to the dispense tip; move the dispense tip to a second vessel; and dispense at least a portion of the aspirated fluidic substance from the dispense tip to the second vessel.

In yet another aspect is a method for preparing a fluidic substance for evaluation. The method may include aspirating a first volume of the fluidic substance from a first vessel to a dispense tip; and dispensing a second volume of the fluidic substance from the dispense tip to a second vessel by lowering the dispense tip into the second vessel at a first height, the first height configured such that a distal end of the dispense tip remains above a surface level in the second vessel after dispensation; dispensing the fluidic substance from the dispense tip to the second vessel; and lowering the dispense tip to a second height, the second height configured such that the distal end of the dispense tip touches the surface level in the second vessel after the dispensation.

In certain examples, the step of dispensing a second volume of the fluidic substance may further include detecting, using a sensor, whether the fluidic substance in the second vessel contacts the distal end of the dispense tip; and transmitting a signal from the sensor to a control device, the signal usable by the control device to stop moving the dispense tip.

In certain examples, the first volume is greater than the second volume. In certain examples, the second volume is greater than 25 μL.

In yet another aspect is an apparatus for preparing a fluidic substance for evaluation. The apparatus may include a pipetting system including a sample pipetting module, the sample pipetting module configured to engage a dispense tip; and a dispense control system controlling the pipetting system to aspirate a first volume of the fluidic substance from a first vessel to a dispense tip; and dispense a second volume of the fluidic substance from the dispense tip to a second vessel by lowering the dispense tip into the second vessel at a first height, the first height configured such that a distal end of the dispense tip remains above a surface level in the second vessel after dispensation; dispensing the fluidic substance from the dispense tip to the second vessel; and lowering the dispense tip to a second height, the second height configured such that the distal end of the dispense tip touches the surface level in the second vessel after the dispensation.

In certain examples, the dispense control system may further control the pipetting system to: detect, using a sensor, whether the fluidic substance in the second vessel contacts the distal end of the dispense tip; and transmit a signal from the sensor to a control device, the signal usable by the control device to stop moving the dispense tip.

In certain examples, the first volume is greater than the second volume. In certain examples, the second volume is greater than 25 μL.

In yet another aspect is a method for preparing a fluidic substance for evaluation. The method may include determining a volume of a fluidic substance being dispensed to a vessel; upon determining that the volume is less than a reference value, dispensing the fluidic substance to a vessel in a first operational mode; and upon determining that the volume is not less than the reference value, dispensing the fluidic substance to the vessel in a second operational mode.

In yet another aspect is an apparatus for preparing a fluidic substance for evaluation. The apparatus may include a pipetting system including a sample pipetting module, the sample pipetting module configured to engage a dispense tip; and a dispense control system controlling the pipetting system to determine a volume of a fluidic substance being dispensed to a vessel; upon determining that the volume is less than a reference value, dispense the fluidic substance to a vessel in a first operational mode; and upon determining that the volume is not less than the reference value, dispense the fluidic substance to the vessel in a second operational mode.

BRIEF DESCRIPTION OF THE DRAWINGS

FIG. 9 is an example table for a dispense tip height for aspiration.

FIG. 10 is an example table for overdraw and push-back amounts for target sample volumes.

FIG. 14 is an example table for a dispense tip height for dispensation.

FIG. 31 is an example table for draw and push-back volumes for dilution.

FIG. 41 is a graph that illustrates an example set of experiments performed using the system of the present disclosure.

DETAILED DESCRIPTION

Figure 1:
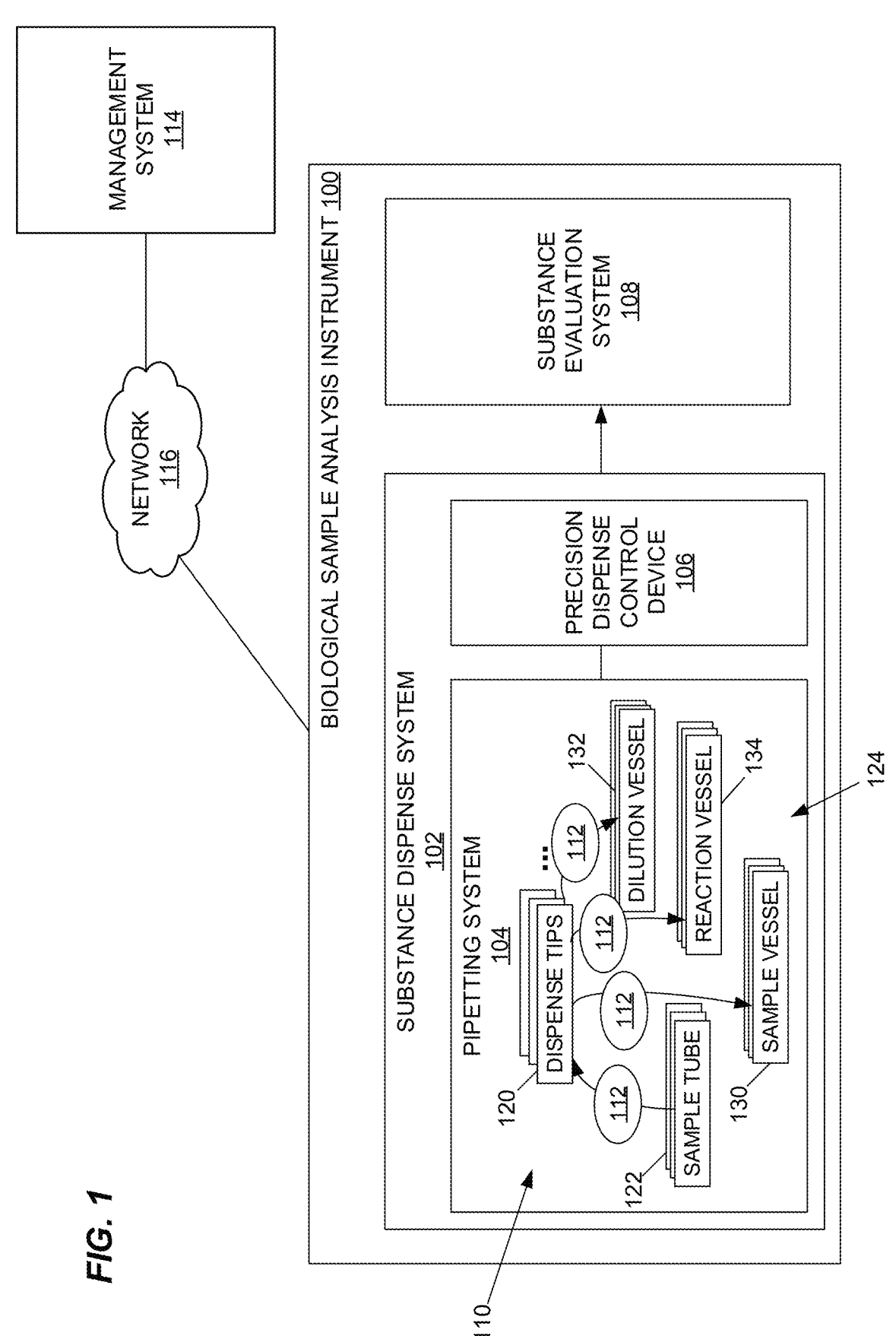
FIG. 1 schematically illustrates an example instrument for analyzing a biological sample.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, a substance dispense system of the present disclosure improves the accuracy and/or precision of pipetting, For example, the system of the present disclosure enables accurate and/or precise pipetting with a disposable tip (i.e., dispo-tip pipetting). The pipetting method described in the present disclosure can be based on statistical experimentation to improve accuracy and/or precision. In some examples, higher precisions configurations and/or methods can be achieved by characterizing various parameters. The system of the present disclosure allows decreasing instrument cycle time while maintaining adequate precision. An example result of such experiments is described herein with reference to FIG. 41.

Figure 35:
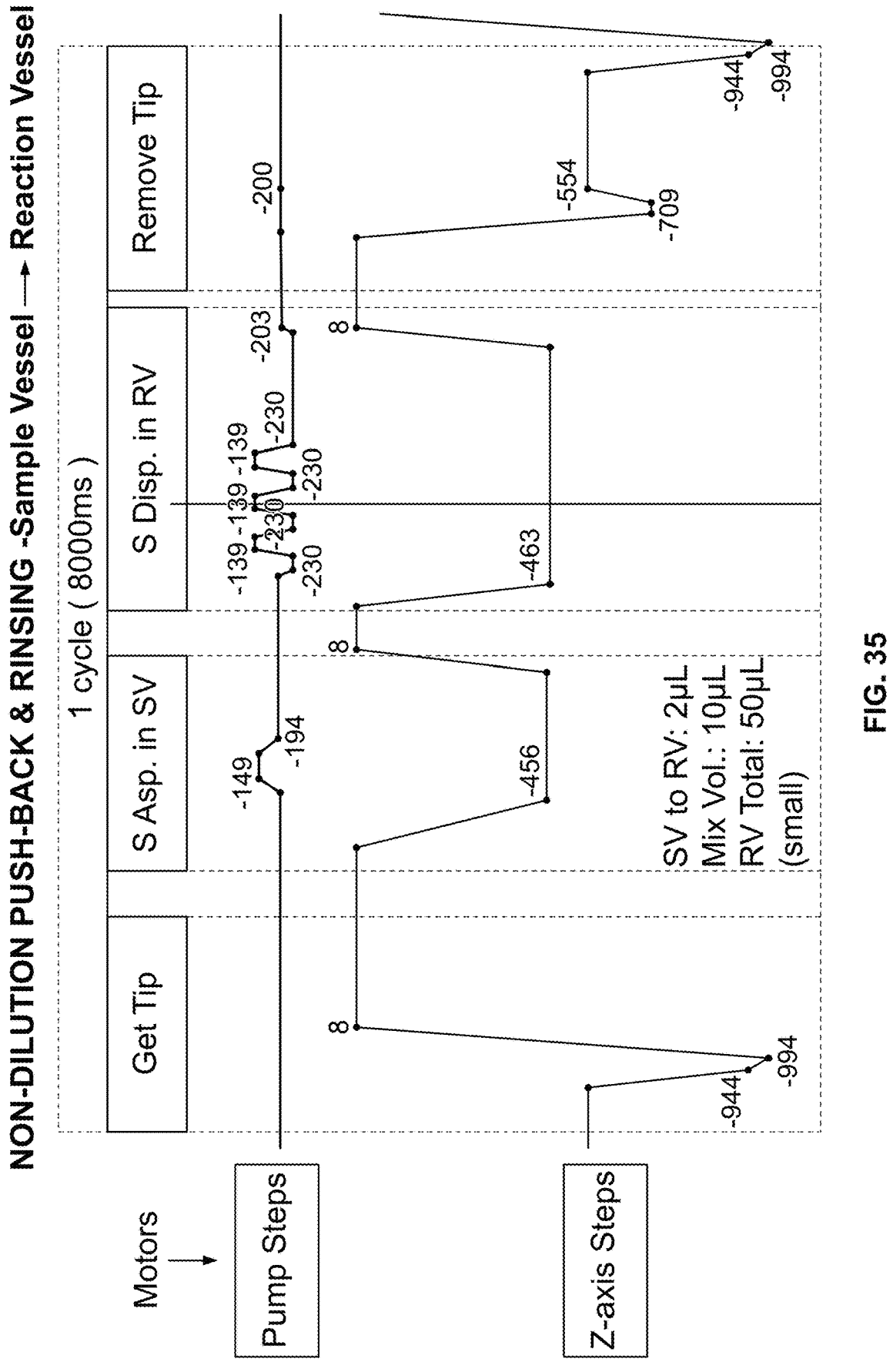
FIG. 35 is a timing diagram that illustrates example pump motor steps and vertical drive motor steps over cycle time when a small volume of sample pipetting is performed without dilution.
Figure 36:
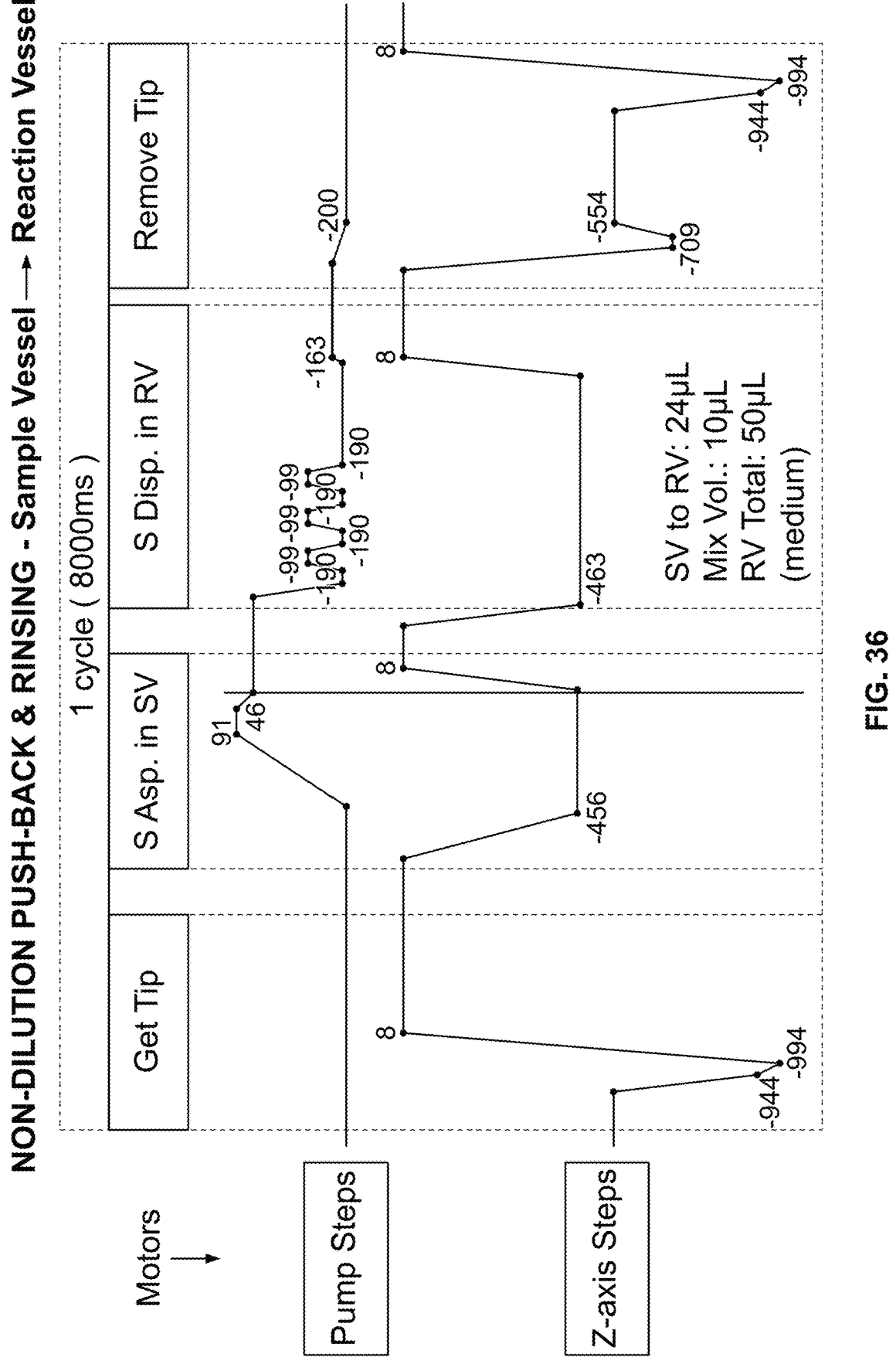
FIG. 36 is a timing diagram that illustrates example pump motor steps and vertical drive motor steps over cycle time when a medium volume of sample pipetting is performed without dilution.
Figure 37:
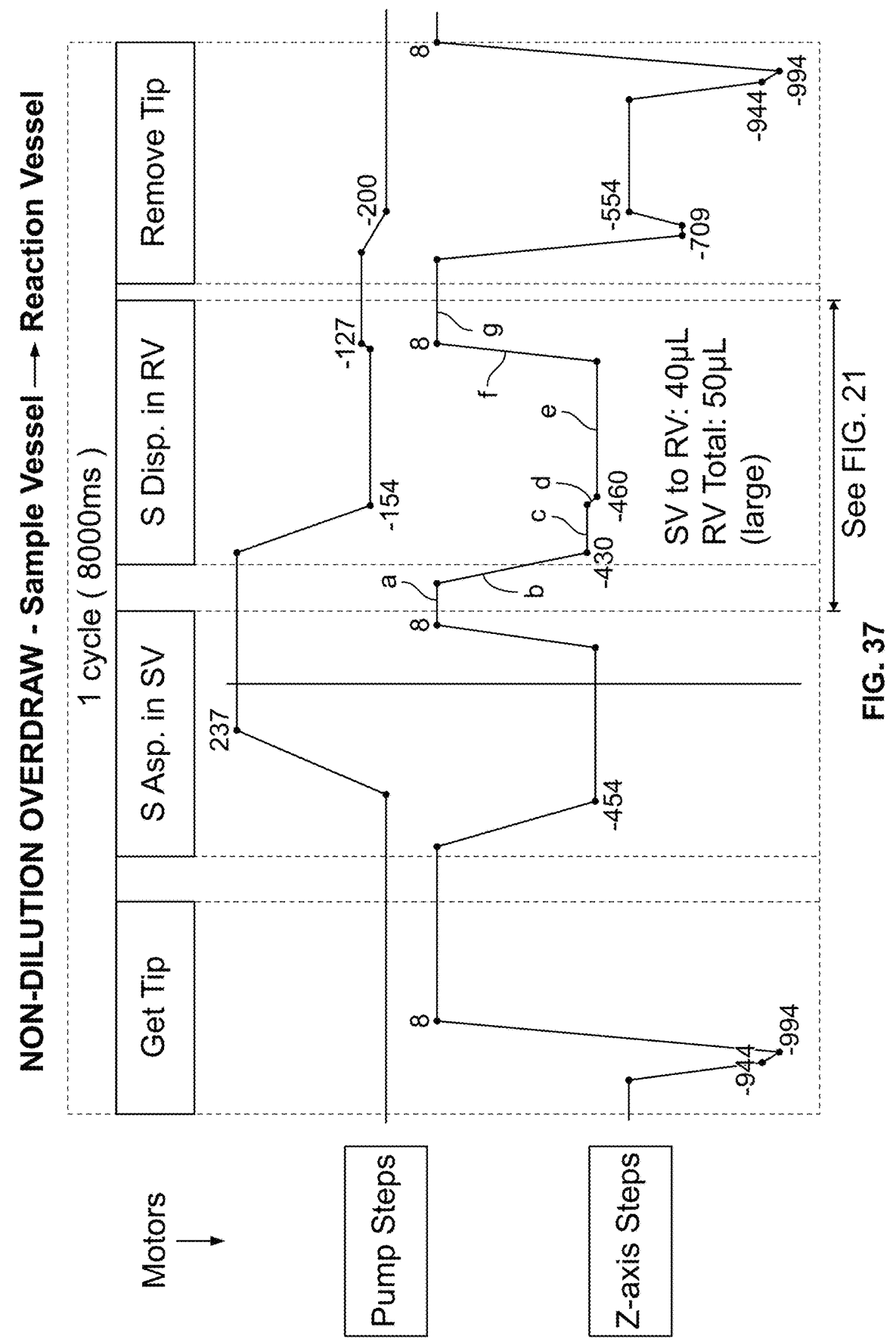
FIG. 37 is a timing diagram that illustrates example pump motor steps and vertical drive motor steps over cycle time when a large volume of sample pipetting is performed without dilution.

The system of the present disclosure also improves the dilution and volume range of pipetting. In an exemplary embodiment, the system can process samples as small as 2 µL and as large as 100 µL. Further, in an exemplary embodiment, the system can operates in multiple modes for different pipetting volumes. For example, a first mode can be used for a range of 0-25 µL ("small" volume as shown in FIG. 35), a second mode can be used for a range of 25-50 µL ("medium" volume as shown in FIG. 36), and third mode can be used for a range of 50-100 µL ("large" volume as shown in FIG. 37). In some embodiments, if the sample volume is less than 25 µL, a plurality of mixing strokes (e.g., three times) can be performed. If the sample volume is equal to or greater than 25 µL, no mixing stroke is performed, which may save an overall processing time.

FIG. 1 schematically illustrates an example instrument 100 for analyzing a biological sample. In some embodiments, the instrument 100 includes a substance dispense system 102 which includes a pipetting system 104 and a precision dispense control system 106. In other embodiments, the instrument 100 further includes a substance evaluation system 108. One or more containers 110 are used to contain, move, and receive fluidic substances 112 and utilized by at least one of the systems 102 and 108 of the instrument 100. In some embodiments, the instrument 100 is automated or semi-automated, wherein the containers 110 are used by the instrument 100 independent of a human operator of the instrument, or with minimal intervention from an operator.

The biological sample analysis instrument 100 operates to analyze a biological sample for various purposes. In some embodiments, the biological sample analysis instrument 100 includes a blood sample analysis instrument or apparatus. In some embodiments, the biological sample analysis instrument 100 operates to collect, test, process, store, and/or transfuse blood and its components, for example. The blood collection may occur at donor centers. The collected blood and its components are then often processed, tested, and distributed at or through blood banks or clinical laboratories.

The substance dispense system 102 utilizes containers 110 and operates to aliquot, aspirate, and dispense fluidic substances 112 using the containers 110. The containers 110 are used to prepare one or more substances to be analyzed by the substance evaluation system 108. The containers 110 can be of various types, such as specimen tubes (also referred to herein as sample tubes), pipetting tips, and vessels. In some embodiments, the containers 110 can include one or more dispense tips 120, one or more tubes 122, and one or more vessels 124. Other types of containers can be used in the instrument 100 in other embodiments.

Dispense tips 120 are provided to the substance dispense system 102 to aliquot or aspirate substances 112 from other containers, such as tubes 122 or vessels 124. For example, the dispense tips 120 are used to aliquot samples from specimen tubes or aspirate samples or reagents from sample vessels or reagent vessels. One example of the dispense tip is Part No. MIS_PRT-000024938, available from Beckman Coulter, Inc., Brea, California. As described herein, some embodiments of the pipetting tips are disposable after a single use or multiple uses.

A tube 122 is a sterile glass or plastic tube with a closure to contain a substance 112. In some examples, the tube 122 includes a sample tube or a specimen tube containing blood sample. In some embodiments, the tube 122 is configured to be evacuated to create a vacuum inside the tube facilitating the draw of a predetermined volume of substance therein.

Vessels 124 are provided to the substance dispense system 102 to contain substances 112 for preparation and analysis. In some embodiments, the substance dispense system 102 aspirates substances 112 from vessels 124, and/or dispenses substances 112 into vessels 124. Examples of vessels 124 include a sample vessel 130, a dilution vessel 132, and a reaction vessel 134.

In some embodiments, the dispense tips 120, the tubes 122, and the vessels 124 are configured to be hydrophobic. For example, the dispense tips 120, the tubes 122, and the vessels 124 can be made of hydrophobic materials so that their surfaces do not wet and instead bead liquid.

In the illustrated example of a blood sample analysis, the fluidic substances 112 can be any of a blood sample, a diluent, and a reagent, or any mixture thereof. In some embodiments, the fluidic substance 112 is a fluid of single substance. In other embodiments, the fluidic substance 112 is a mixture of a plurality of substances. In various embodiments, the fluidic substance 112 may be a sample to be subjected to analysis, sample preparation components, diluents, buffers, reagents, or any combinations of the foregoing. Where the fluidic substance 112 involves blood or its components, examples of the fluidic substance 112 include whole blood, blood plasma, serum, red blood cells, white blood cells, platelets, diluents, reagents, or any combinations thereof. In other embodiments, the fluidic substances 112 can be of any types suitable for being dispensed on a container or tray and presented for further analysis. Furthermore, the fluidic substance can be other types of bodily fluidic substances, such as saliva, cerebral spinal fluid, urine, amniotic fluid, urine, feces, mucus, cell or tissue extracts, nucleic acids, or any other type of bodily fluid, tissue or material which is suspected of containing an analyte of interest.

The pipetting system 104 operates to deliver fluidic substances 112 using containers 110. For example, the pipetting system 104 may be fluidly connected to one or more containers for delivery of reagents, diluents and buffers, for example. An example of the pipetting device is described and illustrated in more detail with reference to FIG. 2.

The precision dispense control system 106 operates to control dispensation of fluidic substances 112 using the containers 110. For example, the precision dispense control system 106 controls the pipetting system 104 and other devices of the substance dispense system 102 to accurately dispense a fluidic substance 112 into a container 110 (e.g., a vessel 124) as intended for subsequent analysis by, for example, the substance evaluation system 108. An inappropriate dispensation of a fluidic substance can cause a false result that may be indistinguishable from a true result, for example, or may otherwise compromise the operation of the biological sample analysis instrument 100.

The substance evaluation system 108 operates to evaluate the fluidic substances 112 that are provided using the containers 110. By way of example, the substance evaluation system 108 performs blood donor screening, blood transfusion inspection, and/or clinical diagnoses. Other types of analysis or evaluation can be performed by the substance evaluation system 108 for various purposes. By way of examples, the substance evaluation system 108 may utilize any known analytic method and detection systems to analyze a plurality of fluidic substances 112. Common examples include spectrophotometric detection and analysis to perform clinical chemistry testing, immunoassays, microbiological identification and antibiotic susceptibility testing, and nucleic acid testing using fluorescent-labeled primers and probes. Other analytical methods compatible with semi-automated or automated sample handling on trays are also known and compatible with the principles of the present disclosure. Some biological sample analysis instruments 100 may be user configurable for selection of a substance evaluation system 108 suitable for a variety of research or diagnostic analysis.

With continued reference to FIG. 1, in some embodiments, the instrument 100 operates to communicate with a management system 114 via a data communication network 116. For example, the instrument 100 includes a communication device (such as a communication device 846 in FIG. 34) through which the instrument 100 communicates with the management system 114.

In some embodiments, the management system 114 is remotely located from the instrument 100 and configured to perform diagnosis based on data from the instrument 100. In addition, the instrument 100 can evaluate performance of the instrument and generate a report. One example of the management system 114 includes one or more computing devices executing ProService Remote Service Application available from Beckman Coulter, Inc., Brea, CA.

The Beckman Coulter ProService Remote Service Application can provide a secure and continuous connection between the biological sample analysis instrument 100 and a remote diagnosis command center (e.g., the management system 114) over a network (e.g., the network 116) using a Remote Application Processor (RAP) box. The RAP box can connect the biological sample analysis instrument 100 to the remote diagnosis command center by way of the Internet via Ethernet port, Wi-Fi, or cellular network. The biological sample analysis instrument 100 can send the instrument data, such as instances of flagged trays, to the RAP box. The RAP box can then secure this data and forward it to the remote diagnosis command center. All communications between the biological sample analysis instrument 100 and the remote diagnosis command center can be coordinated through the RAP box. The RAP box can connect to the network using a static or Dynamic Host Configuration Protocol (DHCP) IP address. The RAP box can be a hardware having computer processing boards and connection ports capable of providing a secure transfer of instrument data from the biological sample analysis instrument 100 to the remote diagnosis command center. For example, the RAP box can have one or more Ethernet connection ports, one or more computer processing boards for Wi-Fi or cellular network connectivity, an electrical outlet connection port, or any combination of the foregoing.

The RAP box can have an internal firewall to provide a secure and continuous transfer of instrument data from the biological sample analysis instrument 100 and the remote diagnosis command center. This internal firewall can create a private instrument network which isolates the biological sample analysis instrument 100 from other network traffic that exists on the network. Furthermore, the RAP box can secure the data transmission from the one or more analyzers to the biological sample analysis instrument 100 by the following one or more mechanisms. First, the outbound-initiated data messages are secured via encryption and sent through a firewall via HTTPS on Port 443, the standard port for secure Internet usage. Data is transmitted during Secure Sockets Layer (SSL), which is a protocol for transmitting information securely via the Internet. SSL creates a secure connection between a client and a server, over which data can be sent securely. Dual certification authentication helps prevent unauthorized access to transmitted data. An example of a SSL connection is the 128 bit AES, FIPS compliant encryption algorithm. Another mechanism that the RAP box can secure the data is using a Remote Desktop Sharing (RDS) session. An RDS session is held through a secure Virtual Private Network (VPN) tunnel, which encapsulates the session between the biological sample analysis instrument 100 and the remote diagnosis command center to ensure no third-party interception of the data being shared.

Referring still to FIG. 1, the data communication network 116 communicates digital data between one or more computing devices, such as between the instrument 100 and the management system 114. Examples of the network 116 include a local area network and a wide area network, such as the Internet. In some embodiments, the network 116 includes a wireless communication system, a wired communication system, or a combination of wireless and wired communication systems. A wired communication system can transmit data using electrical or optical signals in various possible embodiments. Wireless communication systems typically transmit signals via electromagnetic waves, such as in the form of optical signals or radio frequency (RF) signals. A wireless communication system typically includes an optical or RF transmitter for transmitting optical or RF signals, and an optical or RF receiver for receiving optical or RF signals. Examples of wireless communication systems include Wi-Fi communication devices (such as utilizing wireless routers or wireless access points), cellular communication devices (such as utilizing one or more cellular base stations), and other wireless communication devices.

Figure 2:
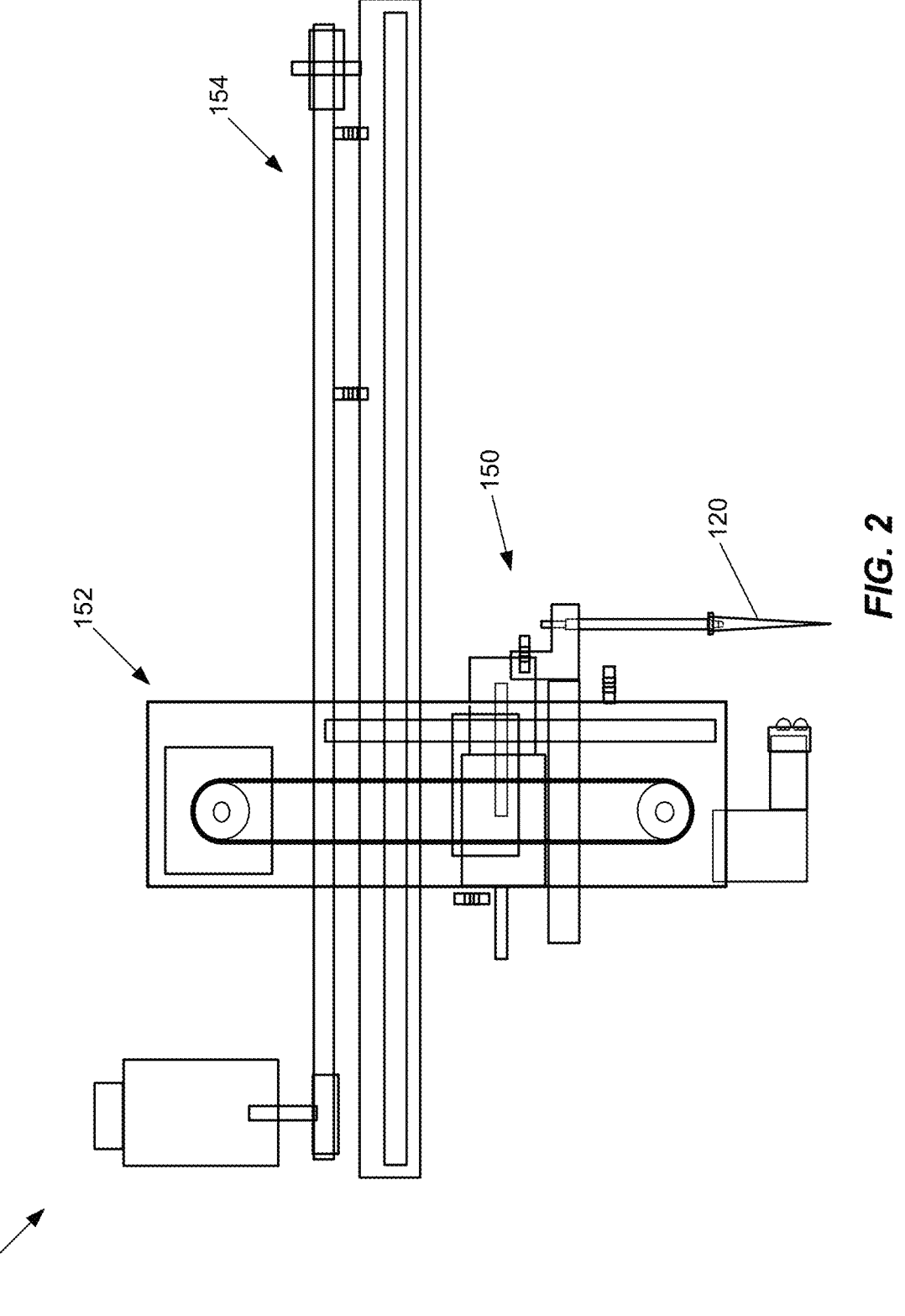
FIG. 2 is a schematic diagram of an example pipetting system.

FIG. 2 is a schematic diagram of an example pipetting system 104. The pipetting system 104 includes a sample pipetting module 150, a vertical transfer device 152, and a horizontal transfer device 154.

In the illustrated example, the pipetting system 104 is a sample pipetting system. In this document, the pipetting system 104 is also referred to as the sample pipetting system 104. The sample pipetting system 104 performs various pipetting operations.

The sample pipetting module 150 operates to receive a dispense tip (also referred to herein as a pipetting tip) 120 from a dispense tip supply unit 180 (FIG. 4) and engages the dispense tip to the sample pipetting module 150. An example of the sample pipetting module 150 is described and illustrated in more detail with reference to FIG. 3.

The vertical transfer device 152 operates to vertically move the sample pipetting module 150 therealong. As described herein, the vertical transfer device 152 moves the sample pipetting module 150 to adjust the position of a dispense tip 120 relative to a tube 122 or a vessel 124 for aspiration or dispensation.

The horizontal transfer device 154 operates to guide the sample pipetting module 150 therealong. As described herein, the sample pipetting module 150 is movable between different positions along a sample transfer guide 514. For example, the sample pipetting module 150 can move to a tip supply position 170, a sample aspiration position 172, a sample dilution position 174, a sample dispense position 176, and a tip waste position 178, as further discussed with reference to FIG. 4.

The vertical transfer device 152 and the horizontal transfer device 154 can operate together and/or separately to transit any desired path between two positions. For example, the vertical transfer device 152 and the horizontal transfer device 154 can selectively and/or simultaneously operate to move the sample pipetting module 150 from a start position to an end position by circumventing any obstacles arranged between the start position and the end position.

Figure 3:
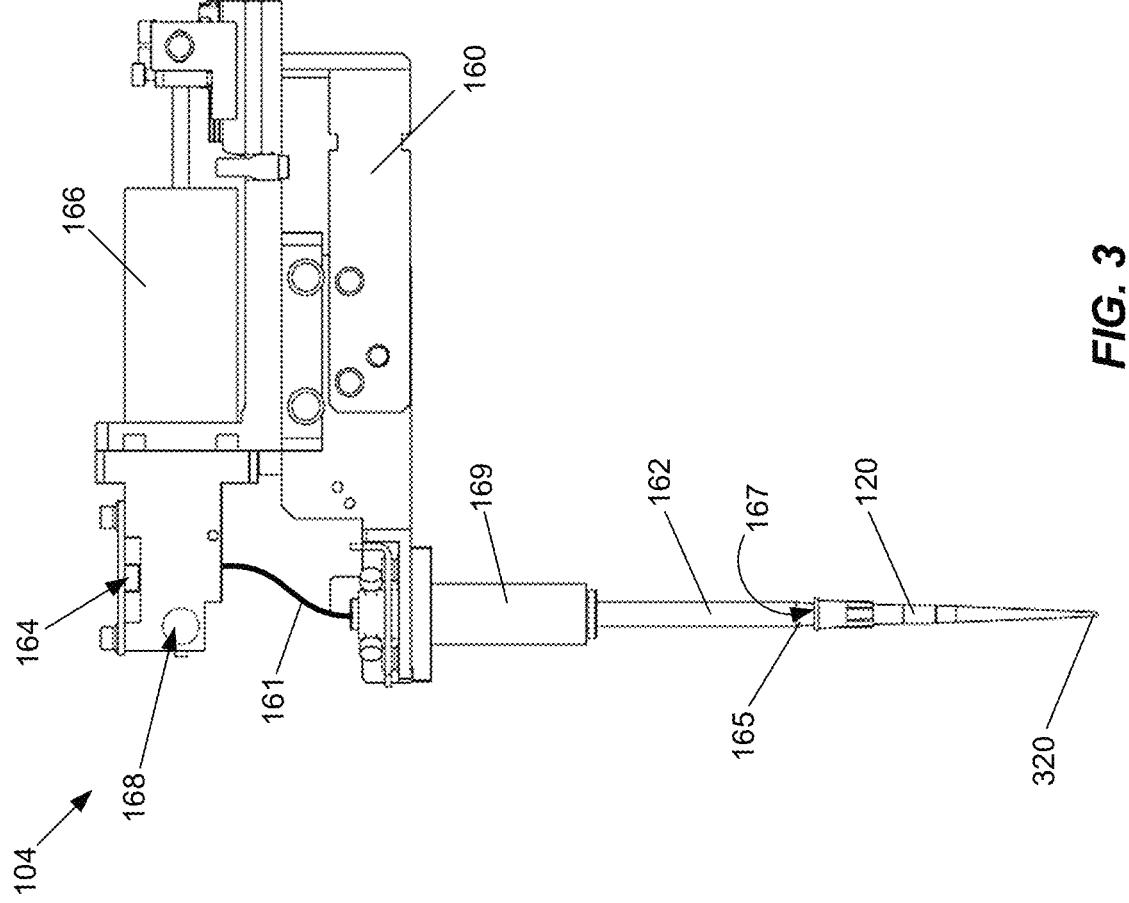
FIG. 3 illustrates an example sample pipetting module.

FIG. 3 schematically illustrates an example of the sample pipetting module 150. The sample pipetting module 150 includes a base 160 and a mandrel 162 (which can be also referred to herein as a tube) supported at the base 160. The base 160 can be vertically guided by the vertical transfer device 152. The mandrel 162 is configured to mount a dispense tip 120, which is also referred to herein as a pipetting tip or probe, an aspiration tip or probe, or a disposable tip or probe. For example, the sample pipetting module 150 engages a pipetting tip by pressing the mandrel 162 into the pipetting tip and lifts the mandrel 162 that fits the pipetting tip. The mandrel 162 can be removable from the base 160. In some embodiments, the mandrel 162 has a tapered tip 165 that engages a corresponding tapered seat portion 167 of the dispense tip 120 (similar to a machine taper, Morse taper, or the like). Upon engagement of the dispense tip 120, friction keeps the dispense tip 120 on the mandrel 162 and forms an air-tight joint. The dispense tip 120 can be removed by externally driving it off from the mandrel 162.

A vertical drive motor may be used to engage the tapered seat portion 167 of the dispense tip 120 with the tapered tip 165 of the mandrel 162. A flat-rate or near flat-rate spring assembly 169 may be provided to ensure consistent engagement of the dispense tip 120 with the mandrel 162 and ensure a consistent overall length and/or position of the dispense tip 120 (i.e., the distal end 320 of the dispense tip 120). In some embodiments, the vertical drive motor may be used to drive off the tapered seat portion 167 of the dispense tip 120 from the tapered tip 165 of the mandrel 162.

In some embodiments, the sample pipetting module 150 includes a sample aliquot pipetting unit and a sample precise pipetting unit. The sample aliquot pipetting unit operates to pipette an aliquot of sample from a sample tube 122 located in the sample rack presentation unit or sample presentation unit (SPU), and dispense the aliquot of sample into a sample vessel. For example, to enable sample of low volumes (e.g., for pediatric samples), direct sampling (i.e., pipetting) is possible from the SPU. The sample aliquot pipetting unit can dispose the used pipetting tip when the pipetting is completed for each sample. The sample precise pipetting unit operates to pipette the sample from a sample vessel and dispense the sample to a reaction vessel. In some embodiments, the sample can be dispensed first to a dilution vessel to create a sample dilution before being dispensed to a reaction vessel. The sample precise pipetting unit can dispose the used pipetting tip when a predetermined test is completed.

The sample pipetting module 150 further includes a syringe assembly 164. The syringe assembly 164 can include a plunger being pulled or pushed along inside a barrel, allowing the syringe assembly 164 to take in or expel a liquid or gas substance through an open end of the dispense tip 120. A motor 166 (e.g., a stepper motor) is used to actuate the syringe assembly 164. The syringe assembly can be in fluid communication with the dispense tip 120 through a fluid line 161.

In some examples, the sample pipetting module 150 includes a valve 168 configured to selectively connect the dispense tip 120 to either of the syringe assembly 164 and the environment, such that the dispense tip 120 is in fluid communication with either the syringe assembly 164 or the environment. An example of the valve 168 includes a three-way valve arranged between the syringe assembly 164 and the dispense tip 120. An example operation of the valve 168 is described with reference to FIG. 25.

Figure 4:
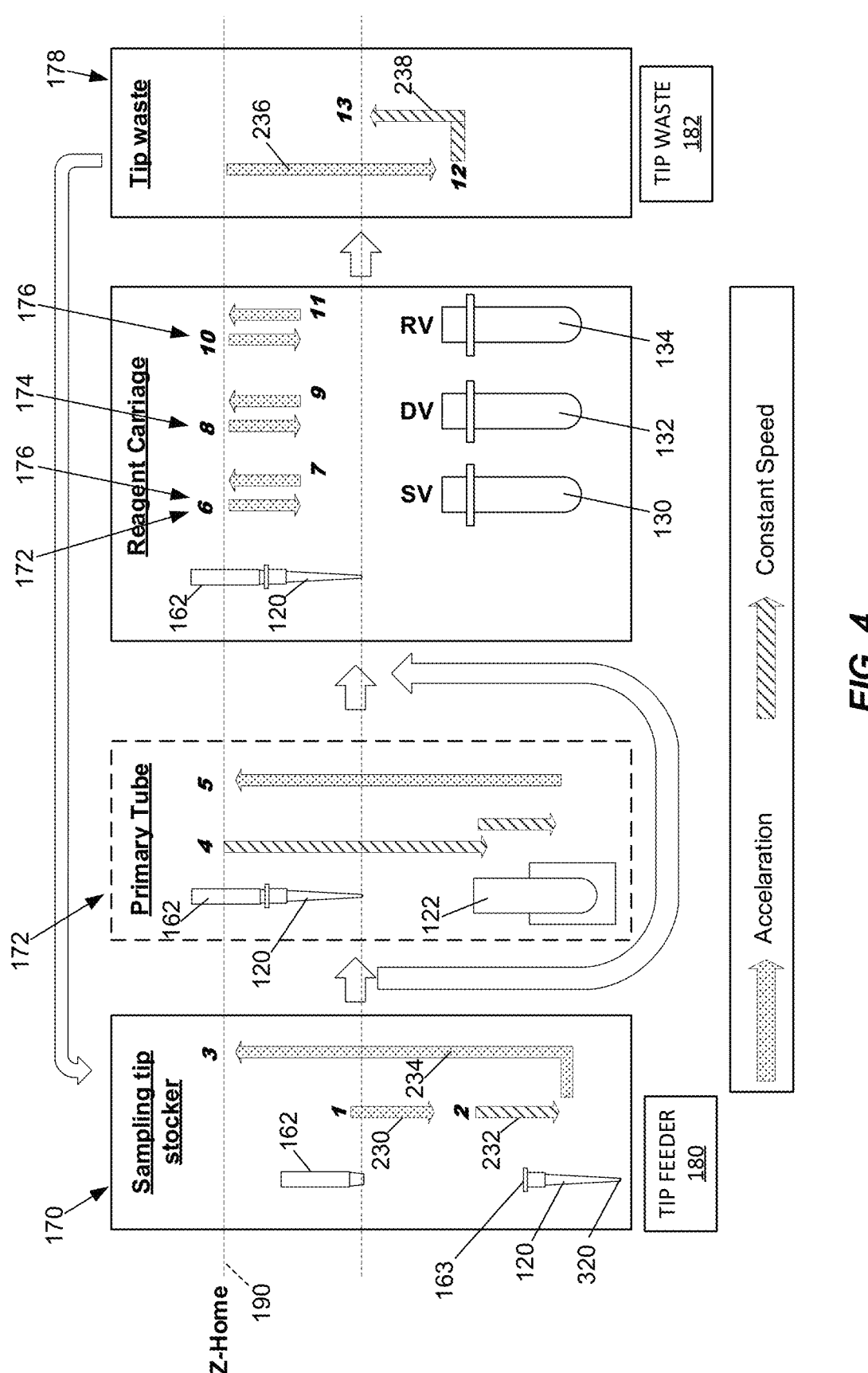
FIG. 4 schematically illustrates an example operation of the sample pipetting system.

FIG. 4 illustrates an example operation of the sample pipetting system 104. In some examples, the sample pipetting system 104 can move the sample pipetting module 150 to a tip supply position 170, a sample aspiration position 172, a sample dilution position 174, a sample dispense position 176, and a tip waste position 178.

For example, samples are aspirated by dispense tips to avoid contamination risks. The sample pipetting module 150 can move to the tip supply position 170. In this position, the sample pipetting module 150 is vertically lowered to insert the mandrel 162 into a dispense tip 120 that is supplied by a dispense tip supply unit 180, thereby attaching the dispense tip 120 to the mandrel 162. Then, the sample pipetting module 150 moves to the sample aspiration position 172, in which the sample pipetting module 150 operates to aspirate a predetermined volume of sample from a sample container. As described herein, in some embodiments, the sample container can be either a sample tube 122 or a sample vessel 130.

In some examples, the sample pipetting module 150 optionally moves to the sample dilution position 174. In the sample dilution position 174, the sample pipetting module 150 is lowered such that the dispense tip 120 is arranged inside a dilution vessel 132 containing a diluent.

After that, the sample pipetting module 150 moves to the sample dispense position 176 to dispense the aspirated volume of sample (or diluted sample) into a vessel 124. As described herein, in some embodiments, the vessel 124 can be either a sample vessel 130 or a reaction vessel 134. Once dispensed, the sample pipetting module 150 moves to the tip waste position 178 to discard the dispense tip into a dispense tip waste unit 182.

Figure 5:
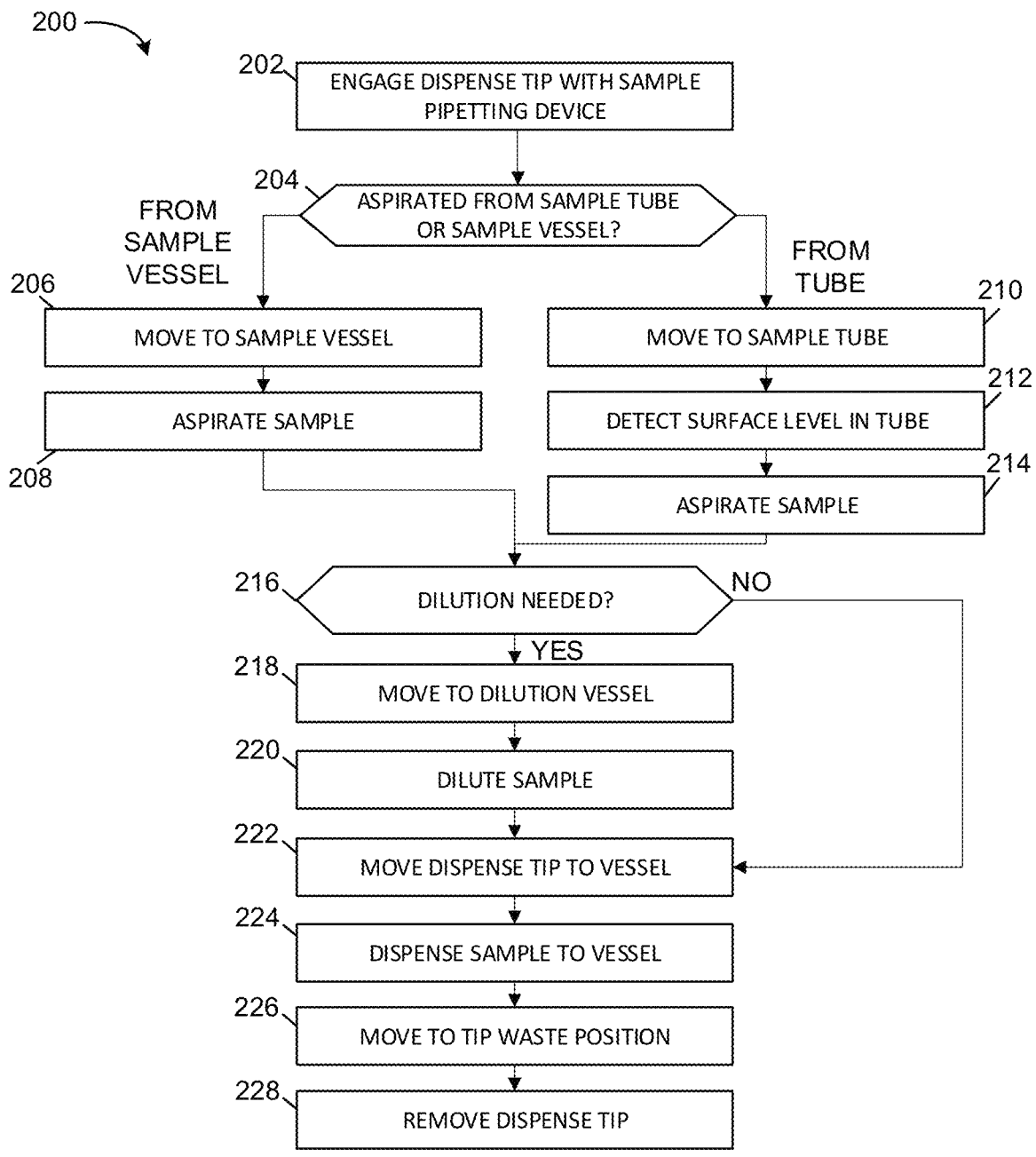
FIG. 5 is a flowchart illustrating an example method for operating a substance dispense system.

FIG. 5 is a flowchart illustrating an example method 200 for operating the substance dispense system 102 including the sample pipetting system 104 and the precision dispense control system 106. The method 200 is described with reference also to FIG. 4. Although the method 200 is primarily described herein as being performed by the sample pipetting system 104, it is noted that the method 200 can be at least partially executed by one or more other systems or devices, such as the precision dispense control system 106 or other systems in the substance dispense system 102, with or without cooperating with the sample pipetting system 104.

In general, two different sample sources can be used in the instrument 100. In one embodiment, a sample can be aspirated from a sample tube 122 presented from a sample rack. For example, the sample pipetting system 104 operates to pipette an aliquot of sample from a sample tube 122 located in the sample rack and dispense the aliquot of sample into a sample vessel 130. Alternatively, the sample pipetting system 104 operates to pipette a sample from a sample vessel 130 and dispense the sample to a reaction vessel 134. In some embodiments, the sample can be diluted with a dilution vessel 132 before dispensed to a reaction vessel 134.

The method 200 can begin at operation 202 in which a dispense tip 120 is engaged with the sample pipetting module 150. As shown in FIG. 4, the sample pipetting module 150 descends the base 160 with the mandrel 162 from a home position 190. In some embodiments, the mandrel 162 can be lowered at an increasing speed 230 (i.e., acceleration) before the mandrel 162 comes close to a dispense tip 120. Once the mandrel 162 is arranged adjacent the dispense tip 120, the mandrel 162 can be further lowered at a constant speed 232 until the mandrel engages the dispense tip, and decelerated to come to rest and establish a relative position of an end 163 and/or the distal end 320 of the dispense tip 120 to the mandrel 162. Once mounting the dispense tip 120, the sample pipetting module 150 ascends the mandrel 162 and returns to the home position 190 or another position.

At operation 204, if a sample is to be aspirated from a sample vessel 130, the method 200 moves on to operation 206. Alternatively, if a sample is to be aspirated from a sample tube 122, the method 200 continues at operation 210.

At operation 206, the sample pipetting system 104 moves the sample pipetting module 150 to a sample vessel 130 containing an aliquot of sample. As shown in FIG. 4, the sample pipetting system 104 can move the sample pipetting module 150 to the sample aspiration position 172 where the sample vessel 130 is provided.

At operation 208, the sample pipetting system 104 operates to aspirate the sample from the sample vessel 130. An example aspiration method from the sample tube 122 is described with reference to FIG. 6.

At operation 210, the sample pipetting system 104 moves the sample pipetting module 150 to a sample tube 122 containing a sample. As shown in FIG. 4, the sample pipetting system 104 can move the sample pipetting module 150 to the sample aspiration position 172 where the sample tube 122 is provided.

At operation 212, the sample pipetting module 150 operates to detect a surface level of sample in the sample tube 122. Where the volume of sample contained in the sample tube 122 is not known, the level of sample in the sample tube 122 needs to be measured or estimated to ensure that the dispense tip 120 is lowered enough to maintain the distal end 320 (FIG. 8) of the dispense tip 120 under the surface level while aspirating a volume of the sample from the sample tube 122. As described herein, in some embodiments, the dispense tip 120 goes down while blowing air out from the dispense tip, and senses a surface level of sample. Once the surface level is detected at a position, the dispense tip 120 can then aspirate the sample at that position without going up and returning to the home position. As such, the dispense tip needs not go up and come down to aspirate sample. Rather, the dispense tip can be lowered only once to both measure the surface level and aspirate the sample, this is referred to herein as a single dive mode. In contrast, in a double dive mode, the dispense tip 120 goes down while blowing air for level sensing, and then goes up above the surface level to equalize the internal pressure. Then, the dispense tip is lowered again to aspirate the sample. Therefore, the single dive mode simplifies the process, compared to the double dive mode. An example of the single dive motion is further described with reference to FIGS. 24-26.

At operation 214, the sample pipetting module 150 operates to aspirate the sample from the sample tube 122. An example method for detecting the surface level of sample and aspirating the sample from the sample tube 122 is described with reference to FIGS. 24 and 27.

At operation 216, if a dilution is needed prior to dispensation, the method 200 moves on to operation 218. If a dilution is not needed, the method 200 skips to operation 222.

At operation 218, the sample pipetting module 150 moves to a dilution vessel 132 containing a diluent. As shown in FIG. 4, the sample pipetting module 150 can move to the sample dilution position 174 where the dilution vessel 132 is provided.

At operation 220, the sample pipetting module 150 operates to dilute the sample within the dilution vessel 132. An example dilution method from the sample tube 122 is described with reference to FIG. 30.

At operation 222, the sample pipetting module 150 moves the dispense tip 120 to a vessel 124. As shown in FIG. 4, the sample pipetting module 150 can move to the sample dispense position 176 where the vessel 124 is provided. As described herein, the vessel 124 can be either a sample vessel 130 or a reaction vessel 134. For example, where a sample is aspirated from the sample tube 122 (as in operation 214), the vessel 124 can be a sample vessel 130 such that the sample pipetting module 150 dispenses the sample to the sample vessel 130. Alternatively, where a sample is aspirated from the sample vessel 130 (as in operation 208), the vessel 124 can be a reaction vessel 134 such that the sample pipetting module 150 dispenses the sample to the reaction vessel 134.

At operation 224, the sample pipetting module 150 operates to dispense the aspirated sample (or diluted sample) to either the sample vessel 130 or the reaction vessel 134. An example dispense method is described with reference to FIG. 6 (regarding a dispense method with respect to a sample vessel) and FIG. 23 (regarding a dispense method with respect to a sample tube).

At operation 226, the sample pipetting module 150 moves to the tip waste position 178, as shown in FIG. 4. At operation 228, the sample pipetting module 150 removes the dispense tip 120. In some embodiments, the sample pipetting module 150 descends the mandrel 162 with the dispense tip 120 at an increasing speed 236 (i.e., acceleration) until it reaches the dispense tip waste unit 182. Once the dispense tip 120 is removed and dropped to the dispense tip waste unit 182, the sample pipetting module 150 can ascend at a constant speed 238.

Figure 6:
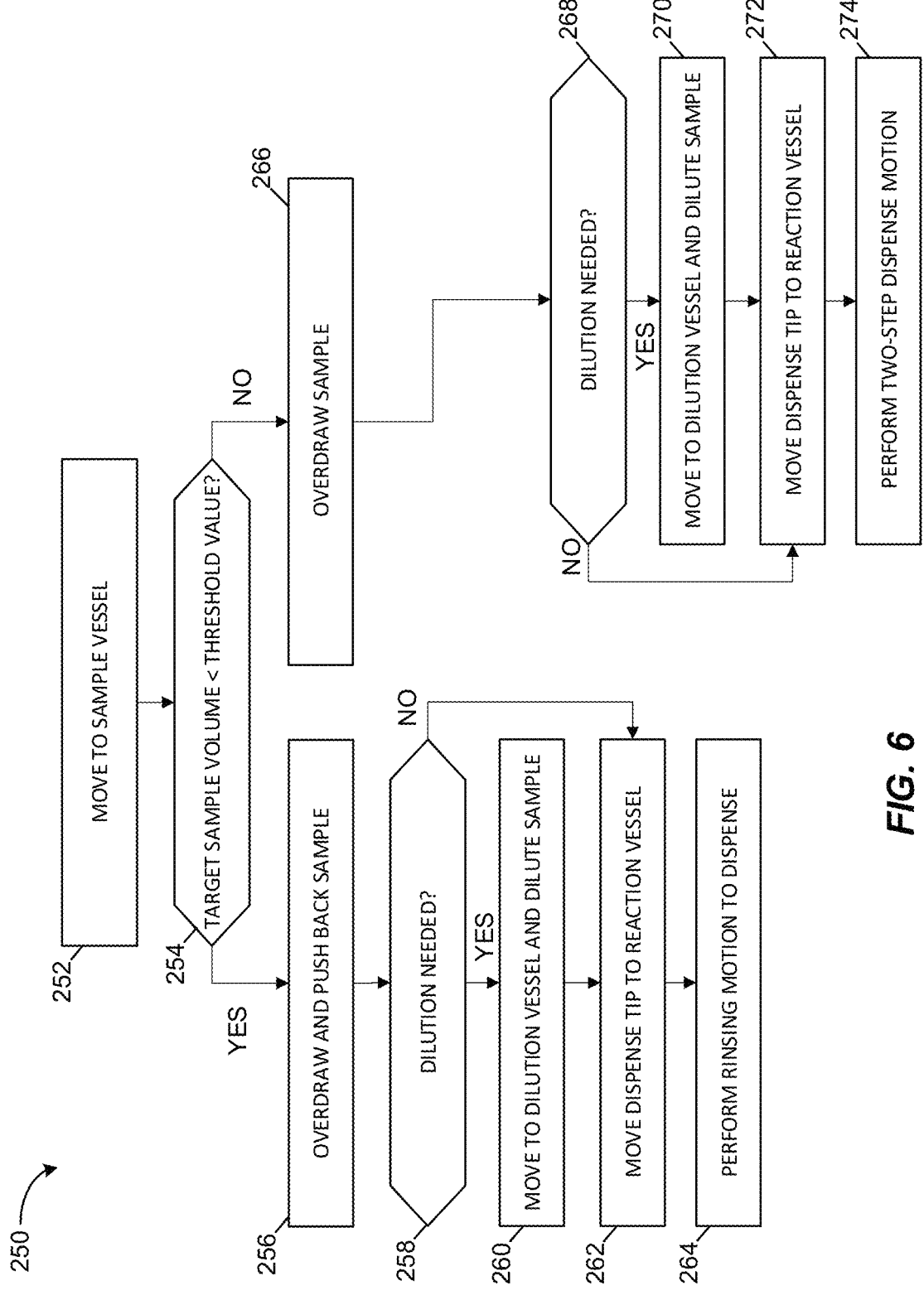
FIG. 6 is a flowchart of an example method for aspirating a sample from a sample vessel and dispensing the sample to a reaction vessel.

FIG. 6 is a flowchart of an example method 250 for aspirating a sample from a sample vessel 130 and dispensing the sample to a reaction vessel 134. In some examples, the method 250 is designed to implement the operations 206, 208, 222, and 224 of FIG. 5. The method 250 is primarily described herein as being performed by the sample pipetting system 104 that is controlled by the precision dispense control system 106, it is noted that the method 250 can be at least partially executed by one or more other systems or devices in the substance dispense system 102, with or without cooperating with the sample pipetting system 104 and the precision dispense control system 106. Although the method 250 is described to include operations illustrated in FIG. 6, it is also possible in other embodiments that the method 250 includes only some of these operations, and/or additional operations associated with the operations described herein.

At operation 252, the sample pipetting system 104 moves the sample pipetting module 150 to a sample vessel 130 containing an aliquot of sample, similar to the operation 206 in FIG. 5. In some examples, the sample vessel 130 contains an aliquoted volume of sample. As such, the volume of sample in the sample vessel 130 is known at least generally. Therefore, it is not generally necessary to measure or estimate the surface level of sample in the sample vessel 130 in order to determine how deep the dispense tip 120 needs to descend to aspirate the sample within the sample vessel 130. In contrast, as described herein, when a sample is to be aspirated from other containers, such as a sample tube 122, the volume of sample contained in such containers are not necessarily known and there may be a need of measuring or estimating the surface level of sample in the containers.

At operation 254, if a target sample volume is smaller than a threshold value ("YES" in this operation), the method 250 moves on to operation 256. Otherwise ("NO" at this operation), the method 250 continues at operation 266. As such, in the method 250, the sample pipetting system 104, which can be controlled by the precision dispense control system 106, operates different processes for aspiration and dispensation based on a target sample volume to be prepared. The threshold value can be determined based on various factors. Example factors include configurations and attributes of dispense tip (e.g., size, capacity, material, etc.), arrangement of dispense tip relative to containers for aspiration or dispensation, and type of sample or other substances. In one example, the threshold value is about 25 µL. Other threshold values are also possible in other examples.

In some embodiments, the determination operation 254 can be automatically performed as part of sample preparation process in the instrument 100. For example, the instrument 100 is configured to receive a user input of a target sample volume and determine which operation to perform at the operation 254. In other embodiments, the instrument 100 is configured such that a user can manually select which operation to perform via a user interface associated with the instrument 100.

At operation 256, when the target sample volume is less than the threshold value (e.g., 25 µL), the sample pipetting system 104 performs overdraw and push-back process for aspirating the sample from the sample vessel 130. For a small amount of sample, the system aspirates a surplus volume in addition to a desired volume of sample and pushes back the surplus volume. The remaining volume in the dispense tip is delivered to the dispensation position. An example method for performing the overdraw and push-back process is described with reference to FIG. 7.

At operation 258, if a dilution is needed prior to dispensation, the method 250 moves on to operation 260. If a dilution is not needed, the method 250 skips to operation 262.

At operation 260, the sample pipetting system 104 moves the sample pipetting module 150 to a dilution vessel 132 containing a diluent, and operates to dilute the sample within the dilution vessel 132. An example dilution method from the sample tube 122 is described with reference to FIG. 30.

At operation 262, the sample pipetting system 104 moves the sample pipetting module 150 to a reaction vessel 134, similar to the operation 222 of FIG. 5.

At operation 264, the sample pipetting system 104 performs a rinsing motion to dispense the sample to the reaction vessel 134 when the target sample volume is less than the threshold value (e.g., 25 µL). An example method for performing the rinsing motion for dispense is described with reference to FIG. 13.

At operation 266, when the target sample volume is not less than the threshold value (e.g., 25 µL), the sample pipetting system 104 performs overdraw for aspirating the sample from the sample vessel 130. For example, the sample pipetting system 104 aspirates a volume of sample from the sample vessel 130 which is greater than the target sample volume. In some embodiments, such an overdrawn volume of sample is predetermined regardless of the target sample volume. In other embodiments, the overdrawn volume of sample varies depending on the target sample volume.

At operation 268, if a dilution is needed prior to dispensation, the method 250 moves on to operation 270. If a dilution is not needed, the method 250 skips to operation 272.

At operation 270, the sample pipetting system 104 moves the sample pipetting module 150 to a dilution vessel 132 containing a diluent, and operates to dilute the sample within the dilution vessel 132. An example dilution method from the sample tube 122 is described with reference to FIG. 30.

At operation 272, the sample pipetting system 104 moves the sample pipetting module 150 to a reaction vessel 134, similar to the operation 222 of FIG. 5.

At operation 274, the sample pipetting system 104 performs a two-step dispense motion to dispense the sample to the reaction vessel 134 when the target sample volume is not less than the threshold value (e.g., 25 µL). The two-step dispense motion is used to reduce a risk associated with misalignment or other causes. In the first step, the dispense tip goes down to a predetermined height (e.g., 2 mm) above the surface level and dispenses sample at the sample position without liquid pressure from the sample contained. The predetermined height can be determined such that the dispense tip does not contact with the surface level after dispensing. In the second step, the dispense tip goes further down to a predetermined position, which is set based on a total volume, to barely touches the surface level ("touch-off") in order to collect the sample remaining in the tip. An example method for performing the two-step dispense motion is described with reference to FIG. 20.

Referring now to FIGS. 7-12, an example method for performing overdraw and push-back process for aspirating a sample from a sample vessel 130 when the target sample volume is less than the threshold value. In the illustrated example, the threshold value is about 25 µL. In other embodiments, however, other threshold values are possible.

Figure 7:
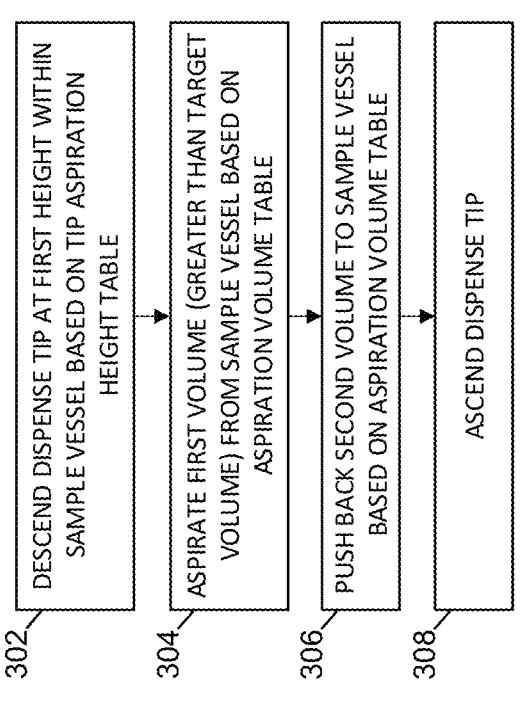
FIG. 7 is a flowchart illustrating an example method for performing an overdraw and push-back process.
Figure 8:
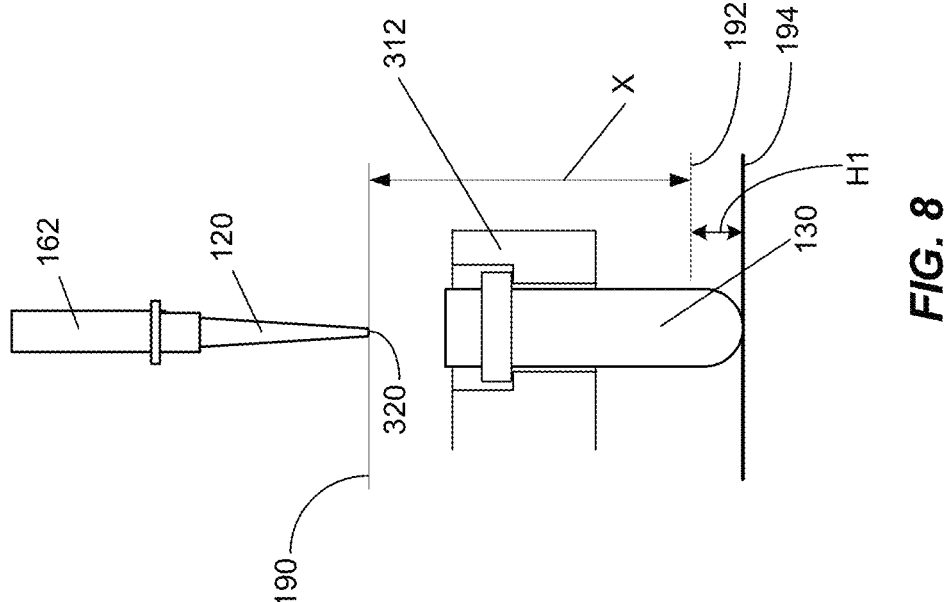
FIG. 8 is a schematic diagram of a dispense tip relative to a sample vessel.
Figure 11:
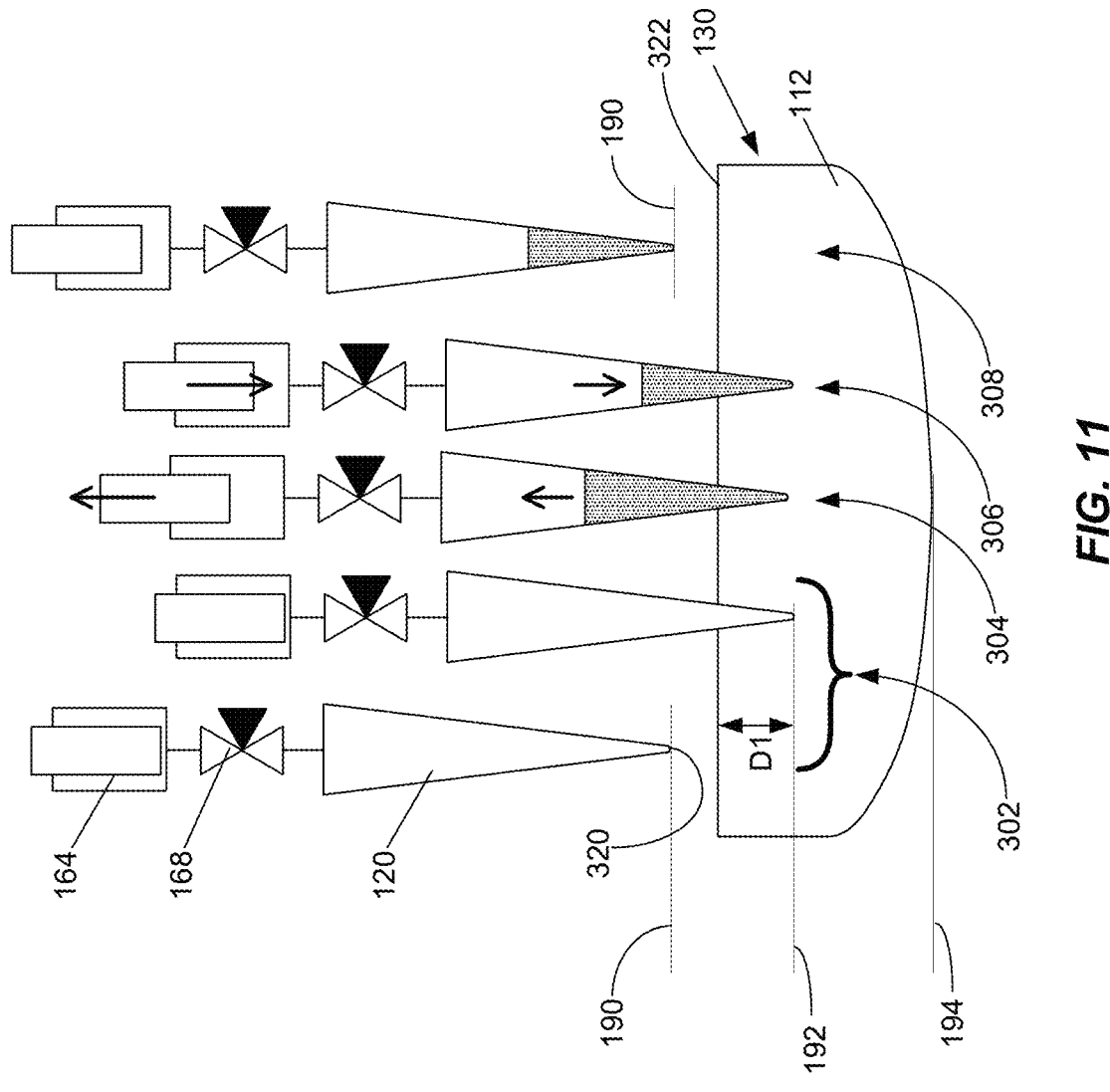
FIG. 11 schematically illustrates an example sequence of performing the method of FIG. 7.
Figure 12:
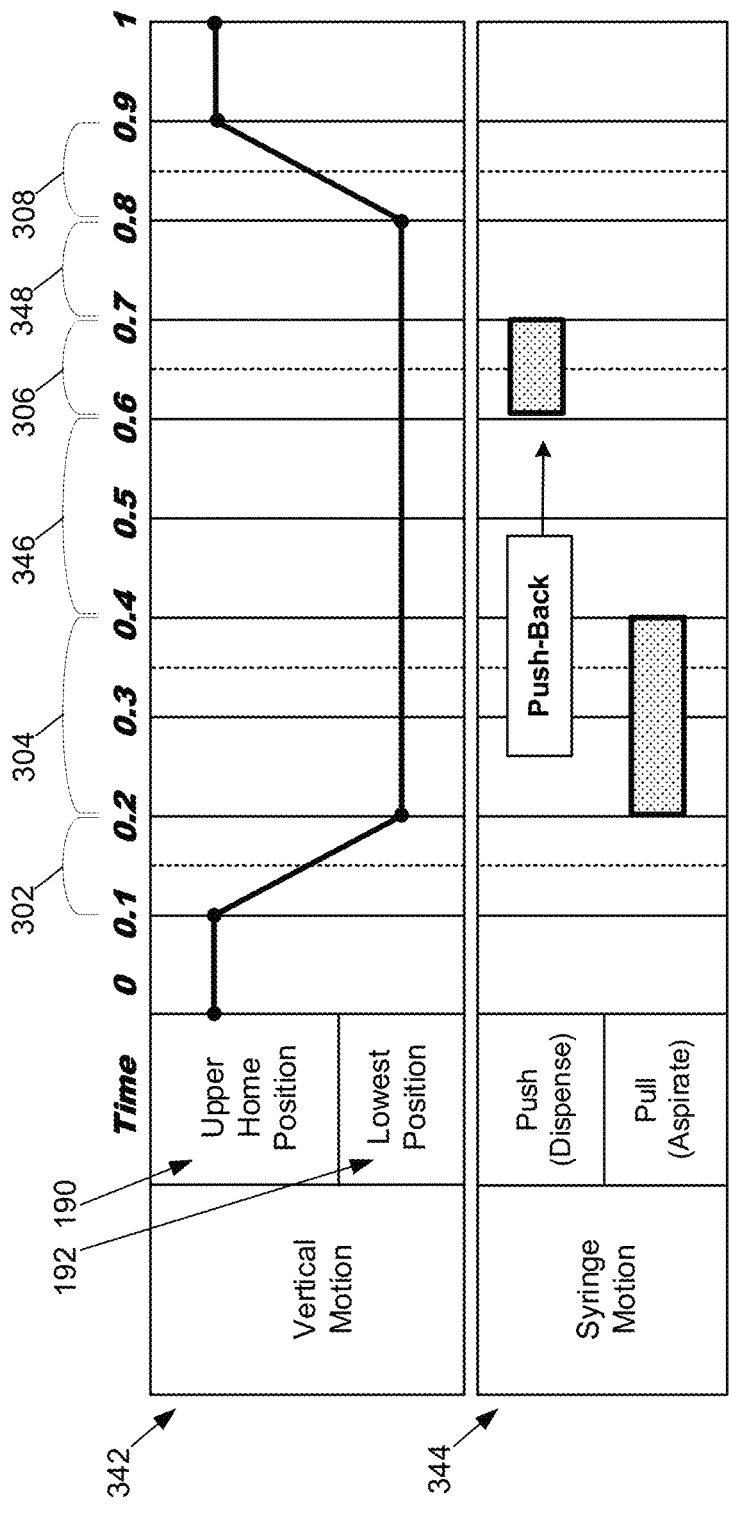
FIG. 12 is a timing diagram that shows a variation of dispense tip position and a change in syringe motion over time while performing the method of FIG. 7.

FIG. 7 is a flowchart illustrating an example method 300 for performing an overdraw and push-back process. In some examples, the method 300 is designed to implement the operation 256 of FIG. 6. The method 300 is described with reference also to FIGS. 8-12. FIG. 8 is a schematic diagram of a dispense tip 120 relative to a sample vessel 130. FIG. 9 is an example table for a dispense tip height for aspiration. FIG. 10 is an example table for overdraw and push-back amounts for target sample volumes. FIG. 11 illustrates an example sequence of performing the method 300 of FIG. 7. FIG. 12 shows a variation of dispense tip position and a change in syringe motion over time while performing method 300.

Although the method 300 is primarily described herein as being performed by the sample pipetting system 104 that is controlled by the precision dispense control system 106, it is noted that the method 300 can be at least partially executed by one or more other systems or devices in the substance dispense system 102, with or without cooperating with the sample pipetting system 104 and the precision dispense control system 106. Although the method 300 is described to include operations illustrated in FIG. 7, it is also possible in other embodiments that the method 300 includes only some of these operations, and/or additional operations associated with the operations described herein.

Referring to FIG. 7, the method 300 can begin at operation 302 in which the sample pipetting system 104 operates to descend the dispense tip 120 at an aspiration height (H1) within the sample vessel 130 based on a tip aspiration height table 310 (FIG. 9). As shown in FIG. 8, the dispense tip 120 is lowered toward the bottom of the sample vessel 130 supported by a reagent carriage 312. For example, the sample pipetting module 150 descends the mandrel 162 from the home position 190 to an aspiration position 192. The aspiration height (H1) is defined by a distance between a bottom 194 of the sample vessel 130 and the aspiration position 192.

As illustrated in FIG. 11, at the operation 302, the distal end 320 of the dispense tip 120 moves from the home position 190 to the aspiration position 192. At the aspiration position 192, the dispense tip 120 is submerged at a depth (D1) from the sample meniscus or surface level 322. The depth (D1) can vary based on various factors. In some examples, the depth (D1) is about 2 mm.

Referring still to FIG. 7, at operation 304, the sample pipetting system 104 operates to aspirate a first volume (V1) of sample from the sample vessel 130 based on an aspiration volume table 330 (FIG. 10). The sample pipetting system 104 operates to overdraw the sample at this operation such that the first volume (V1) of sample is greater than a target sample volume. As also shown in FIG. 11, the syringe assembly 164 moves the plunger back to draw the first volume of sample into the dispense tip 120.

At operation 306, the sample pipetting system 104 operates to push back a second volume (V2) of sample from the dispense tip 120 to the sample vessel 130, based on the aspiration volume table 330. Once the second volume (V2) is dispensed, the dispense tip 120 will contain the target sample volume. As also shown in FIG. 11, the syringe assembly 164 pushes the plunger to dispense the second volume of sample into the sample vessel 130.

At operation 308, the sample pipetting system 104 operates to ascend the dispense tip 120 away from the sample vessel 130 and ends the overdraw and push-back operation. As shown in FIG. 11, for example, the dispense tip 120 moves back to the home position 190.

As shown in FIG. 9, in some embodiments, the tip aspiration height table 310 is provided to determine the aspiration height (H1). The table 310 determines the aspiration height (H1) 316 for each amount 314 of sample to be aspirated from the sample vessel 130. In some embodiments, the table 310 is pre-generated and stored in the instrument 100. In this example, the volume of sample contained in the sample vessel 130 is about 165 µL, and the height of sample (i.e., the height of surface level 322 in FIG. 11) from the bottom 194 of the sample vessel 130 is about 6.4 mm.

The aspiration height (H1) 316 can alternatively be expressed in a downward pulse (X) 318. The downward pulse (X) is the number of pulses for operating the sample pipetting module 150 to lower the dispense tip 120. The downward pulse (X) defines a distance that a distal end 320 of the dispense tip 120 travels between the home position 190 and the aspiration position 192.

Although the table 310 illustrated in FIG. 9 shows four items for different aspiration amounts 314, the number of items is not limited, and the table 310 can define any number of items other than four items shown in FIG. 9.

Referring to FIG. 10, the aspiration volume table 330 determines the first volume (V1) 334 to be first aspirated from the sample vessel 130 (operation 304), and the second volume (V2) 336 to be pushed out from the dispense tip 120 to the sample vessel 130 (operation 306), based on each target sample volume 332. For example, to aspirate 10.0 µL in the dispense tip 120, the dispense tip 120 first needs to draw 15.0 µL of sample from the sample vessel 130, and then push 5.0 µL of sample back from the dispense tip 120 to the sample vessel 130. To aspirate 1.0 µL, instead, the dispense tip 120 first draws 3.0 µL from the sample vessel and then pushes back 3.5 µL to the sample vessel 130. Although the table 330 illustrated in FIG. 10 shows five items for different target sample volumes 332, the number of items is not limited, and the table 330 can define any number of items other than five items shown in FIG. 10.

As further illustrated in FIG. 12, which is a graph 342 for a variation of dispense tip position over time, and a graph 344 for a change in syringe motion over time while performing the method 300, the dispense tip 120 is lowered from 0.1 second to 0.2 second (operation 302), and the first volume (V1) is drawn into the dispense tip 120 from 0.2 second to 0.4 second (operation 304). The second volume (V2) is pushed back into the sample vessel 130 from 0.6 second to 0.7 second (operation 306), and the dispense tip 120 is raised back to the home position from 0.8 second to 0.9 second (operation 308). As illustrated, break or wait periods, such as a first break period 346 and a second break period 348, can be arranged between at least one of adjacent operations 302, 304, 306, and 308. For example, once the sample is aspirated at the operation 304, the system pauses for a sufficient time (the first break period 346) to complete actual liquid motion before pushing back the extra volume (operation 306).

The accuracy can be controlled by the combination of aspiration volume and push-back volume, which can be selected to get a desired performance. In some embodiments, the dispense tip 120 can go down while the liquid surface position changes, in order to reduce contact of the dispense tip 120 outside the sample.

Referring to FIGS. 13-16, an example method is described for performing a rinsing motion for dispensing a sample when the target sample volume is less than the threshold value. In the illustrated example, the threshold value is about 25 μL. In other embodiments, however, other threshold values are possible.

Figure 13:
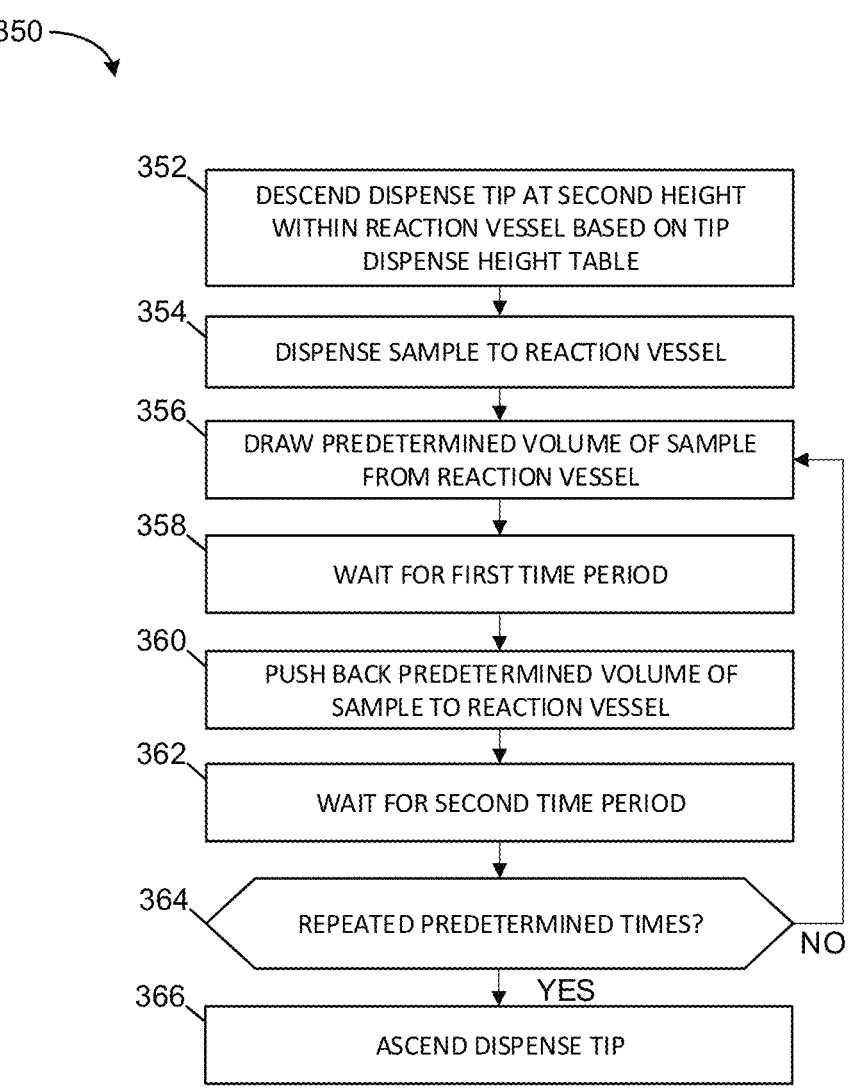
FIG. 13 is a flowchart of an example method for performing a rinsing motion.
Figure 15:
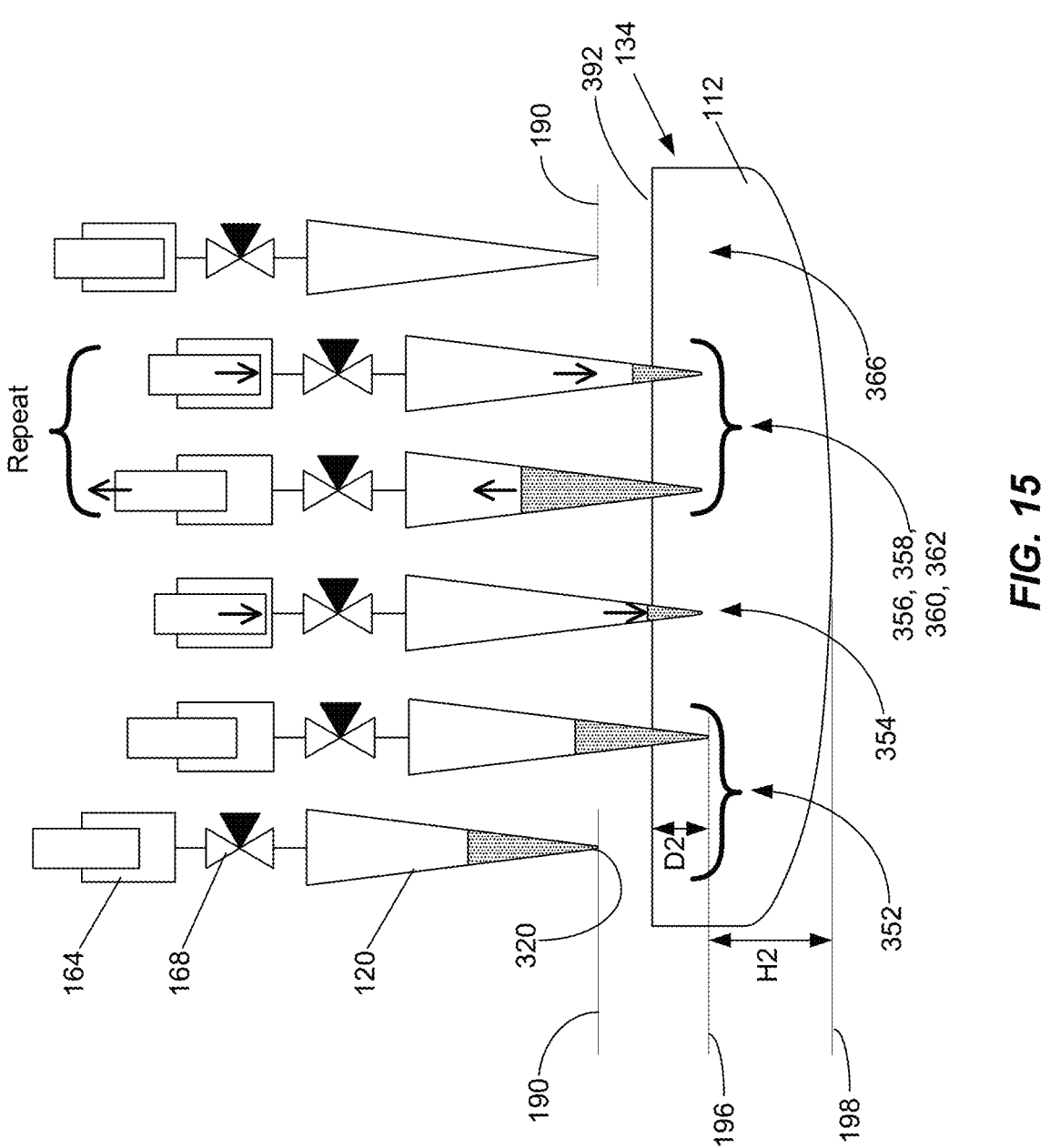
FIG. 15 schematically illustrates an example sequence of performing the method of FIG. 13.
Figure 16:
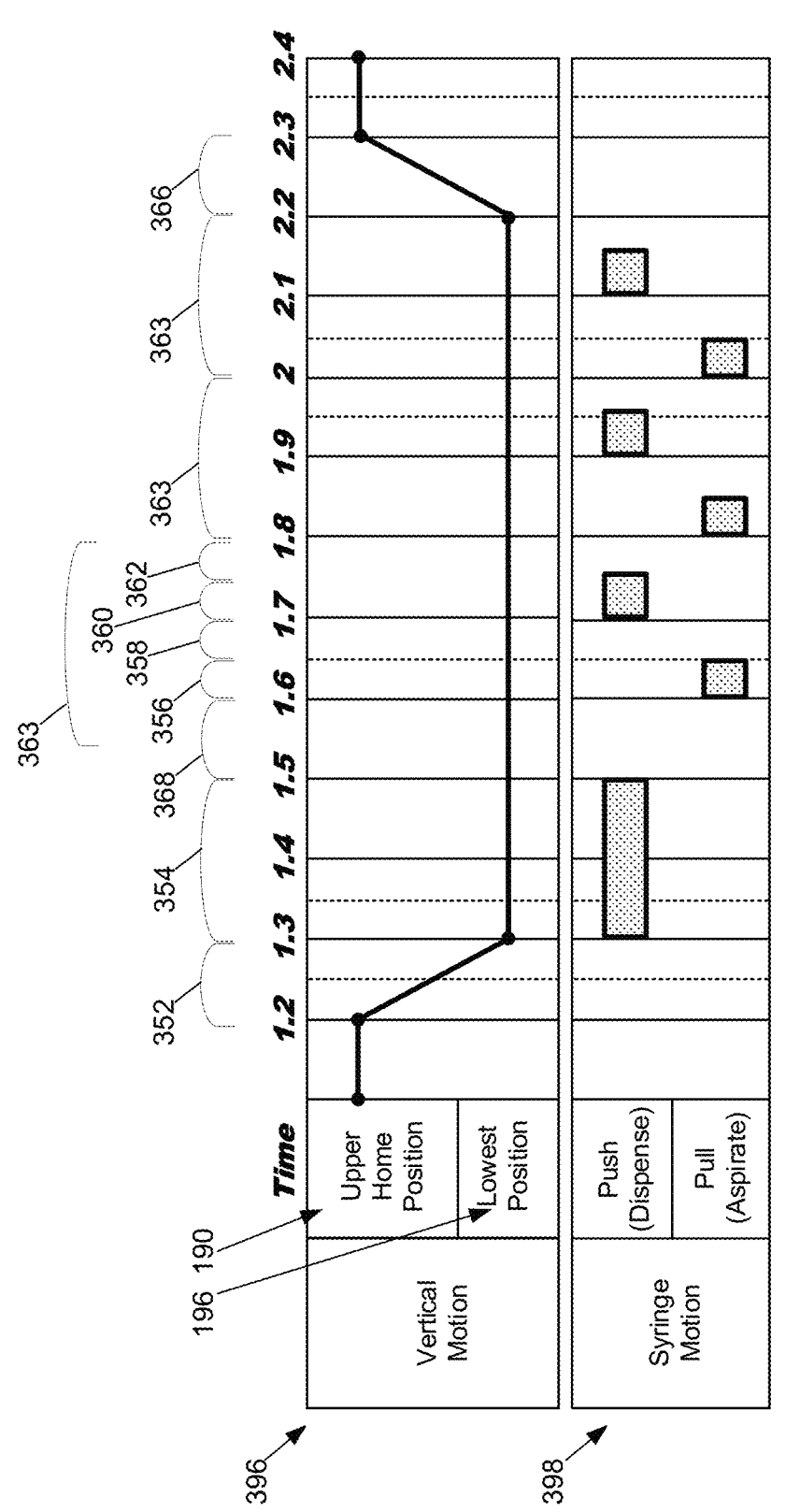
FIG. 16 is a timing diagram that shows a variation of dispense tip position and a change in syringe motion over time while performing the method of FIG. 13.

FIG. 13 is a flowchart of an example method 350 for performing a rinsing motion, as shown in the operation 264 in FIG. 6. The method 350 is described with reference also to FIGS. 14-16. FIG. 14 is an example table for a dispense tip height for dispensation. FIG. 15 illustrates an example sequence of performing the method 350 of FIG. 13. FIG. 16 shows a variation of dispense tip position and a change in syringe motion over time while performing the method 350.

The method 350 is primarily described herein as being performed by the sample pipetting system 104 that is controlled by the precision dispense control system 106, it is noted that the method 350 can be at least partially executed by one or more other systems or devices in the substance dispense system 102, with or without cooperating with the sample pipetting system 104 and the precision dispense control system 106. Although the method 350 is described to include operations illustrated in FIG. 13, it is also possible in other embodiments that the method 300 includes only some of these operations, and/or additional operations associated with the operations described herein.

Referring to FIG. 13, the method 350 can begin at operation 352 in which the sample pipetting system 104 operates to descend the dispense tip 120 at a dispensation height (H2) within a reaction vessel 134 based on a tip dispensation height table 380, as shown in FIG. 14. As shown in FIG. 15, the dispense tip 120 is lowered toward the bottom 198 of the reaction vessel 134. The reaction vessel 134 is supported by a carriage, similar to the sample vessel 130 in FIG. 8. For example, the sample pipetting module 150 descends the mandrel 162 from the home position 190 to a dispensation position 196. The dispensation height (H2) is defined by a distance between a bottom 198 of the reaction vessel 134 and the dispensation position 196. In some embodiments, the dispensation height (H2) is determined in the tip dispensation height table 380. An example of the table 380 is described with reference to FIG. 14.

At operation 354, the sample pipetting system 104 operates to dispense the sample to the reaction vessel 134. For example, the sample is dispensed by the syringe assembly 164 (e.g., a pneumatic syringe pump) with a predetermined syringe speed in accordance with dispensing volume. In some examples, the sample contained in the dispense tip 120 can be entirely dispensed in the reaction vessel 134 at this operation. In other examples, part of the sample contained in the dispense tip 120 can be dispensed in the reaction vessel 134 at this operation.

At operation 356, the sample pipetting system 104 operates to draw a predetermined volume of sample from the reaction vessel 134.

At operation 358, the sample pipetting system 104 optionally operates to wait for a predetermined period of time (e.g., a first period of time). At this operation, the dispense tip 120 remains stationary and no aspiration or dispensation is performed.

At operation 360, the sample pipetting system 104 pushes back a predetermined volume of the sample from the dispense tip 120 to the reaction vessel 134. In some embodiments, the entire volume of sample drawn into the dispense tip at the operation 356 is pushed back to the reaction vessel 134 at this operation. In other embodiments, the sample drawn in the dispense tip 120 at the operation 356 is partially pushed back to the reaction vessel 134.

At operation 362, the sample pipetting system 104 optionally operates to wait for a predetermined period of time (e.g., a second period of time). At this operation, the dispense tip 120 remains stationary and no aspiration or dispensation is performed.

In some embodiments, the operations 356, 358, 360, and 362 are repeated a predetermined number of times. At operation 364, if these operations are repeated the predetermined number of times ("YES" at this operation), the method 350 moves on to operation 366. Otherwise ("NO" at this operation), the methods 350 returns to the operation 356 and repeats the operation 356 and subsequent operations.

At operation 366, the sample pipetting system 104 operates to ascend the dispense tip 120 away from the reaction vessel 134 and ends the dispensation motion (that may include a rinsing motion). As shown in FIG. 15, for example, the dispense tip 120 moves back to the home position 190.

As such, the rinsing motion (e.g., operations 356, 358, 360, and 362) is performed to accurately dispense a small amount of sample. The rinsing motion can be performed with various parameters. In the illustrated example, the aspiration and dispensation are repeated three times with the aspiration and dispensation volumes of 50 μL, respectively. The wait time between the aspiration and dispensation is about 100 millisecond. The dispense tip 120 can be adjusted to change its height (its vertical position) as the surface level changes while the rinsing motion is performed.

In some embodiments, after the operation 362, the sample pipetting system 104 can aspirate air into the dispense tip 120 to reduce splashing resulting from, for example, vibration of the dispense tip 120 while moving to a different position.

Referring to FIG. 14, the tip dispensation height table 380 determines the dispensation height (H2) 384 for each amount 382 of sample to be dispensed to the reaction vessel 134. In some embodiments, the table 380 is pre-generated and stored in the instrument 100. In this example, a volume of liquid substance (such as a reagent and/or buffer) that has been already filled in the reaction vessel 134 is about 65 μL, and the height of the liquid substance (i.e., the height of liquid meniscus) from the bottom 198 of the reaction vessel 134 is about 2.8 mm.

Similar to the tip aspiration height table 310, the dispensation height (H2) 384 can alternatively be expressed in a downward pulse (X) 386. The downward pulse (X) 386 is the number of pulses for operating the sample pipetting module 150 to lower the dispense tip 120. The downward pulse (X) 386 defines a distance that the distal end 320 of the dispense tip 120 travels between the home position 190 and the dispensation position 196.

Although the table 380 illustrated in FIG. 14 shows four items for different dispensation amounts 382, the number of items is not limited, and the table 380 can define any number of items other than four items shown in FIG. 14.

As illustrated in FIG. 15, at the operation 352, the distal end 320 of the dispense tip 120 moves from the home position 190 to the dispensation position 196. At the dispensation position 196, the dispense tip 120 is submerged at a depth (D2) from the sample meniscus 392. The depth (D2) can vary based on various factors. The depth (D2) is determined such that the rinsing motion described in the method 350 can be performed without drawing or pushing back air at the operations 352 and 360. In some examples, the depth (D2) is about 2 mm. In some embodiments, the depth (D2) (as well as the dispensation height (H2)) is determined such that the distal end 320 of the dispense tip 120 barely touches (e.g., touch-off) the surface level 392 in the reaction vessel 134.

As further illustrated in FIG. 16, which is a graph 396 for a variation of dispense tip position over time, and a graph 398 for a change in syringe motion over time while performing the method 350, the dispense tip 120 is lowered from 1.2 second to 1.3 second (operation 352), and the sample is dispensed into the reaction vessel from 1.3 second to 1.5 second (operation 354). Then, the rinsing motion 363 including operations 356, 358, 360, and 362 is conducted from 1.6 second to 1.7 second. Each of the operations 356, 358, 360, and 362 is performed for 0.05 second. The rinsing motion 363 is repeated three times until 2.2 second in this example. Then, the dispense tip is raised back to the home position from 2.2 second to 2.3 second. As illustrated, one or more break or wait periods may be provided between at least one of adjacent operations, such as a break period 368 between the operation 354 and the first rinsing motion 363.

Figure 17:
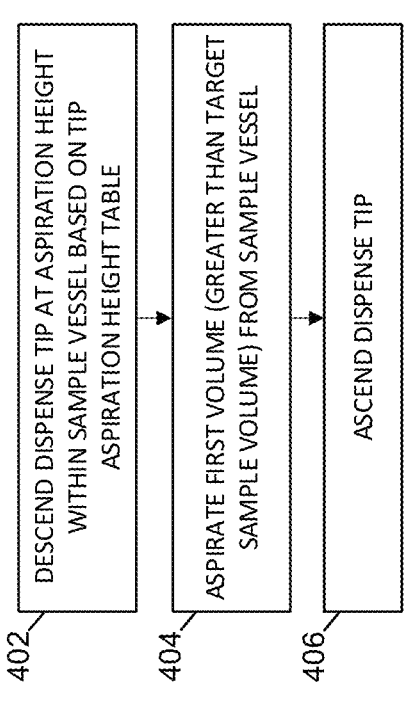
FIG. 17 is a flowchart of an example method for performing an overdraw process.
Figure 18:
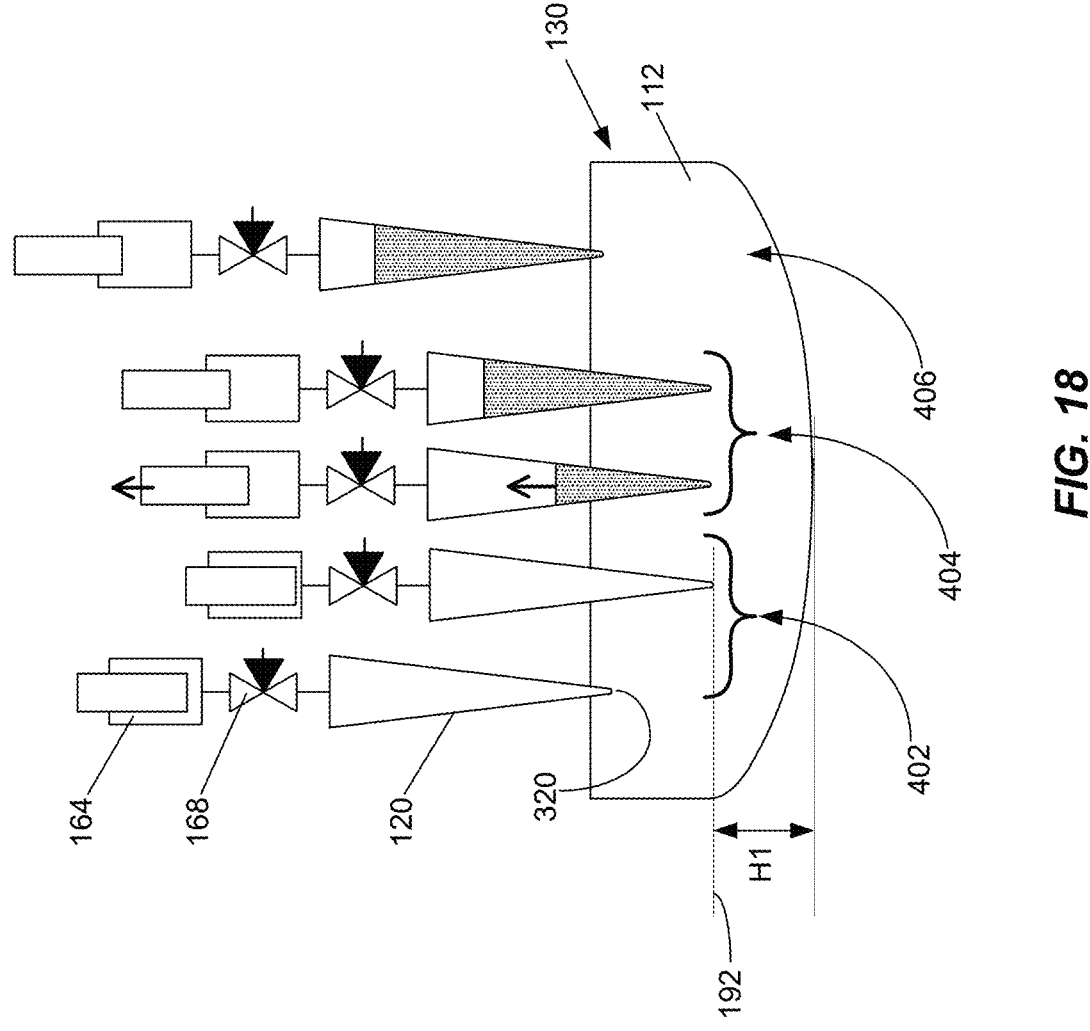
FIG. 18 schematically illustrates an example sequence of performing the method of FIG. 17.
Figure 19:
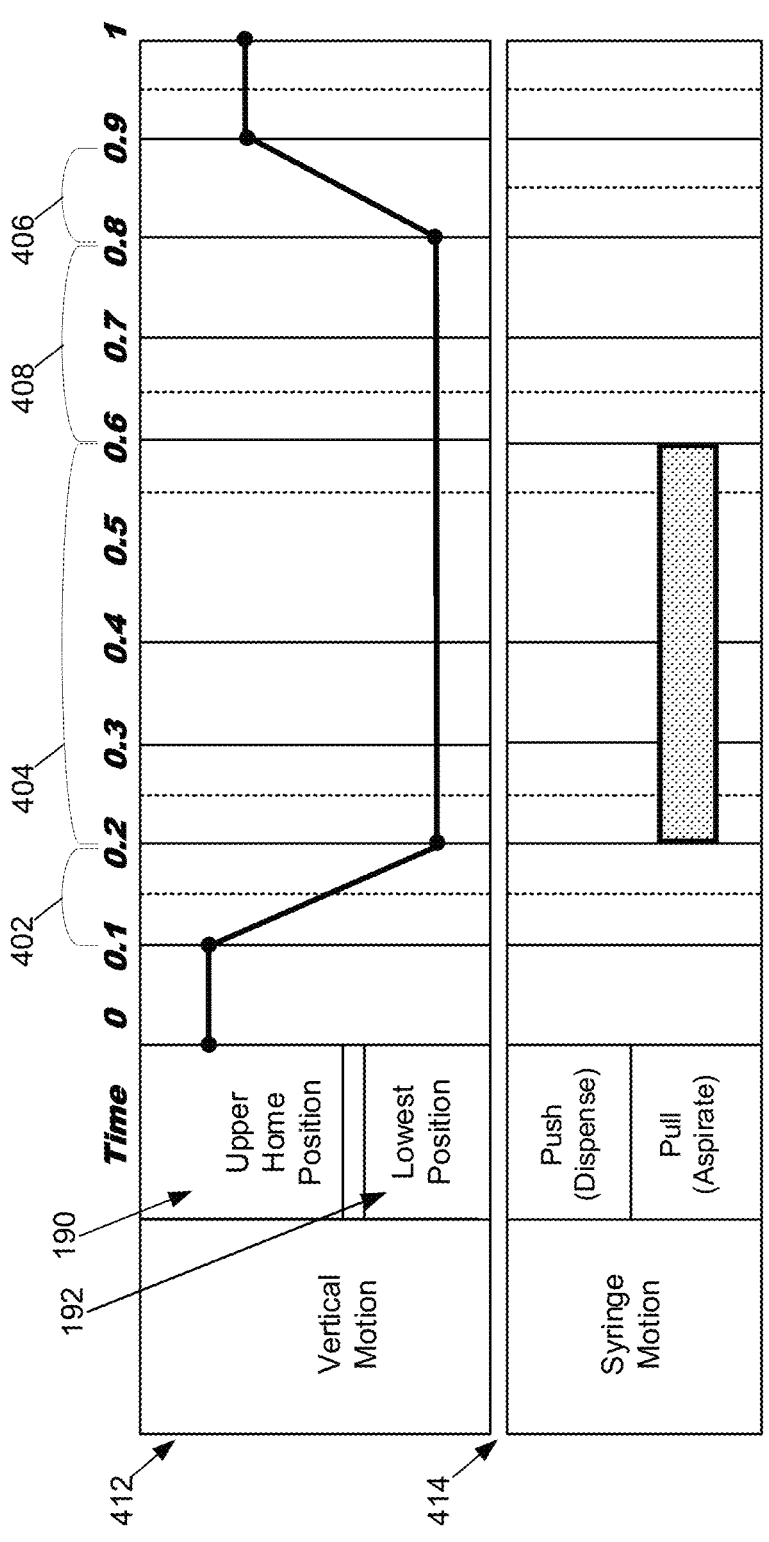
FIG. 19 is a timing diagram that shows a variation of dispense tip position and a change in syringe motion over time while performing the method of FIG. 17.

Referring to FIGS. 17-19, an example method is described for performing an overdraw process for aspirating a sample from a sample vessel 130 when the target sample volume is not less than the threshold value. In the illustrated example, the threshold value is about 25 µL. In other embodiments, however, other threshold values are possible.

FIG. 17 is a flowchart of an example method 400 for performing an overdraw process. In some examples, the method 400 is designed to implement the operation 266 of FIG. 6. The method 400 is described with also reference to FIGS. 18-19. FIG. 18 illustrates an example sequence of performing the method 400. FIG. 19 shows a variation of dispense tip position and a change in syringe motion over time while performing the method 400.

The method 400 is primarily described herein as being performed by the sample pipetting system 104 that is controlled by the precision dispense control system 106, it is noted that the method 400 can be at least partially executed by one or more other systems or devices in the substance dispense system 102, with or without cooperating with the sample pipetting system 104 and the precision dispense control system 106. Although the method 400 is described to include operations illustrated in FIG. 17, it is also possible in other embodiments that the method 400 includes only some of these operations, and/or additional operations associated with the operations described herein.

In some embodiments, the method 400 is performed similar to the method 300 in FIG. 7, except for the push-back operation 306. For example, operations 402, 404, and 406 in the method 400 are similar to the operation 302, 304, and 308 in the method 300, as described above and illustrated in FIG. 7. In particular, at operation 402, the sample pipetting system 104 operates to descend the dispense tip 120 at an aspiration height (H1) within the sample vessel 130 based on the tip aspiration height table 310, as shown in FIG. 9. As the operation 402 is similar to the operation 302 in FIG. 7, the detailed description of the operation 402 is omitted for brevity purposes.

At operation 404, the sample pipetting system 104 operates to aspirate a first volume (V1) of sample from the sample vessel 130. The sample pipetting system 104 operates to overdraw the sample at this operation such that the first volume (V1) of sample is greater than a target sample volume. As also shown in FIG. 18, the syringe assembly 164 moves the plunger back to draw the first volume of sample into the dispense tip 120.

In some embodiments, the dispense tip 120 is operated to go down as the surface level is reduced during aspiration, thereby reducing contact of the dispense tip 120 outside the sample.

At operation 406, the sample pipetting system 104 operates to ascend the dispense tip 120 away from the sample vessel 130 and ends the overdraw operation. In some examples, the dispense tip 120 moves back to a home position (e.g., the home position 190 as illustrated in, for example, FIG. 15).

As further illustrated in FIG. 19, which is a graph 412 for a variation of dispense tip position over time, and a graph 414 for a change in syringe motion over time while performing the method 400, the dispense tip 120 is lowered from 0.1 second to 0.2 second (operation 402), and the first volume (V1) is drawn into the dispense tip from 0.2 second to 0.6 second (operation 404). The dispense tip 120 is then raised back to the home position from 0.8 second to 0.9 second (operation 406). As illustrated, a break or wait period 408 can be arranged between the operations 404 and 406.

Figure 20:
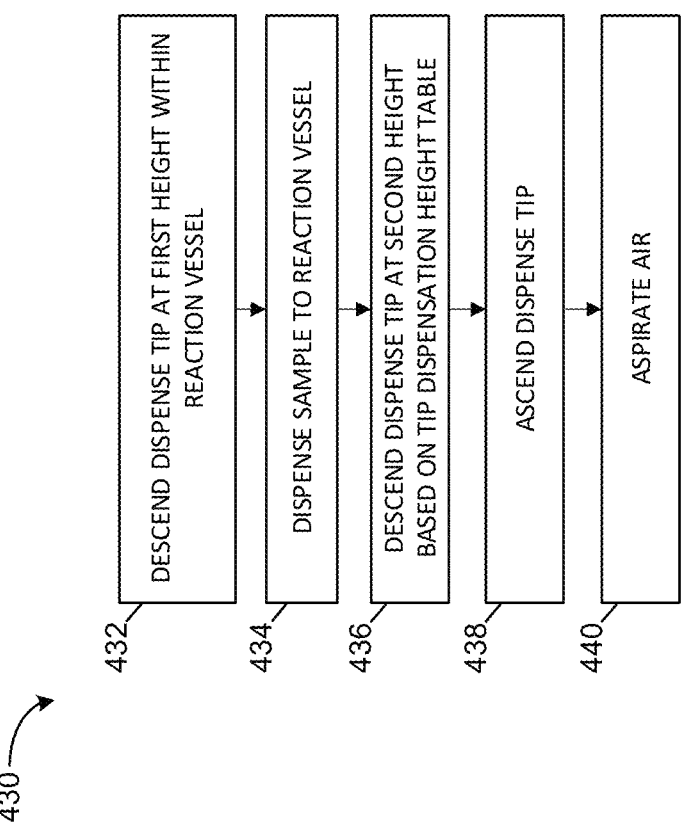
FIG. 20 is a flowchart of an example method for performing a two-step dispense motion.
Figure 21:
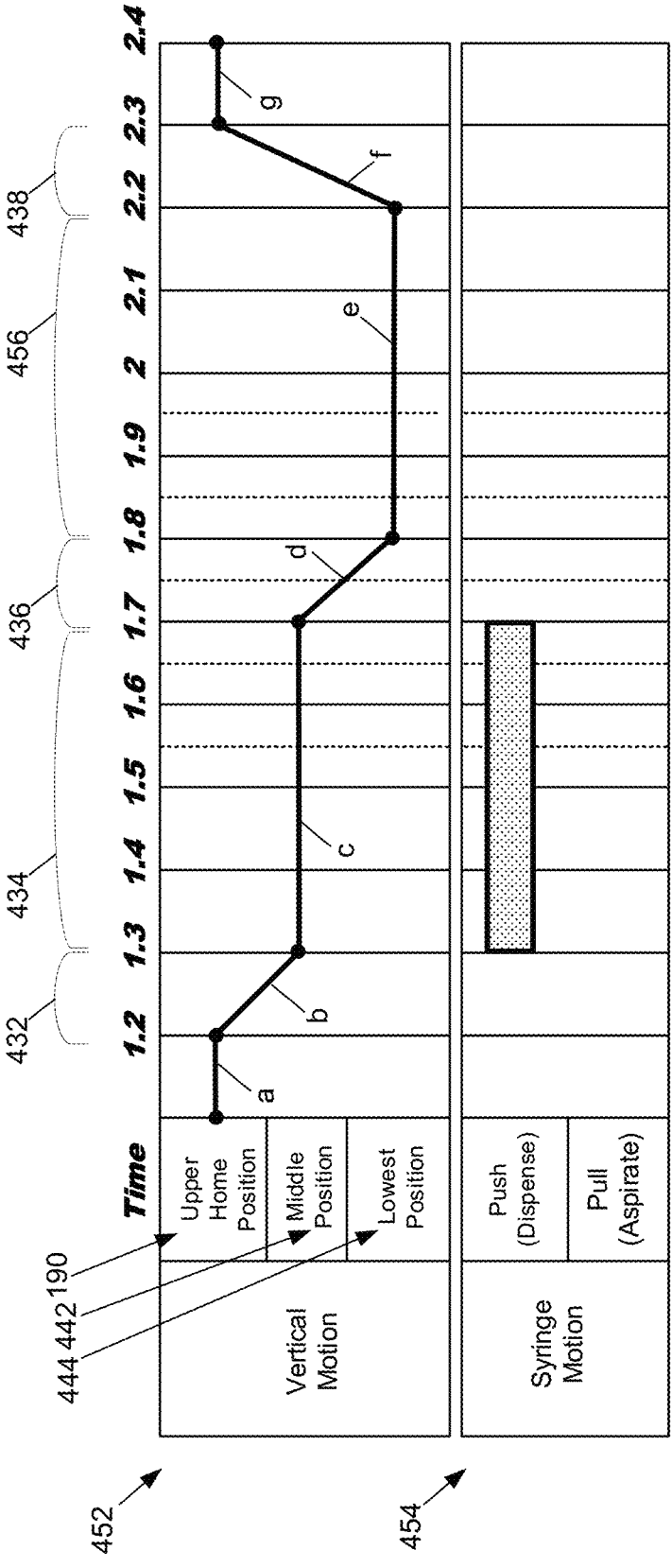
FIG. 21 is a timing diagram that illustrates an example sequence of performing the method of FIG. 20.
Figure 22:
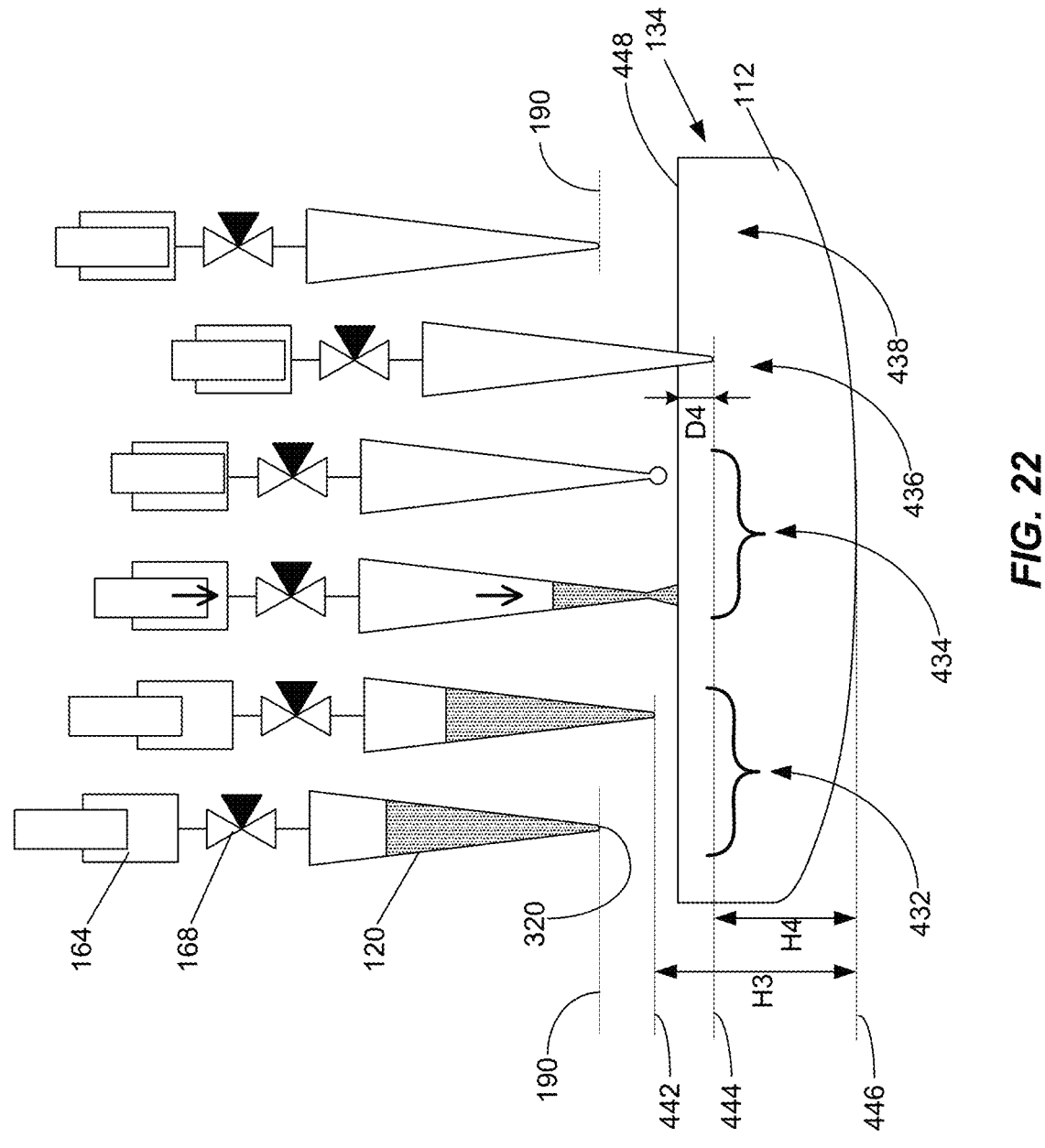
FIG. 22 schematically shows a variation of dispense tip position and a change in syringe motion over time while performing the method of FIG. 20.

Referring to FIGS. 20-22, an example method for performing a two-step dispense motion for dispensing a sample to the reaction vessel 134 when the target sample volume is not less than the threshold value. In the illustrated example, the threshold value is about 25 µL. In other embodiments, however, other threshold values are possible.

FIG. 20 is a flowchart of an example method 430 for performing a two-step dispense motion. In some examples, the method 430 is designed to implement the operation 274 of FIG. 6. The method 430 is described with reference also to FIGS. 21-22. FIG. 21 illustrates an example sequence of performing the method 430. FIG. 22 shows a variation of dispense tip position and a change in syringe motion over time while performing the method 430.

The method 430 is primarily described herein as being performed by the sample pipetting system 104 that is controlled by the precision dispense control system 106, it is noted that the method 430 can be at least partially executed by one or more other systems or devices in the substance dispense system 102, with or without cooperating with the sample pipetting system 104 and the precision dispense control system 106. Although the method 430 is described to include operations illustrated in FIG. 20, it is also possible in other embodiments that the method 430 includes only some of these operations, and/or additional operations associated with the operations described herein.

The method 430 can begin at operation 432 in which the sample pipetting system 104 operates to descend the dispense tip 120 at a first height (H3) within a reaction vessel 134. As illustrated in FIG. 22, the first height (H3) is determined such that the distal end 320 of the dispense tip 120 is located above a surface level 448 of substance in the reaction vessel 134. The first height (H3) is defined by a distance between a bottom 446 of the reaction vessel 134 and the distal end 320 of the dispense tip 120. In some embodiments, the first height (H3) is selected such that the distal end 320 of the dispense tip 120 remains above the increasing surface level 448 until the liquid substance is entirely dispensed from the dispense tip 120 to the reaction vessel 134.

At operation 434, at the first height (H3), the sample pipetting system 104 begins dispensing the sample to the reaction vessel 134. In some examples, the sample contained in the dispense tip 120 can be entirely dispensed in the reaction vessel 134 at this operation. In other examples, part of the sample contained in the dispense tip 120 can be dispensed in the reaction vessel 134 at this operation.

At operation 436, the sample pipetting system 104 operates to further descend the dispense tip 120 at a second height (H4), which is defined as a distance between the bottom 446 of the reaction vessel 134 and the distal end 320 of the dispense tip 120. In some embodiments, the second height (H4) is determined such that the distal end 320 of the dispense tip 120 barely touches (e.g., touch-off) the surface level 448 in the reaction vessel 134. In other embodiments, the second height (H4) is determined such that the distal end 320 of the dispense tip 120 is submerged at a predetermined depth (D4) under the surface level 448. The second height (H4) can be determined based on the tip dispensation height table 380 as shown in FIG. 14. The second height (H4) can be determined differently in other embodiments.

In the illustrated embodiment, the sample pipetting system 104 completes dispensation at the first height (H3) (operation 434) before moving to the second height (H4). In other embodiments, the sample can be partially dispensed at the first height (H3), and the rest of the sample can be dispensed at the second height (H4). In yet other embodiments, the sample can be at least partially dispensed while the dispense tip 120 moves from the first height (H3) to the second height (H4).

The operation 436 is also designated as step or segment d in FIG. 21 (also shown in FIG. 37). In this step, in some embodiments, there may be a drip on the dispense tip 120. However, the surface tension in the reaction vessel 134 can remove the drip off the dispense tip 120.

At operation 438, the sample pipetting system 104 operates to ascend the dispense tip 120 away from the reaction vessel 134 and ends the dispensation. As shown in FIG. 22, for example, the dispense tip 120 moves back to the home position 190.

At operation 440, the sample pipetting system 104 operates to aspirate air into the dispense tip 120 at the home position 190. This operation can reduce splashing resulting from, for example, vibration of the dispense tip 120 while moving to a different position, such as the tip waste position 178.

As further illustrated in FIG. 21, which is a graph 452 for a variation of dispense tip position over time, and a graph 454 for a change in syringe motion over time while performing the method 430, the dispense tip 120 is lowered to the first height (H3) from 1.2 second to 1.3 second (operation 432), and the sample is dispensed into the reaction vessel from 1.3 second to 1.7 second (operation 434) while the dispense tip 120 remains at the first height (H3). Then, the dispense tip 120 is further descended to the second height (H4) from 1.7 second to 1.8 second (operation 436). After that, the dispense tip 120 is raised back to the home position from 2.2 second to 2.3 second. As illustrated, the dispense tip 120 can stay at the second height (H4) for about 0.4 second (between 1.8 second to 2.2 sec) between the operations 436 and 438 (e.g., a break period 456). In FIG. 21, the graph 452 can be segmented to steps a through g, which correspond to steps a through g shown in FIG. 37.

Figure 23:
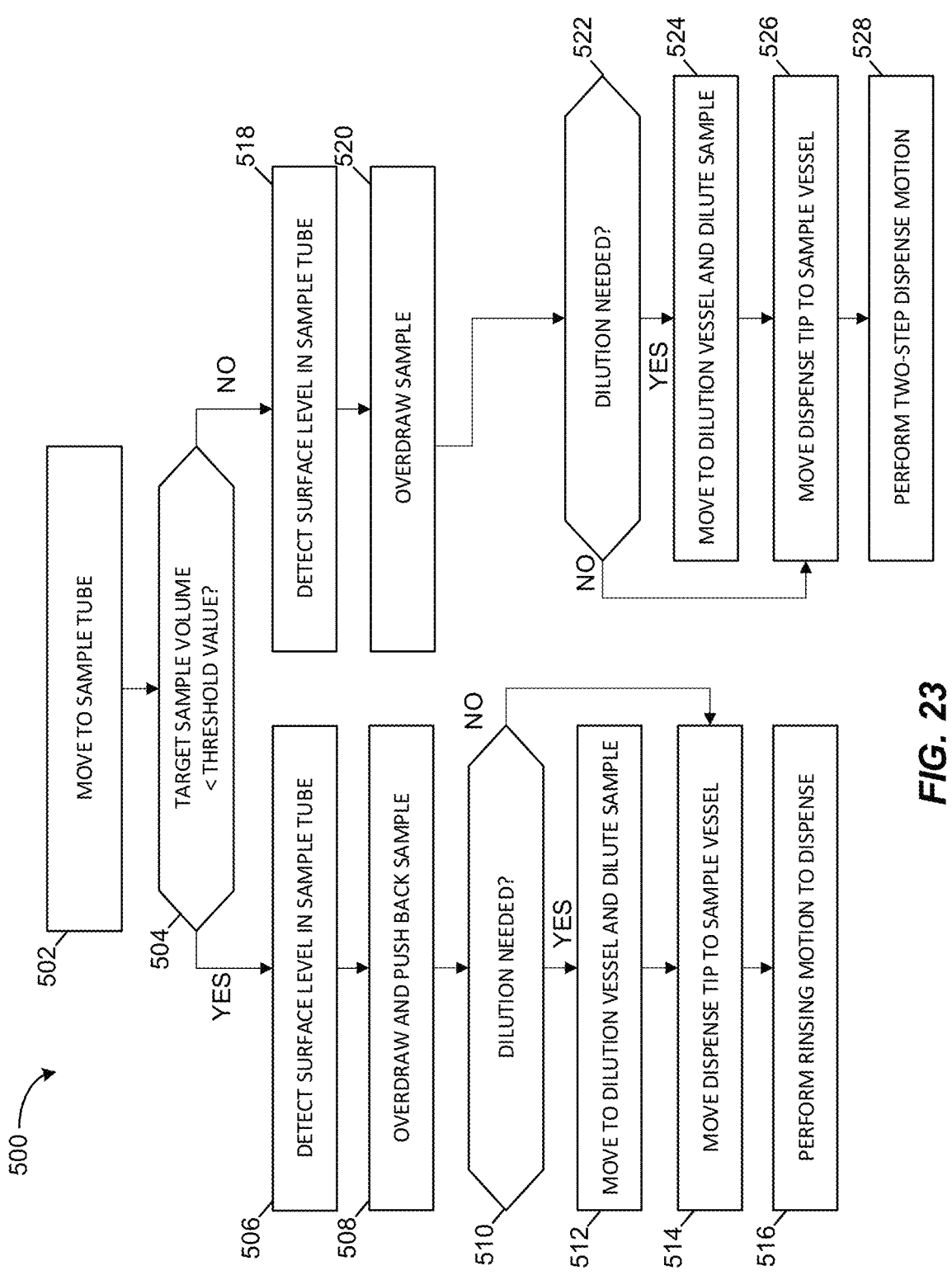
FIG. 23 is a flowchart illustrating an example method for aspirating a sample from a sample tube and dispensing the sample to a sample vessel.

Referring now to FIG. 23, an example method 500 for aspirating a sample from a sample tube 122 and dispensing the sample to a sample vessel 130 is described. In some examples, the method 500 is designed to implement the operations 210, 212, 214, 222, and 224 of FIG. 5. Although the method 500 is primarily described herein as being performed by the sample pipetting system 104 that is controlled by the precision dispense control system 106, it is noted that the method 500 can be at least partially executed by one or more other systems or devices in the substance dispense system 102, with or without cooperating with the sample pipetting system 104 and the precision dispense control system 106. Although the method 500 is described to include operations illustrated in FIG. 23, it is also possible in other embodiments that the method 500 includes only some of these operations, and/or additional operations associated with the operations described herein.

In general, the method 500 for aspirating a sample from a sample tube and dispensing it to a sample vessel is similar to the method 250 for aspirating a sample from a sample vessel and dispensing it to a reaction vessel, as described in FIG. 6, except for operations (such as operation 506 or 518 in FIG. 23) for detecting a surface level of sample contained in the sample tube 122. Therefore, the description for the operations in the method 250 is hereby incorporated by reference for the operations in the method 500 that are similar to the operations in the method 250. The following description for the method 500 will be limited primarily to the differences from the method 250.

For example, at operation 502, the sample pipetting system 104 moves the sample pipetting module 150 to a sample tube 122 containing a sample, similar to the operation 210 in FIG. 5. As described with reference to the operation 252 in FIG. 6, when a sample is aspirated from the sample tube 122, the volume of sample contained in the sample tube 122 is not necessarily known and there may be a need of measuring or estimating the surface level of sample in the sample tube 122.

At operation 504, if a target sample volume is smaller than a threshold value ("YES" in this operation), the method 500 moves on to operation 506. Otherwise ("NO" at this operation), the method 500 continues at operation 518. As such, in the method 500, the sample pipetting system 104, which can be controlled by the precision dispense control system 106, operates different processes for aspiration and dispensation based on a target sample volume to be prepared. The threshold value can be determined based on various factors. Example factors include configurations and attributes of dispense tip 120 (e.g., size, capacity, material, etc.), arrangement of dispense tip 120 relative to containers for aspiration or dispensation, and type of sample or other substances. In one example, the threshold value is about 25 μL. Other threshold values are also possible in other examples.

In some embodiments, the determination operation 504 can be automatically performed as part of sample preparation process in the instrument 100. For example, the instrument 100 is configured to receive a user input of a target sample volume and determine which operation to perform at the operation 504. In other embodiments, the instrument 100 is configured such that a user can manually select which operation to perform via a user interface associated with the instrument 100.

At operation 506, the sample pipetting system 104 operates to detect a surface level of sample in the sample tube 122. In some examples, when a sample is to be aspirated from a sample tube 122, the volume of sample contained in the sample tube 122 is not known. Therefore, it is necessary to measure or estimate the surface level of sample in the sample tube 122 in order to determine how deep the dispense tip 120 needs to descend to aspirate the sample within the sample tube 122. An example of this operation is described in more detail with reference to FIG. 24.

At operation 508, when the target sample volume is less than the threshold value (e.g., 25 μL), the sample pipetting system 104 performs overdraw and push-back process for aspirating the sample from the sample tube 122. The operation 508 is performed similar to the operation 256 as described in FIG. 6. An example method for performing the overdraw and push-back process is described with reference to FIG. 24.

At operation 510, if a dilution is needed prior to dispensation, the method 500 moves on to operation 512. If a dilution is not needed, the method 500 skips to operation 514. The operation 510 is performed similar to the operation 258 as described in FIG. 6.

At operation 512, the sample pipetting system 104 moves the sample pipetting module 150 to a dilution vessel 132 containing a diluent, and operates to dilute the sample within the dilution vessel 132. The operation 512 is performed similar to the operation 260 as described in FIG. 6. An example dilution method from the sample tube 122 is described with reference to FIG. 30.

At operation 514, the sample pipetting system 104 moves the sample pipetting module 150 to a reaction vessel 134, similar to the operation 222 of FIG. 5. The operation 514 is performed similar to the operation 262 as described in FIG. 6.

At operation 516, the sample pipetting system 104 performs a rinsing motion to dispense the sample to the reaction vessel 134 when the target sample volume is less than the threshold value (e.g., 25 μL). The operation 516 is performed similar to the operation 264 as described in FIG. 6. An example method for performing the rinsing motion for dispense is described above with reference to FIG. 13.

At operation 518, when the target sample volume is not less than the threshold value (e.g., 25 μL), the sample pipetting system 104 operates to detect a surface level of sample in the sample tube 122, similar to the operation 506. An example of this operation is described in more detail with reference to FIG. 27.

At operation 520, when the target sample volume is not less than the threshold value (e.g., 25 μL), the sample pipetting system 104 performs overdraw for aspirating the sample from the sample tube 122. The operation 520 is performed similar to the operation 266 as described in FIG. 6. For example, the sample pipetting system 104 aspirates a volume of sample from the sample tube 122 which is greater than the target sample volume. In some embodiments, such an overdrawn volume of sample is predetermined regardless of the target sample volume. In other embodiments, the overdrawn volume of sample varies depending on the target sample volume.

At operation 522, if a dilution is needed prior to dispensation, the method 500 moves on to operation 524. If a dilution is not needed, the method 500 skips to operation 526. The operation 522 is performed similar to the operation 268 as described in FIG. 6.

At operation 524, the sample pipetting system 104 moves the sample pipetting module 150 to a dilution vessel 132 containing a diluent, and operates to dilute the sample within the dilution vessel 132. The operation 524 is performed similar to the operation 270 as described above and illustrated in FIG. 6. An example dilution method from the sample tube 122 is described with reference to FIG. 30.

At operation 526, the sample pipetting system 104 moves the sample pipetting module 150 to a reaction vessel 134, similar to the operation 222 of FIG. 5. The operation 526 is performed similar to the operation 272 as described in FIG. 6.

At operation 528, the sample pipetting system 104 performs a two-step dispense motion to dispense the sample to the reaction vessel 134 when the target sample volume is not less than the threshold value (e.g., 25 μL). The operation 528 is performed similar to the operation 274 as described above and illustrated in FIG. 6. An example method for performing the two-step dispense motion is described above with reference to FIG. 20.

Figure 24:
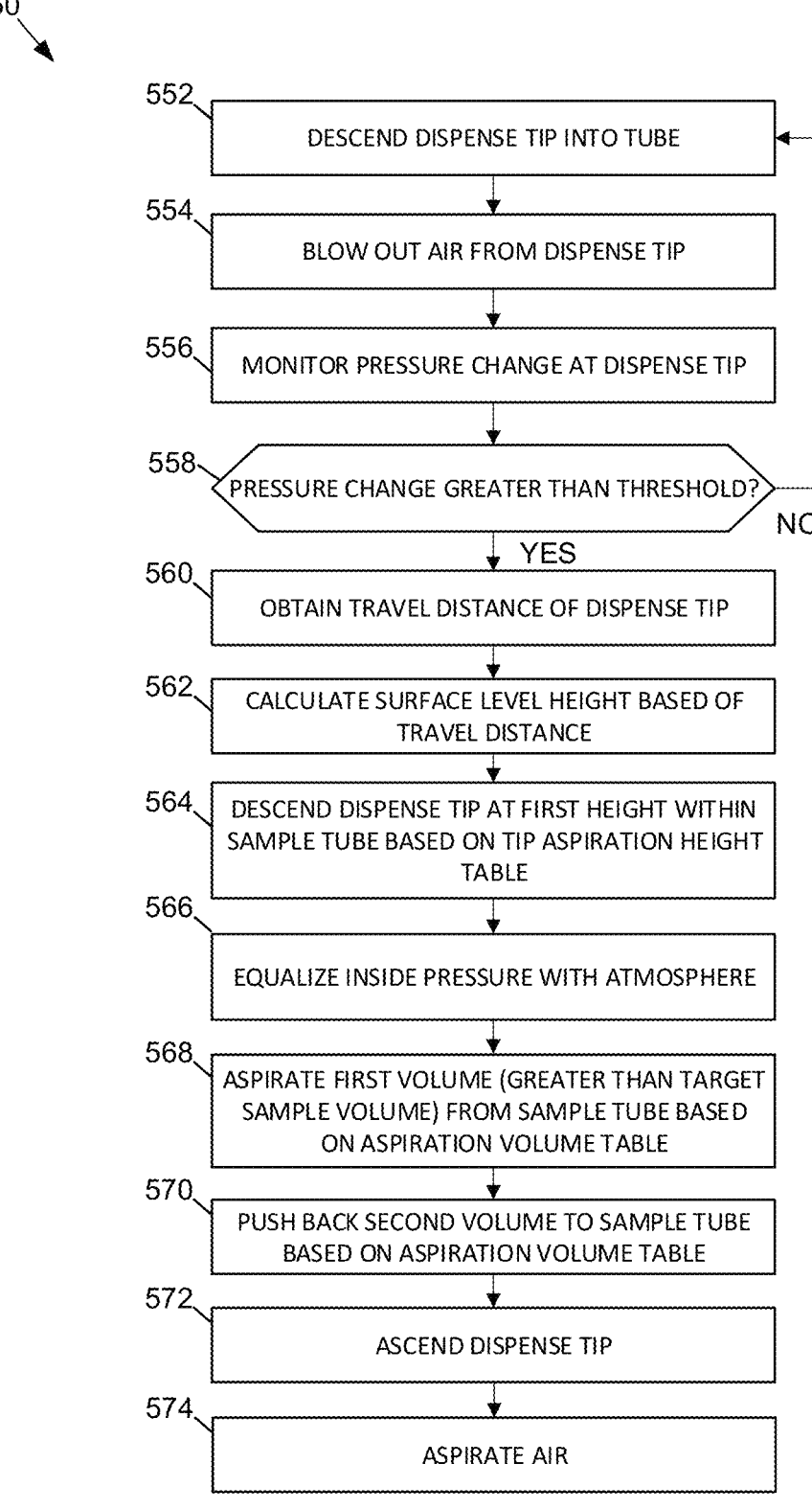
FIG. 24 is a flowchart illustrating an example method for detecting a surface level of sample and performing an overdraw and push-back process.
Figure 25:
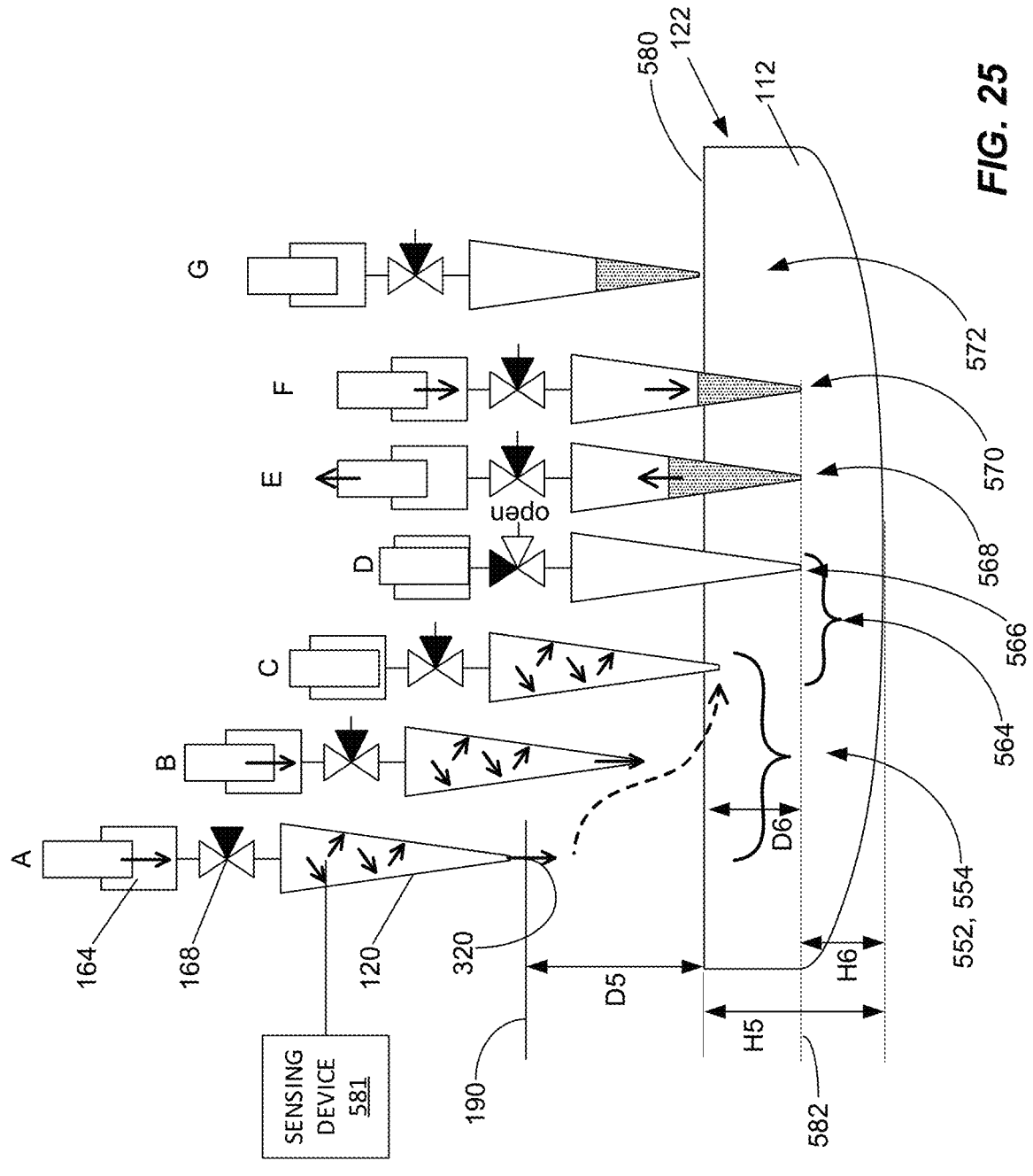
FIG. 25 schematically illustrates an example sequence of performing the method of FIG. 24.
Figure 26:
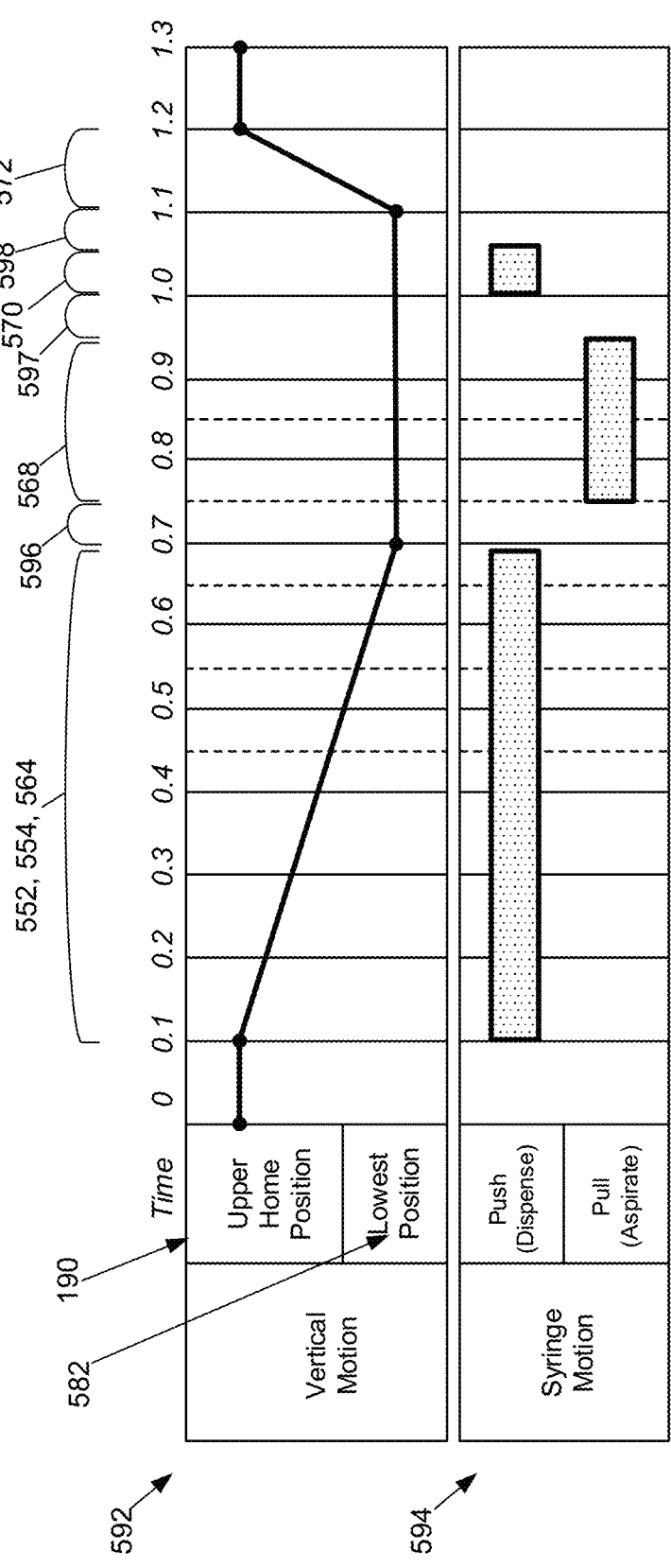
FIG. 26 is a timing diagram that shows a variation of dispense tip position and a change in syringe motion over time while performing the method of FIG. 24.

Referring now to FIGS. 24-26, an example method is described for detecting a surface level of sample in a sample tube 122 and performing overdraw and push-back processes for aspirating a sample from the sample tube 122 when the target sample volume is less than the threshold value. In the illustrated example, the threshold value is about 25 μL. In other embodiments, however, other threshold values are possible.

FIG. 24 is a flowchart illustrating an example method 550 for detecting a surface level of sample and performing an overdraw and push-back process in a single dive motion. In some examples, the method 550 is designed to implement the operations 506 and 508 of FIG. 23. The method 550 is described with reference also to FIGS. 25 and 26. FIG. 25 illustrates an example sequence of performing the method 550 of FIG. 24. FIG. 26 shows a variation of dispense tip position and a change in syringe motion over time while performing the method 550.

The method 550 is primarily described herein as being performed by the sample pipetting system 104 that is controlled by the precision dispense control system 106, it is noted that the method 550 can be at least partially executed by one or more other systems or devices in the substance dispense system 102, with or without cooperating with the sample pipetting system 104 and the precision dispense control system 106. Although the method 550 is described to include operations illustrated in FIG. 24, it is also possible in other embodiments that the method 300 includes only some of these operations, and/or additional operations associated with the operations described herein.

The method 550 can begin at operation 552 in which the sample pipetting system 104 operates to descend the dispense tip 120 into a sample tube 122. Then, at operation 554, the sample pipetting system 104 operates to blow out air from the dispense tip 120. In some examples, the air is discharged from the dispense tip 120 while the dispense tip 120 is descended into the sample tube 122. As shown in FIG. 25, the dispense tip 120 is lowered while being above a surface level 580 of sample in the sample tube 122, and the air can be blown out from the dispense tip 120 as the dispense tip 120 is descended.

At operation 556, the sample pipetting system 104 operates to monitor a pressure change at the dispense tip 120. In some examples, the pressure change at the dispense tip 120 is monitored as the dispense tip 120 is lowered relative to the sample tube 122. For example, the sample pipetting system 104 includes a sensing device 581 configured to monitor a pressure change at the distal end 320 of the dispense tip 120. The pressure change at the distal end 320 of the dispense tip 120 can indicate that the dispense tip 120 touches the surface level 580 at the distal end 320. As such, the sensing device 581 operates to detect whether the sample in the sample tube 122 contacts the distal end of the dispense tip 120. Further, the sensing device 581 can transmit a signal to a control device (e.g., the precision dispense control system 106) so that the control device uses the signal to stop lowering the dispense tip 120. For example, the dispense tip 120 moves down into the sample tube 122 while blowing out air from the dispense tip 120, and the sample pipetting system 104 stops moving the dispense tip 120 down when the dispense tip 120 touches the surface level 580 of sample in the sample tube 122 and detects a pressure change resulting from the touching of the surface level.

At operation 558, the sample pipetting system 104 can determine whether the pressure change is greater than a threshold. If the pressure change is greater than the threshold ("YES" at this operation), the method 550 moves to operation 560. Otherwise ("NO" at this operation), the method 550 returns to the operation 552 and perform the operation 552 and subsequent operations.

In other embodiments, the sample pipetting system 104 can simply determine whether any pressure change is detected at the operation 558. If any pressure change is detected, the method 550 goes on at operation 560. Otherwise, the method 550 returns to the operation 552.

At operation 560, the sample pipetting system 104 obtains a travel distance (D5) of the dispense tip 120. At operation 562, the sample pipetting system 104 then calculates a height (H5) of the surface level 580 based on the travel distance (D5).

At operation 564, the sample pipetting system 104 operates to further descend the dispense tip 120 at an aspiration height (H6) within the sample tube 122. In some embodiments, the aspiration height (H6) is determined based on the tip aspiration height table 310 as described in FIG. 9. In other embodiments, the aspiration height (H6) is determined differently. As illustrated in FIG. 25, the distal end 320 of the dispense tip 120 moves from the home position 190 to the aspiration position 582. At the aspiration position 582, the dispense tip 120 is submerged at a depth (D6) from the surface level 580. The depth (D6) can vary based on various factors. In some examples, the depth (D6) is about 2 mm.

At operation 566, the sample pipetting system 104 operates to equalize the pressure within the dispense tip 120 with the atmosphere, prior to aspirating the sample. In some embodiments, the sample pipetting system 104 opens the valve 168 (e.g., a three-way valve) to form fluid communication between the dispense tip 120 and the atmosphere while closing fluid communication between the dispense tip 120 and the syringe assembly 164. By opening the dispense tip 120 to the atmosphere, the positive pressure inside the dispense tip 120 is released to cancel a biased pressure. When the pressure is equalized, the valve 168 is closed. As described herein, when the aspiration volume is large, the operation 566 can be omitted and the sample pipetting system 104 can precisely aspirate a sample without this operation.

At operation 568, the sample pipetting system 104 operates to aspirate a first volume (V1) of sample from the sample tube 122. In some embodiments, the first volume (V1) is determined based on the aspiration volume table 330 as described in FIG. 10. The sample pipetting system 104 operates to overdraw the sample at this operation such that the first volume (V1) of sample is greater than a target sample volume. As also shown in FIG. 25, the syringe assembly 164 moves the plunger back to draw the first volume of sample into the dispense tip 120.

At operation 570, the sample pipetting system 104 operates to push back a second volume (V2) of sample from the dispense tip 120 to the sample tube 122. In some embodiments, the second volume (V2) is determined based on the aspiration volume table 330. Once the second volume (V2) is dispensed, the dispense tip 120 will contain the target sample volume. As also shown in FIG. 25, the syringe assembly 164 pushes the plunger to dispense the second volume of sample into the sample vessel.

In some embodiments, the sample pipetting system 104 can move the dispense tip 120 up or down as the surface level 580 changes resulting from the aspiration and pushback operations, in order to reduce contact of the dispense tip 120 (e.g., the distal end 320 thereof) with the outside of sample.

In some embodiments, after waiting a predetermined period of time to complete actual liquid motion, the extra sample is pushed back into the sample tube 122 to cancel the negative pressure created in the operation 568 and/or the operation 570.

At operation 572, the sample pipetting system 104 operates to ascend the dispense tip 120 away from the sample tube 122 and ends the overdraw and push-back operation. As shown in FIG. 25, for example, the dispense tip 120 moves above the surface level 580.

At operation 574, the sample pipetting system 104 operates to aspirate air into the dispense tip 120 above the surface level. This operation can reduce splashing resulting from, for example, vibration of the dispense tip 120 while moving to a different position, such as the sample dispense position 176.

As further illustrated in FIG. 26, which is a graph 592 for a variation of dispense tip position over time, and a graph 594 for a change in syringe motion over time while performing the method 550, the dispense tip 120 is lowered from 0.1 second to 0.7 second (operations 552 and 564), and the air is discharged from the dispense tip 120 (operation 554). As described, the operations 552 and 565 are continuously performed such that the dispense tip 120 is lowered at the first height (H6) as the air is blown out from the dispense tip 120. The first volume (V1) is drawn into the dispense tip from 0.75 second to 0.95 second (operation 568). The second volume (V2) is pushed back into the sample tube 122 from 1.0 second to 1.05 second (operation 570), and the dispense tip 120 is raised back from 1.1 second to 1.2 second (operation 572). As illustrated, break or wait periods, such as a first break period 596, a second break period 597, and a third break period 598 can be arranged between at least one of adjacent operations 552, 554, 556, 568, 570, and 572.

As described and illustrated above with reference to FIG. 25, the process of opening the valve 168 to atmosphere is related to level detection. This level detection is particularly useful when aspirating from the sample tube 122, as the level of the fluid substance 112 may be unknown. In the sample vessel 130, the level may be calculated, and therefore a level detection process may not typically be needed.

At step A in FIG. 25, the valve 168 fluidly connects the interior of the dispense tip 120 and the syringe assembly 164. The syringe assembly 164 pumps air through the valve 168 and into the interior of the dispense tip 120. Vertical movement of the dispense tip 120 toward the fluid substance 112 begins at step A and continues through step B with the valve 168 in the same position. At step C, the surface level 580 of the fluid substance 112 is detected (e.g., by monitoring the pressure of the air in the interior of the dispense tip 120 and the syringe assembly 164). In certain embodiments, the maximum time spent in steps A-B-C is 1.0 second.

Between steps C and D, the valve 168 fluidly connects the interior of the dispense tip 120 to atmosphere. Between steps C and D, the distal end 320 of the dispense tip 120 moves below the surface level 580 of the fluid substance 112. However, the fluid substance 112 does not enter the interior of the dispense tip 120 as the opening at the distal end 320 of the dispense tip 120 is sufficiently small and the surface tension of the fluid substance 112 is sufficiently high. In certain embodiments, the time spent between steps C-D is 50 milliseconds, in certain embodiments.

The time spent between step D and the start of step E is 0.6 second, in certain embodiments. Before the start of step E, the valve 168 fluidly connects the interior of the dispense tip 120 and the syringe assembly 164, and the connection to atmosphere is closed.

In step E, the syringe assembly 164 aspirates a portion of the fluid substance 112 into the interior of the dispense tip 120. The time spent between the start and finish of step E is 0.6 second, in certain embodiments. The valve 168 continues to fluidly connect the interior of the dispense tip 120 and the syringe assembly 164.

The time spent between the finish of step E and the start of step F is 350 milliseconds, in certain embodiments. The valve 168 continues to fluidly connect the interior of the dispense tip 120 and the syringe assembly 164.

In step F, the syringe assembly 164 pushes back a portion of the fluid substance 112 to the sample tube 122 from the interior of the dispense tip 120. The time spent between the start and finish of step F is 50 millisecond, in certain embodiments. The valve 168 continues to fluidly connect the interior of the dispense tip 120 and the syringe assembly 164.

Vertical movement of the dispense tip 120 out of the fluid substance 112 occurs between steps F and G. The time spent between the end of step F and step G is 0.6 second, in certain embodiments. The valve 168 continues to fluidly connect the interior of the dispense tip 120 and the syringe assembly 164.

Figure 27:
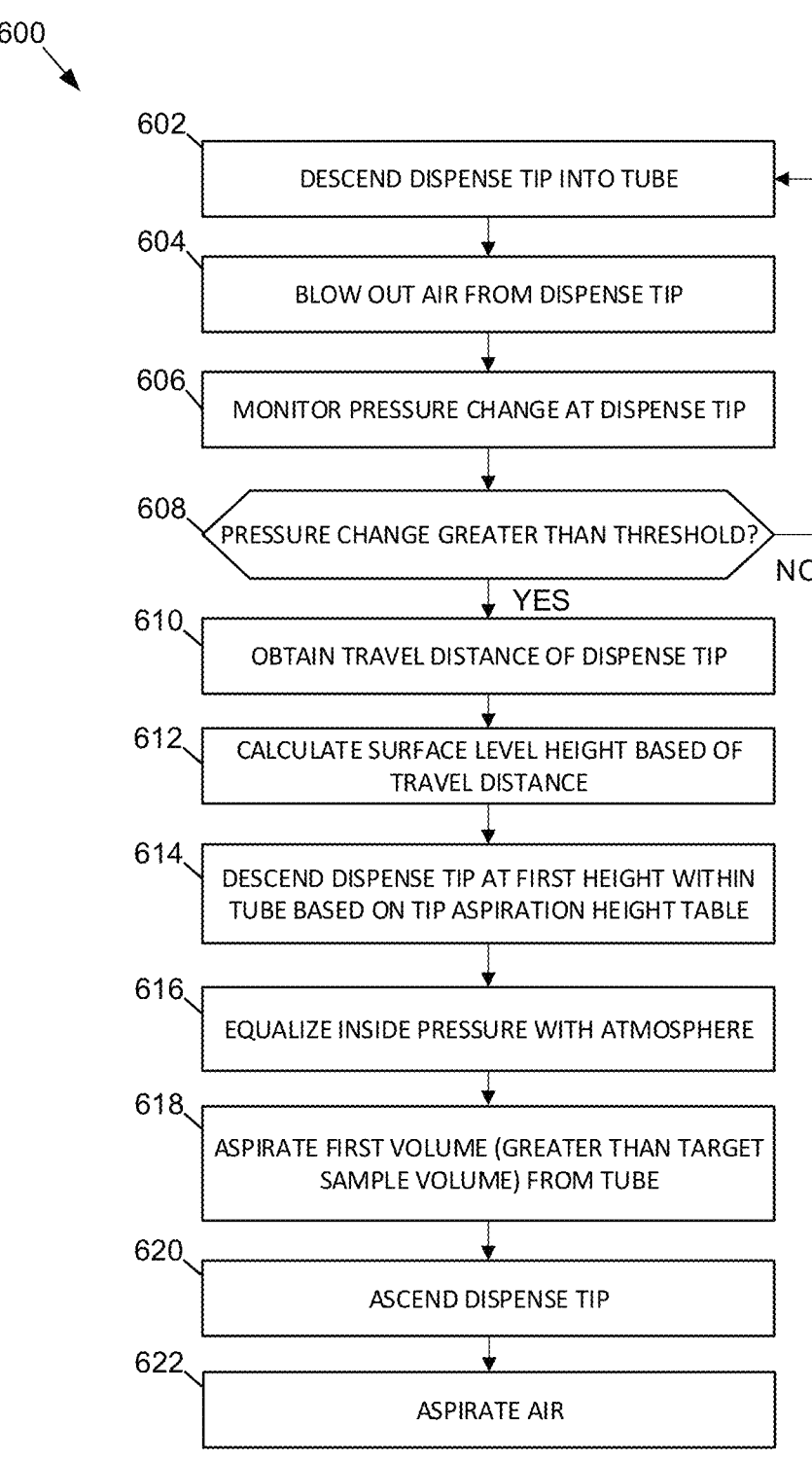
FIG. 27 is a flowchart illustrating an example method for detecting a surface level of sample and performing an overdraw and push-back process.
Figure 28:
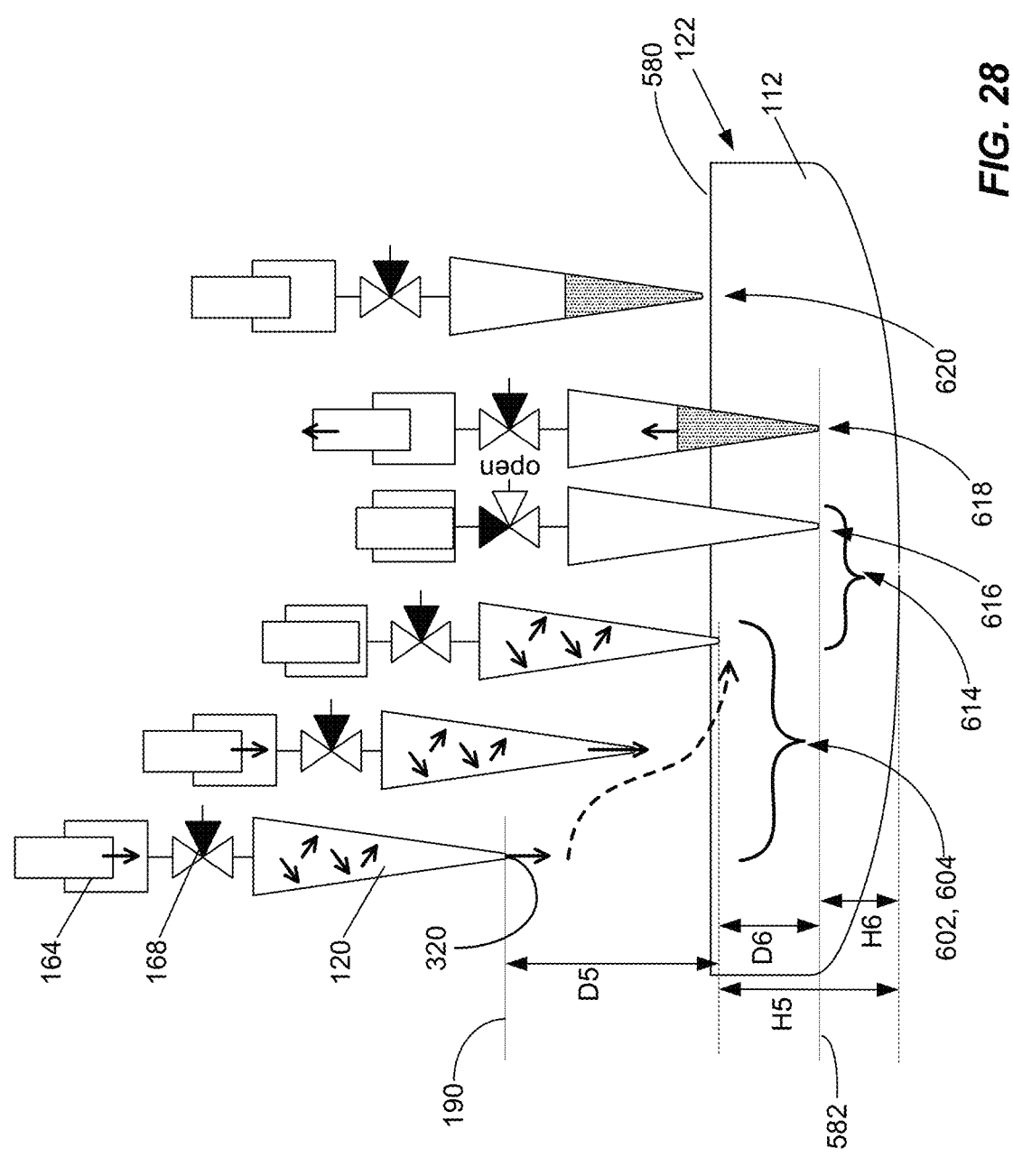
FIG. 28 schematically illustrates an example sequence of performing the method of FIG. 27.
Figure 29:
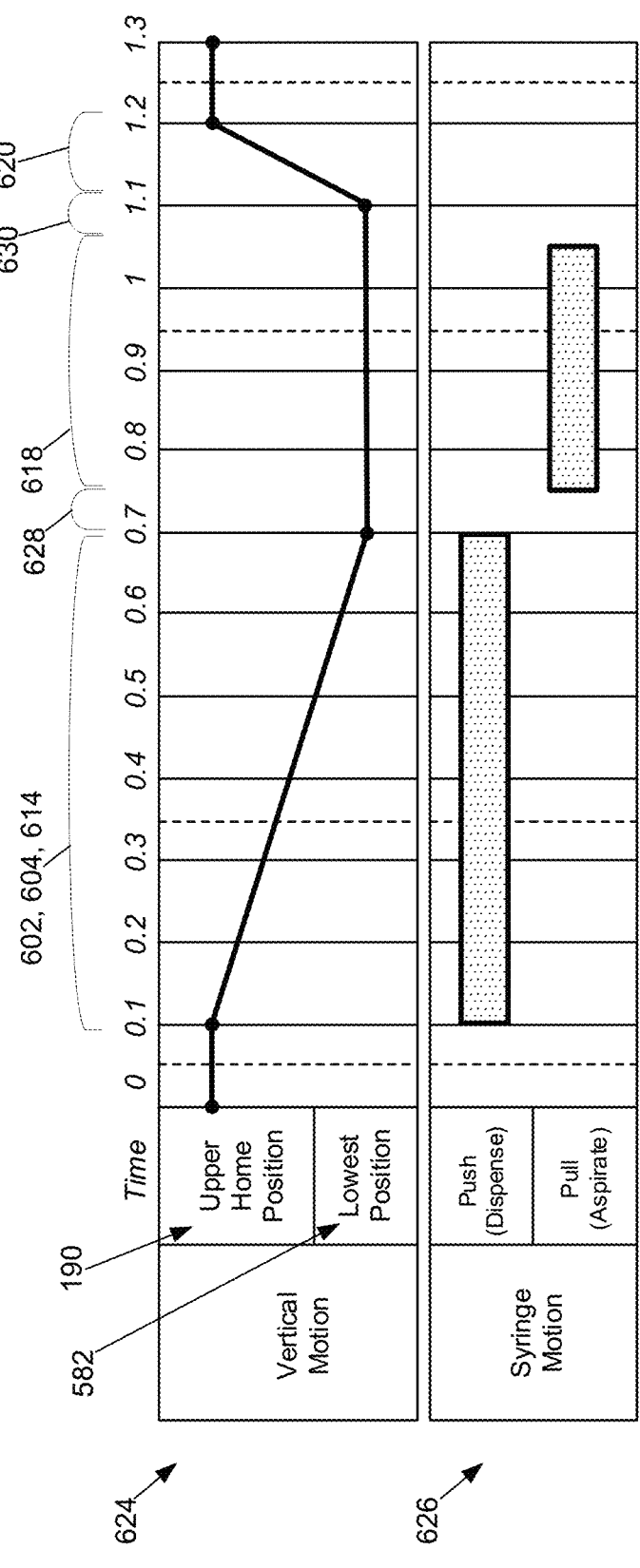
FIG. 29 is a timing diagram that shows a variation of dispense tip position and a change in syringe motion over time while performing the method of FIG. 27.

Referring now to FIGS. 27-29, an example method for detecting a surface level of sample in a sample tube 122 and performing overdraw process for aspirating a sample from the sample tube 122 when the target sample volume is not less than the threshold value. In the illustrated example, the threshold value is about 25 µL. In other embodiments, however, other threshold values are possible.

FIG. 27 is a flowchart illustrating an example method 600 for detecting a surface level of sample and performing an overdraw and push-back process. In some examples, the method 550 is designed to implement the operations 518 and 520 of FIG. 23. The method 600 is described with also reference to FIGS. 28 and 29. FIG. 28 illustrates an example sequence of performing the method 600 of FIG. 27. FIG. 29 shows a variation of dispense tip position and a change in syringe motion over time while performing the method 600.

The method 600 is primarily described herein as being performed by the sample pipetting system 104 that is controlled by the precision dispense control system 106, it is noted that the method 600 can be at least partially executed by one or more other systems or devices in the substance dispense system 102, with or without cooperating with the sample pipetting system 104 and the precision dispense control system 106. Although the method 600 is described to include operations illustrated in FIG. 27, it is also possible in other embodiments that the method 600 includes only some of these operations, and/or additional operations associated with the operations described herein.

In the illustrated example, the method 600 includes operations 602, 604, 606, 608, 610, 612, 614, 616, 618, 620, and 622. These operations are performed similar to the operations 552, 554, 556, 558, 560, 562, 564, 566, 568, 572, and 574, respectively. Therefore, the description of operations 602, 604, 606, 608, 610, 612, 614, 616, 618, 620, and 622 are omitted for brevity purposes. As such, the method 600 does not include a push-back motion after aspirating a first volume of sample from the sample tube 122, but the rest of the operations are identical or similar to those in the method 550.

As further illustrated in FIG. 29, which is a graph 624 for a variation of dispense tip position over time, and a graph 626 for a change in syringe motion over time while performing the method 600, the dispense tip 120 is lowered from 0.1 second to 0.7 second (operations 602 and 614), and the air is discharged from the dispense tip 120 (operation 604). As described, the operations 602 and 614 are continuously performed such that the dispense tip 120 is lowered at the first height (H6) as the air is blown out from the dispense tip 120. The first volume (V1) is drawn into the dispense tip from 0.75 second to 1.05 second (operation 618). Then, the dispense tip 120 is raised back from 1.1 second to 1.2 second (operation 620). As illustrated, break or wait periods, such as a first break period 628 and a second break period 630 can be arranged between at least one of adjacent operations 602, 604, 614, 618, and 620.

Figure 30:
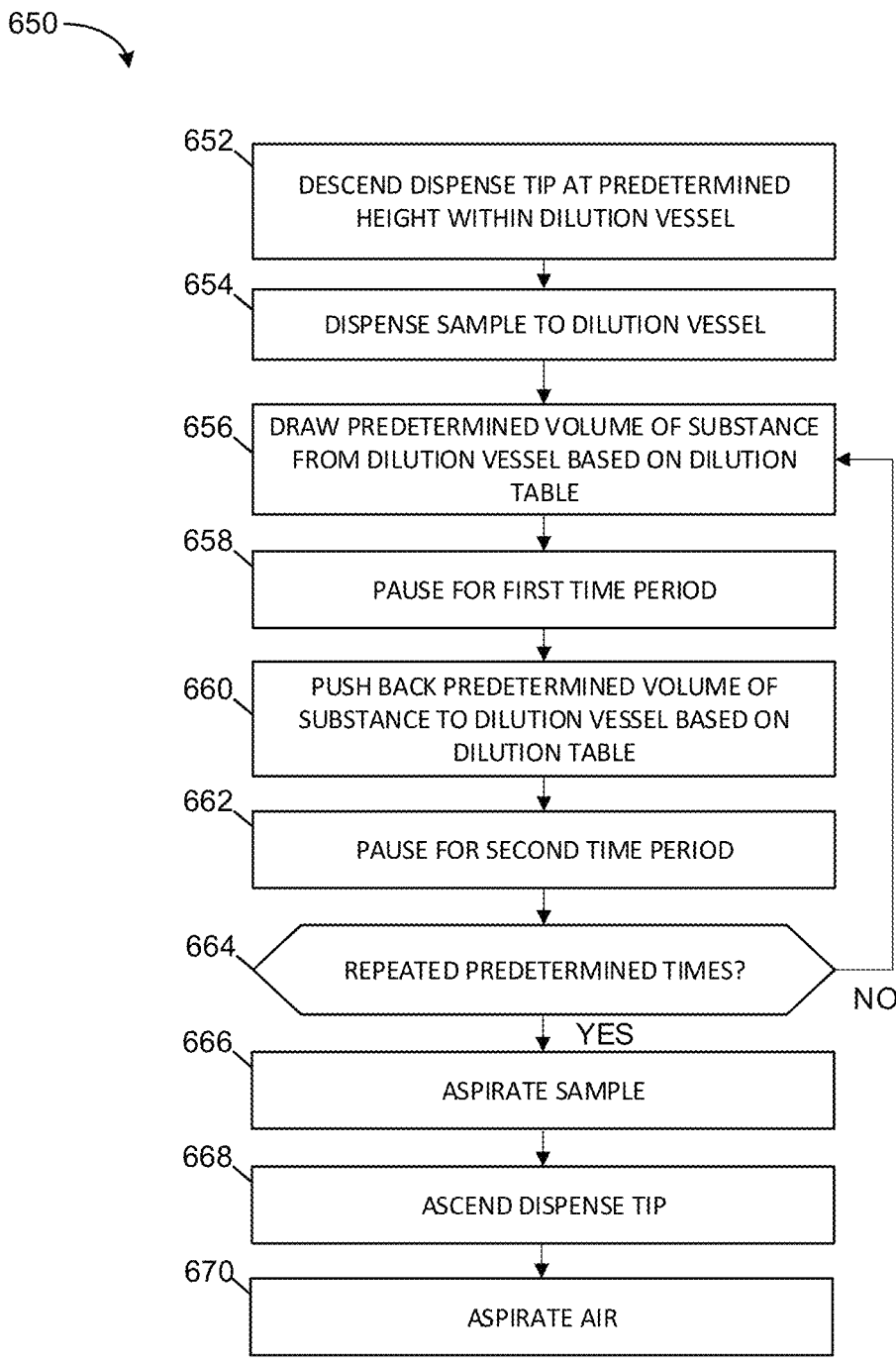
FIG. 30 is a flowchart illustrating an example method for performing dilution process.
Figure 32:
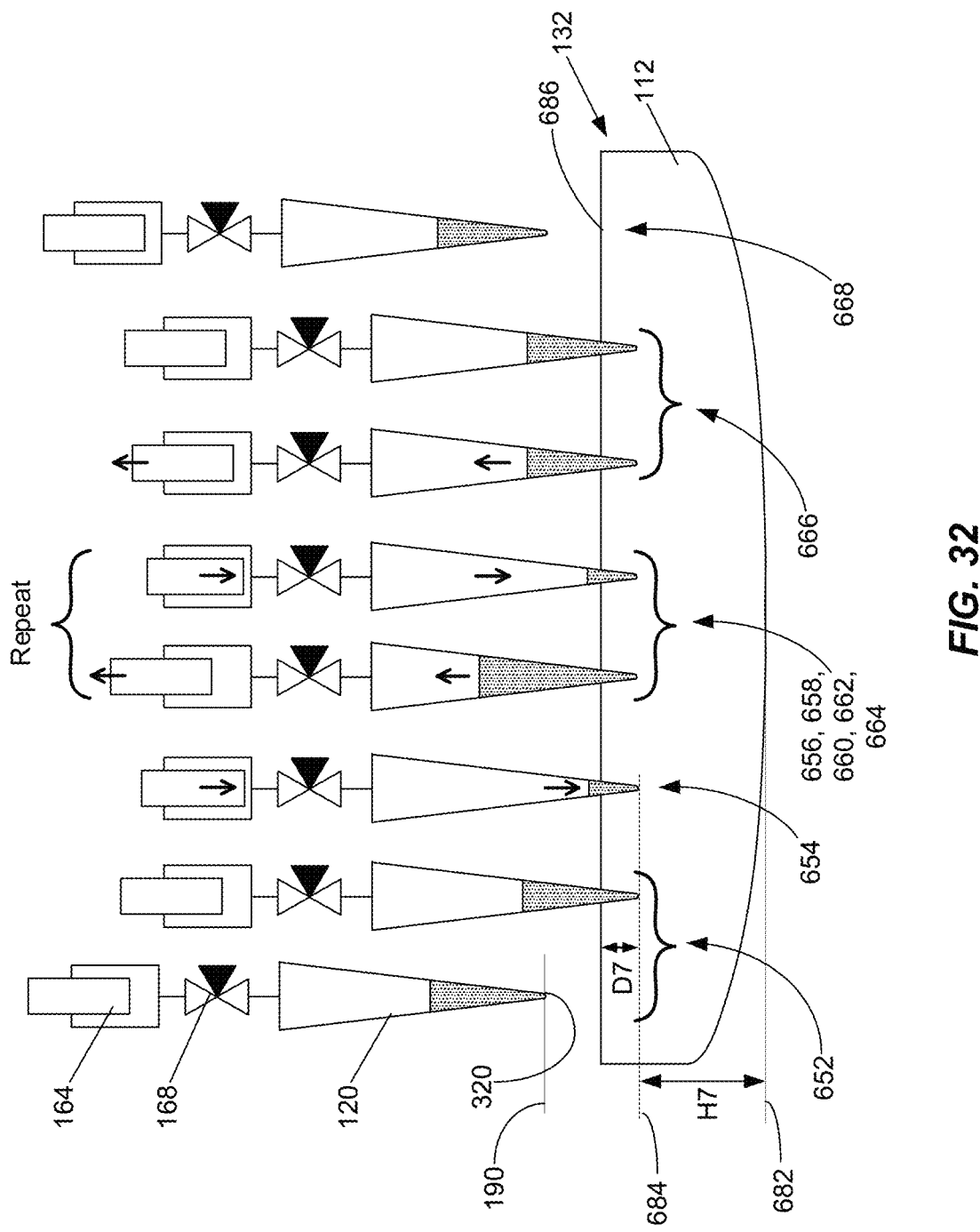
FIG. 32 schematically illustrates an example sequence of performing the method of FIG. 30.
Figure 33:
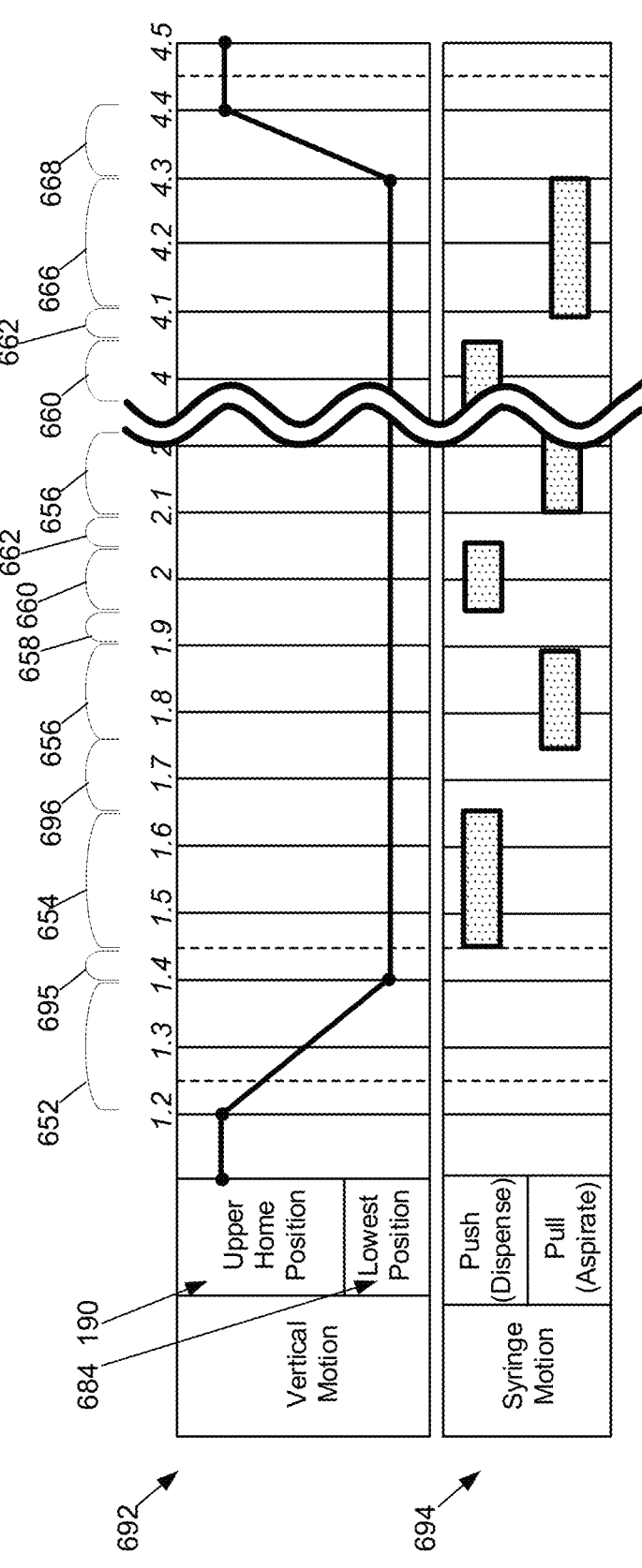
FIG. 33 is a timing diagram that shows a variation of dispense tip position and a change in syringe motion over time while performing the method of FIG. 30.

Referring now to FIGS. 30-33, an example method for diluting a sample is described. In particular, FIG. 30 is a flowchart illustrating an example method 650 for performing dilution process. In some examples, the method 650 is designed to implement the operation 220 of FIG. 5, the operations 260 and 270 in FIG. 6, and the operations 512 and 514 in FIG. 23. The method 650 is described with also reference to FIGS. 31-33. FIG. 31 is an example table for draw and push-back volumes for dilution. FIG. 32 illustrates an example sequence of performing the method 650 of FIG. 30. FIG. 33 shows a variation of dispense tip position and a change in syringe motion over time while performing the method 650.

The method 650 is primarily described herein as being performed by the sample pipetting system 104 that is controlled by the precision dispense control system 106, it is noted that the method 650 can be at least partially executed by one or more other systems or devices in the substance dispense system 102, with or without cooperating with the sample pipetting system 104 and the precision dispense control system 106. Although the method 650 is described to include operations illustrated in FIG. 30, it is also possible in other embodiments that the method 300 includes only some of these operations, and/or additional operations associated with the operations described herein.

Referring to FIG. 30, the method 650 can begin at operation 652 in which the sample pipetting system 104 operates to descend the dispense tip 120 at a predetermined height (H7) (FIG. 32). The height (H7) is defined by a distance between a bottom 682 of a dilution vessel 132 and the distal end 320 of the dispense tip 120. In some embodiments, the height (H7) is determined such that the distal end 320 of the dispense tip 120 barely touches (e.g., touch-off) the surface level 686 in the dilution vessel 132. In other embodiments, the height (H7) is determined such that the distal end 320 of the dispense tip 120 is submerged at a predetermined depth (D7) under the surface level 686.

As illustrated in FIGS. 32 and 33, at the operation 652, the distal end 320 of the dispense tip 120 moves from the home position 190 to the aspiration position 684. At the aspiration position 684, the dispense tip 120 is submerged at the predetermined depth (D7) from the sample meniscus or surface level 686. The depth (D7) can vary based on various factors. In some examples, the depth (D7) is about 2 mm.

At operation 654, the sample pipetting system 104 operates to dispense the sample to the dilution vessel 132. In some embodiments, the entire sample contained in the dispense tip 120 is dispensed into the dilution vessel 132. In other embodiments, only a portion of the sample contained in the dispense tip 120 is dispensed into the dilution vessel 132. The sample can be dispensed by operating the syringe assembly 164 based on a predetermined syringe speed profile. Such a predetermined syringe speed profile can be determined based on sample and/or diluent volumes.

At operation 656, the sample pipetting system 104 operates to draw a predetermined volume of substance (e.g., a mixture of sample and diluent) from the dilution vessel 132. In some embodiments, the predetermined volume of substance that is drawn is determined based on a dilution table 672 as shown in FIG. 31. In other embodiments, the predetermined volume can be determined differently.

At operation 658, the sample pipetting system 104 can pause for a predetermined period of time (i.e., a first break time). In other embodiments, the operation 658 can be omitted.

At operation 660, the sample pipetting system 104 operates to push a predetermined volume of substance from the dispense tip 120 back to the dilution vessel 132. In some embodiments, the predetermined volume of substance that is pushed out is determined based on the dilution table 672. In other embodiments, the predetermined volume can be determined differently.

At operation 662, the sample pipetting system 104 can pause for a predetermined period of time (i.e., a second break time). In other embodiments, the operation 662 can be omitted.

At operation 664, if the aspiration (operation 656) and the dispensation (operation 658) are repeated predetermined times ("YES" at this operation), then the method 650 continues at operation 666. Otherwise ("NO" at this operation), the method 650 returns to the operation 656 and performs that operation and subsequent operations.

At operation 666, the sample pipetting system 104 operates to aspirate the diluted sample from the dilution vessel 132. In some embodiments, the sample pipetting system 104 aspirates a target volume of diluted sample to be dispensed to a reaction vessel 134. In other embodiment, the sample pipetting system 104 aspirates a volume of diluted sample that is greater than the target volume to be dispensed to a reaction vessel 134.

In some embodiments, the sample pipetting system 104 can move the dispense tip 120 down as the surface level 686 decreases resulting from this aspiration operation, in order to reduce contact of the dispense tip 120 (e.g., the distal end 320 thereof) with the outside of sample in the dilution vessel 132.

At operation 668, the sample pipetting system 104 operates to ascend the dispense tip 120 away from the dilution vessel 132. As shown in FIG. 32, for example, the dispense tip 120 moves above the surface level 686.

At operation 670, the sample pipetting system 104 operates to aspirate air into the dispense tip 120 above the surface level 686. This operation can reduce splashing resulting from, for example, vibration of the dispense tip 120 while moving to a different position, such as the sample dispense position 176.

Referring to FIG. 31, which is an example table 672 for draw and push-back volumes for dilution, the dispensation volume 676 and the aspiration volume 678 and 680 are determined for the total volume of substance in a dilution vessel 132. In some embodiments, the table 672 is pre-generated and stored in the instrument 100.

In some embodiments, the aspiration volumes 678 and 680 at the operation 656 can be different at different cycles. In addition or alternatively, the dispensation volume 676 at the operation 660 can be different at different cycles. In some embodiments, as shown in the table 672, the aspiration volume 678 in the second cycle is different from the aspiration volume 680 in the other cycles. In the illustrated example, the aspiration volume 678 in the second cycle is 7 µL greater than the aspiration volume 680 in the other cycles. For example, where the total volume 674 in the dilution vessel 132 is about 50 µL, the aspiration volume 678 at the second time is 27 µL, which is 7 µL greater than the aspiration volumes 680 of 20 µL at the other times, and the dispensation volume at the operation 656 is about 20 µL. In other embodiments, the aspiration volumes 678, 680 and/or the dispensation volume 676 are designed differently.

As further illustrated in FIG. 33, which is a graph 692 for a variation of dispense tip position over time, and a graph 694 for a change in syringe motion over time while performing the method 650, the dispense tip 120 is lowered from 1.2 second to 1.4 second (operation 652), and a sample is dispensed from 1.45 second to 1.65 second (operation 654). Then, a first cycle of aspirating a diluted sample from a dilution vessel 132 and dispensing it to the dilution vessel 132 is performed from 1.75 second to 2.1 second (operations 656, 658, 660, and 662). The same cycle is repeated until 4.1 second. Once the dispensation and aspiration cycles are done, the diluted sample is finally aspirated into the dispense tip from 4.1 second to 4.3 second (operation 666), and the dispense tip is raised back from 4.3 second to 4.4 second (operation 668). As illustrated, break or wait periods, such as a first break period 695 and a second break period 696 can be arranged between at least one of adjacent operations 652, 654, 656, 658, 660, 662, 666, and 668.

The aspiration and dispensation operations can be designed with suitable parameters in order to dilute the sample homogeneously. By way of example, in the illustrated example, the aspiration and dispensation operations can be repeated eight times. The mixing dispense volume 676 and the mixing aspiration volumes 678, 680 can vary depending on the total volume 674 in a dilution vessel. For example, the second mixing aspirate volume 678 is greater than (e.g., 7 µL more) the other mixing aspirate volume 680 in order to rest a steady liquid in the dispense tip 120 and avoid containing bubbles during dilution. Regarding the first aspiration, a mixing efficiency is considered from the point of high concentration sample still remaining in the dispense tip 120. In some embodiments, the wait times (operations 658 and 662) between the aspiration and dispensation (operations 656 and 660) are about 100 milliseconds, as illustrated in FIG. 33. The speed of syringe to perform the aspiration and dispensation (operations 656 and 660) is fast. In some embodiments, the speed of syringe for the aspiration is slower than the speed of syringe for the dispensation to keep the balance between the actual mixing aspirate volume and the actual mixing dispense volume.

In some embodiments, the sample pipetting system 104 operates to open the valve 168 to cancel a biased pressure before at least one of the aspiration operations 656. This operation can be performed similar to the operation 566 as described above.

Figure 34:
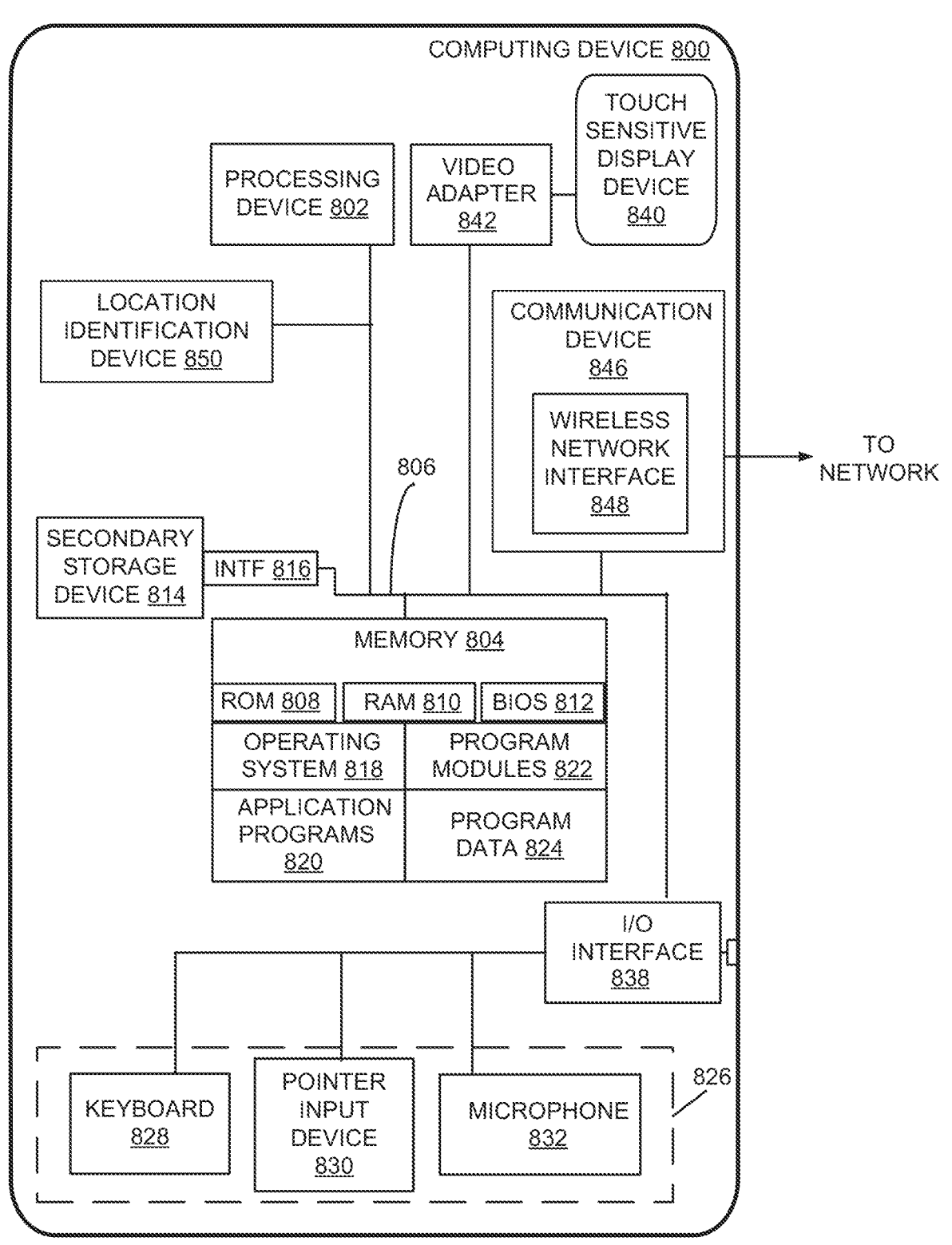
FIG. 34 schematically illustrates an exemplary architecture of a computing device to implement aspects of the present disclosure.

FIG. 34 illustrates an exemplary architecture of a computing device that can be used to implement aspects of the present disclosure, including the biological sample analysis instrument 100 or various systems of the instrument 100 (such as the substance dispense system 102 and the substance evaluation system 108), and the management system 114. Further, one or more devices or units included the systems of the instrument 100 can also be implemented with at least some components of the computing device as illustrated in FIG. 34. Such a computing device is designated herein as reference numeral 800. The computing device 800 is used to execute the operating system, application programs, and software modules (including the software engines) described herein.

The computing device 800 includes, in some embodiments, at least one processing device 802, such as a central processing unit (CPU). A variety of processing devices are available from a variety of manufacturers, for example, Intel or Advanced Micro Devices. In this example, the computing device 800 also includes a system memory 804 and a system bus 806 that couples various system components including the system memory 804 to the processing device 802. The system bus 806 is one of any number of types of bus structures including a memory bus, or memory controller; a peripheral bus; and a local bus using any of a variety of bus architectures.

Examples of computing devices suitable for the computing device 800 include a desktop computer, a laptop computer, a tablet computer, a mobile device (such as a smart phone, an iPod® mobile digital device, or other mobile devices), or other devices configured to process digital instructions.

The system memory 804 includes read only memory 808 and random access memory 810. A basic input/output system 812 containing the basic routines that act to transfer information within computing device 800, such as during start up, is typically stored in the read only memory 808.

The computing device 800 also includes a secondary storage device 814 in some embodiments, such as a hard disk drive, for storing digital data. The secondary storage device 814 is connected to the system bus 806 by a secondary storage interface 816. The secondary storage devices and their associated computer readable media provide nonvolatile storage of computer readable instructions (including application programs and program modules), data structures, and other data for the computing device 800.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in secondary storage device 814 or memory 804, including an operating system 818, one or more application programs 820, other program modules 822, and program data 824.

In some embodiments, computing device 800 includes input devices to enable a user to provide inputs to the computing device 800. Examples of input devices 826 include a keyboard 828, pointer input device 830, microphone 832, and touch sensitive display 840. Other embodiments include other input devices 826. The input devices are often connected to the processing device 802 through an input/output interface 838 that is coupled to the system bus 806. These input devices 826 can be connected by any number of input/output interfaces, such as a parallel port, serial port, game port, or a universal serial bus. Wireless communication between input devices and interface 838 is possible as well, and includes infrared, BLUETOOTH® wireless technology, WiFi technology (802.11a/b/g/n etc.), cellular, or other radio frequency communication systems in some possible embodiments.

In this example embodiment, a touch sensitive display device 840 is also connected to the system bus 806 via an interface, such as a video adapter 842. The touch sensitive display device 840 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

In addition to the display device 840, the computing device 800 can include various other peripheral devices (not shown), such as speakers or a printer.

The computing device 800 further includes a communication device 846 configured to establish communication across the network. In some embodiments, when used in a local area networking environment or a wide area networking environment (such as the Internet), the computing device 800 is typically connected to the network through a network interface, such as a wireless network interface 848. Other possible embodiments use other wired and/or wireless communication devices. For example, some embodiments of the computing device 800 include an Ethernet network interface, or a modem for communicating across the network. In yet other embodiments, the communication device 846 is capable of short-range wireless communication. Short-range wireless communication is one-way or two-way short-range to medium-range wireless communication. Short-range wireless communication can be established according to various technologies and protocols. Examples of short-range wireless communication include a radio frequency identification (RFID), a near field communication (NFC), a Bluetooth® technology, and a Wi-Fi technology.

The computing device 800 typically includes at least some form of computer-readable media. Computer readable media includes any available media that can be accessed by the computing device 800. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 800.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

Referring again to FIG. 34, the computing device 800 can include a location identification device 850. The location identification device 850 is configured to identify the location or geolocation of the computing device 800. The location identification device 850 can use various types of geolocating or positioning systems, such as network-based systems, handset-based systems, SIM-based systems, Wi-Fi positioning systems, and hybrid positioning systems. Network-based systems utilize service provider's network infrastructure, such as cell tower triangulation. Handset-based systems typically use the Global Positioning System (GPS). Wi-Fi positioning systems can be used when GPS is inadequate due to various causes including multipath and signal blockage indoors. Hybrid positioning systems use a combination of network-based and handset-based technologies for location determination, such as Assisted GPS.

Referring to FIGS. 35-37, detailed timing diagrams illustrate example pump motor steps and vertical drive motor steps over cycle time for different volumes of sample pipetting when no dilution is involved. In particular, FIG. 35 illustrates example pump motor steps and vertical drive motor steps over cycle time when a small volume of sample pipetting (e.g., a range of 0-25 μL) is performed without dilution. As described above, for the small amount, the pushback and rinsing processes can be performed. FIG. 36 illustrates example pump motor steps and vertical drive motor steps over cycle time when a medium volume of sample pipetting (e.g., a range of 25-50 μL) is performed without dilution. As described above, for the medium amount, the pushback and rinsing processes can be performed. FIG. 37 illustrates example pump motor steps and vertical drive motor steps over cycle time when a large volume of sample pipetting (e.g., a range of 50-100 μL) is performed without dilution. As described above, for the large amount, the overdraw process can be performed.

Figure 38:
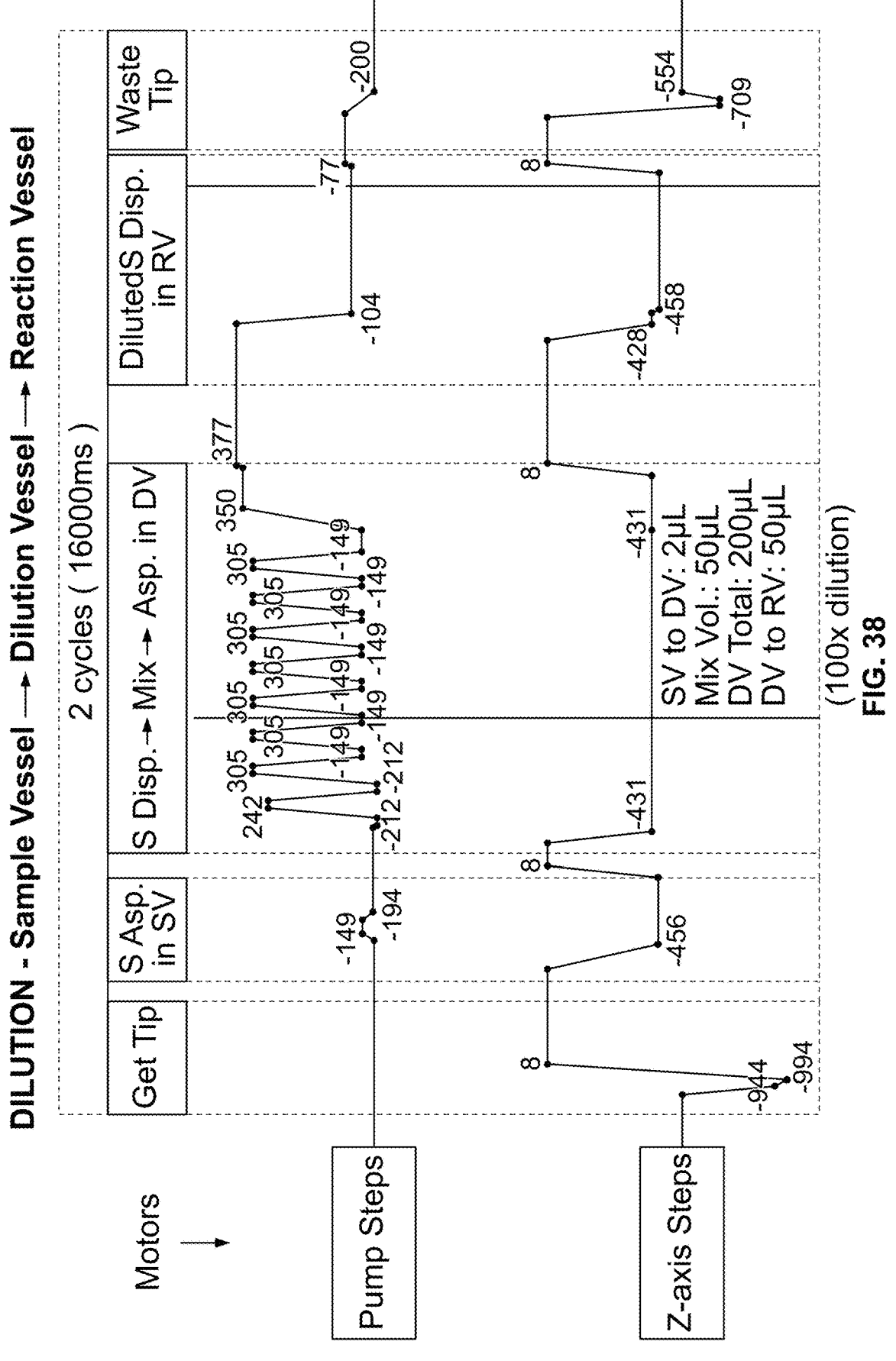
FIG. 38 is a timing diagram that illustrates example pump motor steps and vertical drive motor steps over cycle time when 100× dilution is performed
Figure 39:
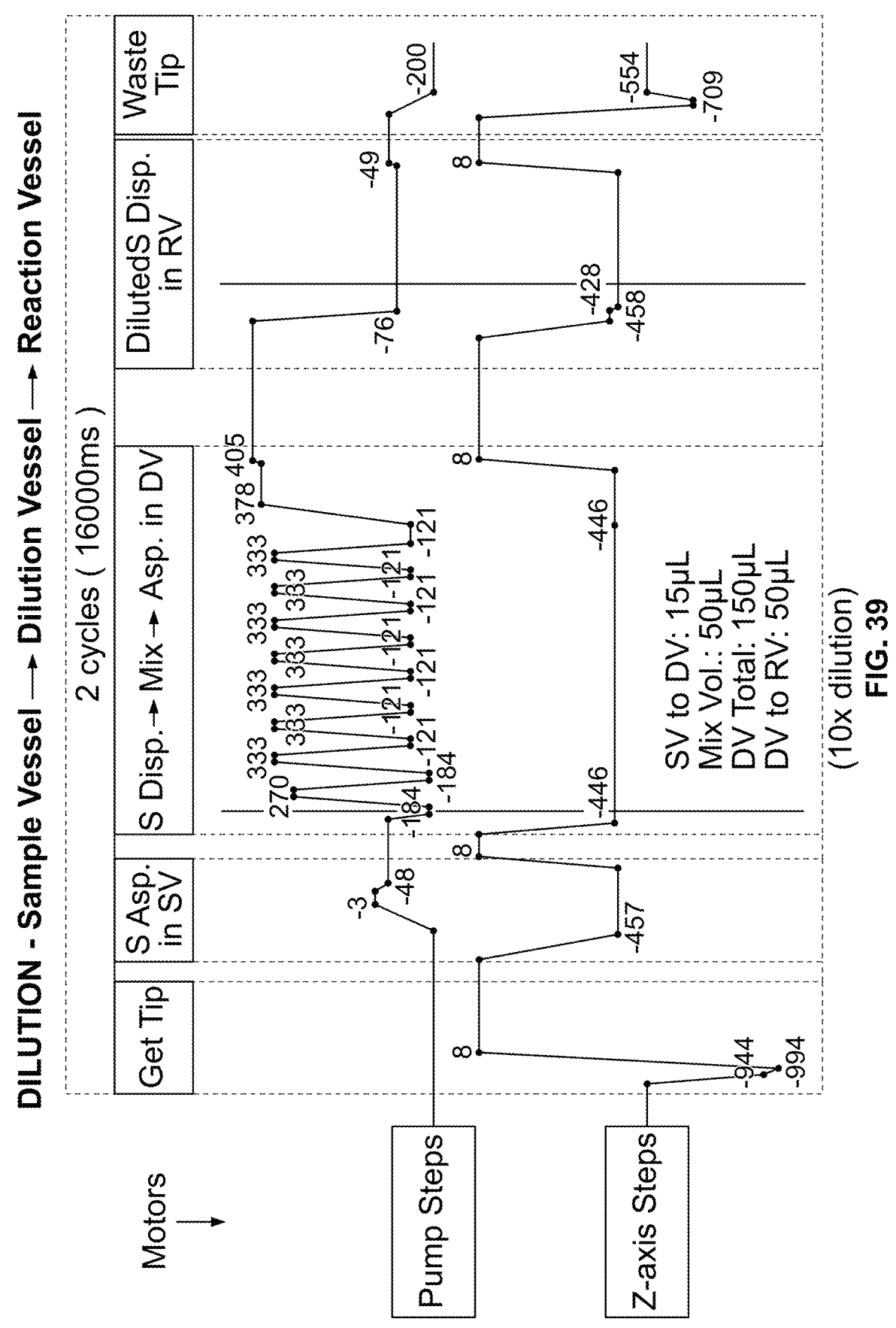
FIG. 39 is a timing diagram that illustrates example pump motor steps and vertical drive motor steps over cycle time when 10× dilution is performed.

Referring to FIGS. 38 and 39, detailed timing diagrams illustrate example pump motor steps and vertical drive motor steps over cycle time when dilution is involved. In particular, FIG. 38 illustrates example pump motor steps and vertical drive motor steps over cycle time when 100× dilution is performed, and FIG. 39 illustrates example pump motor steps and vertical drive motor steps over cycle time when 10× dilution is performed.

In FIGS. 35-39, the motor steps are proportional to corresponding pump volumetric output of the pump or linear displacement of the Z-axis drive.

Figure 40:
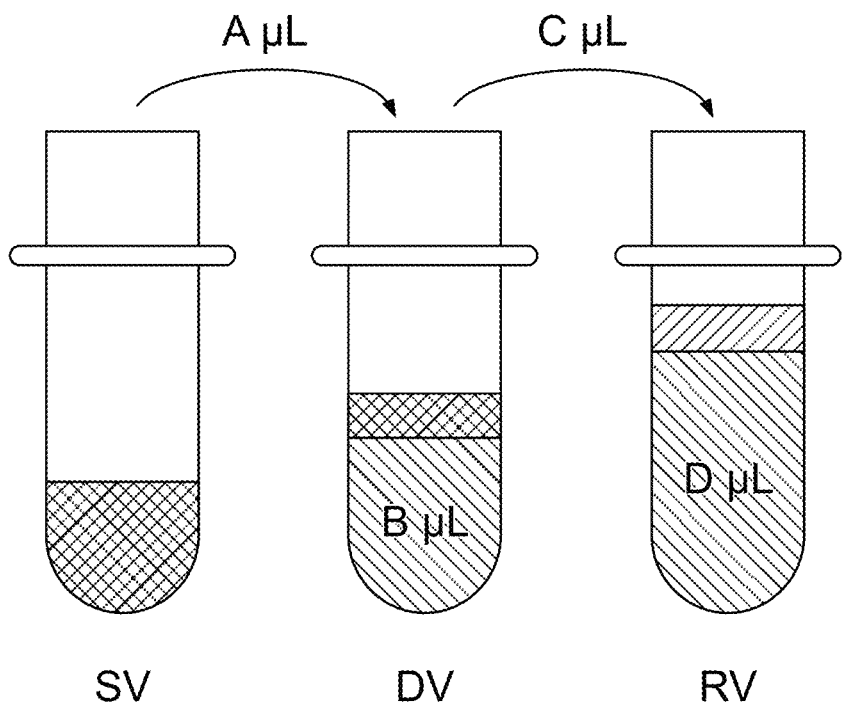
FIG. 40 is a schematic illustration of an example dilution process with a table for example dilution rates for different volumes.

FIG. 40 is a schematic illustration of an example dilution process with a table for example dilution rates for different volumes.

Figure 41:
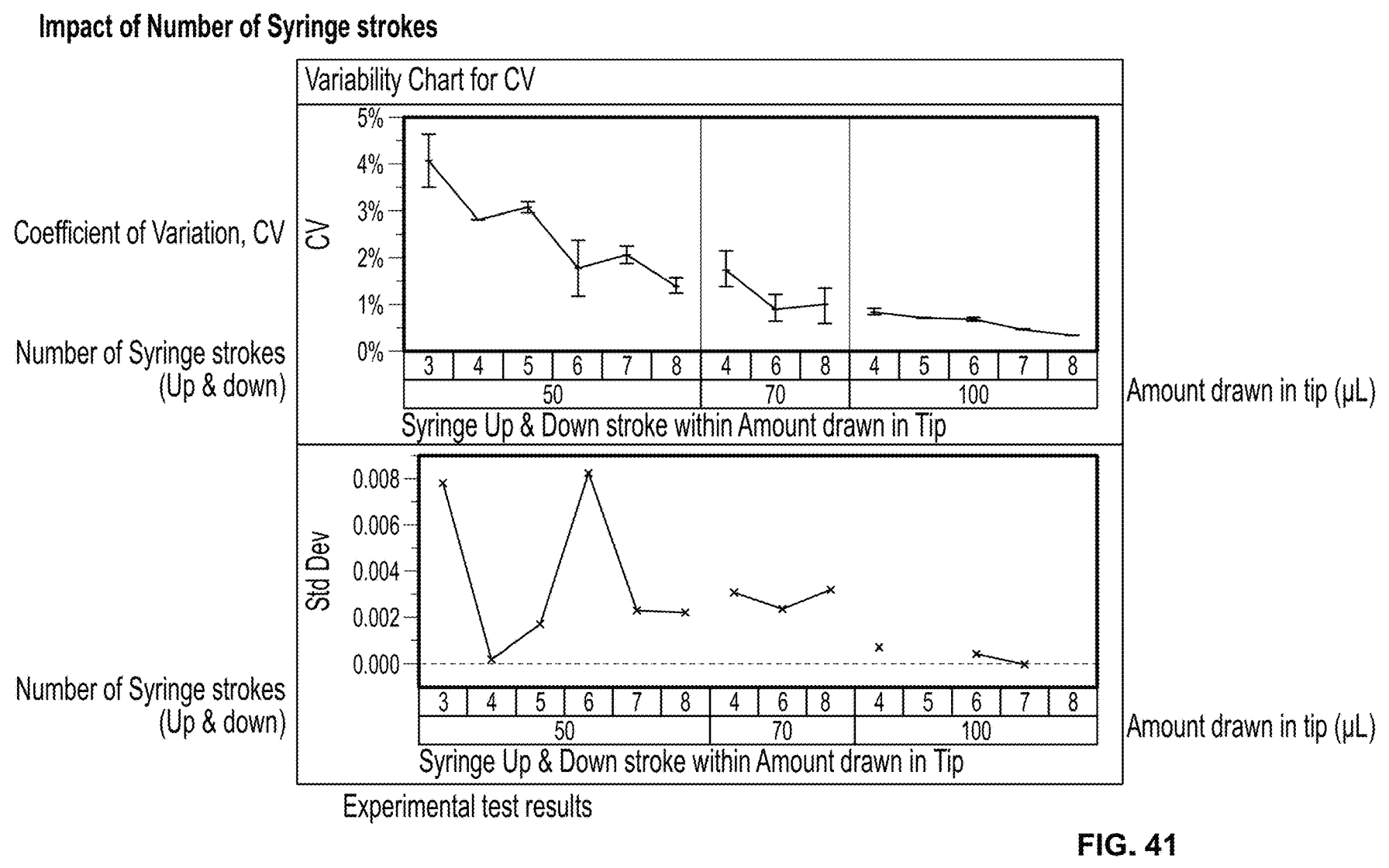

FIG. 41 illustrates an example set of experiments performed using the system of the present disclosure, which shows improved accuracy and/or precision. As illustrated, the number of strokes and the amount drawn into the dispense tip 120 were independently varied, and the resulting precision was determined. As shown in Graph A, an increasing number of pump strokes tends to improve accuracy. Graph A also shows that an increasing amount drawn into the dispense tip 120 tends to improve accuracy. Graph B shows that the standard deviation (σ) of the experimental test results. For a given instrument cycle time, small sample sizes (e.g., mixing volumes) may be quickly overdrawn and expelled to improve accuracy. For a given instrument cycle time, large sample sizes (e.g., mixing volumes) may have high accuracy by virtue of their large size. A mixing volume can be defined as the maximum amount that is in the dispense tip 120

As described herein, the substance dispense system of the present disclosure improves the accuracy and/or precision of pipetting with the disposable tip 120 (i.e., dispo-tip pipetting). The pipetting method described in the present disclosure can be based on statistical experimentation to improve accuracy and/or precision.

Either of both of accuracy and precision of pipetting can be of interest to regulatory authorities. For example, the Food & Drug Administration (FDA) is interested in precision in the certification process of the instrument. In general, precision relates to the mathematical concept of Coefficient of Variation (CoV) of a multi-variable data set (e.g., a data set of paired x, y values, a pair of independent and dependent variables, etc.). Accuracy is expressed in terms of ±μL/μL (i.e., a unitless number). In certain examples, accuracy with a 20% window may be required (i.e., ±10%). The stated accuracy corresponds to a statistical confidence interval (e.g., 2CoV, 2σ, 2 standard deviations based on a normal error distribution, etc.). For example, for a 2 μL sample, ±10% is equivalent to ±0.2 μL. For a 100 μL sample, ±10% is equivalent to ±10 μL. In some examples, if precision is satisfied, then calibration can resolve accuracy requirements.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method for preparing a liquid substance for evaluation, the method comprising:
aspirating a first volume of the liquid substance from a first vessel to a dispense tip; and
dispensing a second volume of the liquid substance from the dispense tip to a second vessel by:
lowering the dispense tip into the second vessel at a first height, the first height configured such that a distal end of the dispense tip remains above a liquid surface level in the second vessel;
dispensing part of the second volume of the liquid substance from the dispense tip to the second vessel at the first height such that the dispense tip retains a rest of the second volume of the liquid substance therein;
lowering the dispense tip to a second height, the second height configured such that the distal end of the dispense tip touches the liquid surface level in the second vessel; and
dispensing the rest of the second volume of the liquid substance from the dispense tip to the second vessel at the second height.

2. The method of claim 1, wherein dispensing a second volume of the liquid substance further comprises:
detecting, using a sensor, whether the liquid substance in the second vessel contacts the distal end of the dispense tip; and
transmitting a signal from the sensor to a control device, the signal usable by the control device to stop moving the dispense tip.

3. The method of claim 1, wherein the first volume is less than 30 μL, less than 25 μL, or less than 20 μL.

4. The method of claim 1, wherein the first volume is greater than the second volume.

5. The method of claim 1, wherein the second volume is greater than 25 μL.

6. The method of claim 1, wherein the first vessel comprises a sample vessel containing an aliquoted volume of the liquid substance and the second vessel comprises a reaction vessel.

7. The method of claim 1, further comprising:

rinsing the dispense tip using at least a portion of the liquid substance from the second vessel.

8. The method of claim 7, wherein rinsing the dispense tip comprises:

aspirating a third volume of the liquid substance from the second vessel to the dispense tip; and dispensing a fourth volume of the liquid substance from the dispense tip to the second vessel.

9. The method of claim 8, further comprising:

dispensing the third volume of the liquid substance; and again aspirating the third volume of the liquid substance.

10. The method of claim 9, further comprising repeating the steps of dispensing and aspirating the third volume.

11. The method of claim 1, wherein aspirating a first volume of the liquid substance comprises:

aspirating a fifth volume of the liquid substance from the first vessel to the dispense tip; and dispensing a sixth volume of the liquid substance from the dispense tip to the first vessel to contain the first volume of the liquid substance in the dispense tip.

12. The method of claim 11, wherein the sixth volume is greater than the fifth volume.

13. The method of claim 1, wherein the first volume is equal to the second volume.

14. The method of claim 1, wherein the first vessel comprises a sample tube, or wherein the second vessel comprises a sample vessel, or both.

15. The method of claim 1, further comprising:

prior to aspirating the first volume of the liquid substance, determining a liquid surface level of the liquid substance contained in the first vessel.

16. The method of claim 15, wherein determining the liquid surface level of the liquid substance comprises:

lowering the dispense tip in to the first vessel;

detecting a pressure increase at a distal end of the dispense tip; and calculating the liquid surface level of the liquid substance based on the pressure increase.

17. The method of claim 16, wherein calculating the liquid surface level of the liquid substance comprises:

determining a travel distance of the dispense tip until the pressure increase is detected; and calculating the liquid surface level of the liquid substance based on the travel distance.

18. The method of claim 16, wherein determining the liquid surface level of the liquid substance further comprises:

prior to detecting a pressure increase, ejecting air from the dispense tip; and after detecting the pressure increase and prior to aspirating the first volume, equalizing a pressure inside the dispense tip with the atmosphere.

19. The method of claim 18, wherein equalizing the pressure inside the dispense tip with the atmosphere comprises opening a valve arranged between the dispense tip and a syringe assembly.

20. The method of claim 1, wherein the liquid substance is an aqueous liquid substance.

21. The method of claim 1, wherein the dispensing the rest of the second volume at the second height is started within about 0.1 seconds of an end of the dispensing the part of the second volume at the first height.

22. The method of claim 1, wherein the dispense tip comprises a disposable dispense tip.

* * * * *